US009946739B2

(12) United States Patent
Haddock

(10) Patent No.: US 9,946,739 B2
(45) Date of Patent: Apr. 17, 2018

(54) INTELLIGENT INTERNET SYSTEM WITH ADAPTIVE USER INTERFACE PROVIDING ONE-STEP ACCESS TO KNOWLEDGE

(71) Applicant: Neura Labs Corp., Cliffside Park, NJ (US)

(72) Inventor: Robert Haddock, Cliffside Park, NJ (US)

(73) Assignee: NEURA LABS CORP., Cliffside Park, NJ (US)

( * ) Notice: Subject to any disclaimer, the term of this patent is extended or adjusted under 35 U.S.C. 154(b) by 898 days.

(21) Appl. No.: 14/212,654

(22) Filed: Mar. 14, 2014

(65) Prior Publication Data

US 2014/0282219 A1 Sep. 18, 2014

Related U.S. Application Data

(60) Provisional application No. 61/800,302, filed on Mar. 15, 2013.

(51) Int. Cl.
*G06F 3/048* (2013.01)
*G06F 17/30* (2006.01)

(52) U.S. Cl.
CPC .. *G06F 17/30312* (2013.01); *G06F 17/30731* (2013.01)

(58) Field of Classification Search
CPC .................... G06F 17/30312; G06F 17/30731
See application file for complete search history.

(56) References Cited

U.S. PATENT DOCUMENTS 6,289,337 B1 9/2001 Davies et al.
2002/0120481 A1* 8/2002 Woods .................. G06Q 10/06 707/736
2003/0061209 A1* 3/2003 Raboczi ............ G06F 17/30864
(Continued)

FOREIGN PATENT DOCUMENTS

WO 2011/022238 A2 2/2011

OTHER PUBLICATIONS

Extended European Search Report (includes Supplementary European Search Report and Search Opinion) received for European Patent Application No. 14762419.1, dated Feb. 6, 2017, 11 Pages.
(Continued)

*Primary Examiner* — Omar Abdul-Ali
(74) *Attorney, Agent, or Firm* — Dentons US LLP

(57) ABSTRACT

An Intelligent Internet system having the capacity to discover, acquire, organize, store, and make accessible knowledge about things of interest to users and to help users more efficiently interact with these things in a rich variety of ways. The Intelligent Internet system provides users with a personalized interface that dynamically adapts to each user's interests and context. This interface provides users with direct access to "knowledge" about things that humans or machines can uniquely sense, recognize, name, understand and interact with, whether real or imagined. Users can access the knowledge stored in the Intelligent Internet system to find, learn about and select products and services; communicate with family, friends, colleagues, classmates, customers and suppliers; learn about things they encounter in their environment, make decisions about them, consume and share content related to them and perform transactions.

10 Claims, 51 Drawing Sheets

| 217 Entity group | 218 Entity types | 219 Default file types for Content Objects | 220 Property templates for structured Content Objects | 221 Default Smart Interaction Method |
|---|---|---|---|---|
| Content | Fact | .XML | Property templates for facts | View a fact |
| Content | Article | .txt | Property template for articles | View an article summary |
| Content | Tweet | .XML | Property template for tweets | View a tweet |
| Content | Document | .ePub3 | Property templates for office documents | View a document |
| Content | Book | .ePub3 | Property template for ePub documents | Read an eBook |
| Content | Image | .JPG | Property template for images | View an image |
| Content | Diagram | .SVG | Property template for diagrams | View a diagram |
| Content | Video | .H264 | Property template for videos | Play a video |

(56) References Cited

U.S. PATENT DOCUMENTS

| | | | | |
|---|---|---|---|---|
| 2006/0010138 | A1* | 1/2006 | Huerta | G06F 17/30401 |
| 2010/0125604 | A1 | 5/2010 | Martinez et al. | |
| 2010/0205220 | A1 | 8/2010 | Hart et al. | |
| 2011/0182485 | A1 | 7/2011 | Shochat et al. | |
| 2011/0282899 | A1 | 11/2011 | Mathew et al. | |
| 2011/0320187 | A1* | 12/2011 | Motik | G06F 17/278 704/9 |
| 2015/0100568 | A1* | 4/2015 | Golden | G06F 17/30651 707/722 |

OTHER PUBLICATIONS

Angles, Renzo "A Comparison of Current Graph Database Models", IEEE 28th International Conference on Data Engineering Workshops, vol. 31, 2012, pp. 171-177.

Invitation to pay additional fee received for PCT Patent Application No. PCT/US2014/029536, dated Aug. 7, 2014, 2 pages.

Kasneci et al., "NAGA: Searching and Ranking Knowledge", ICDE, 2008, pp. 953-962.

Partial European Search Report received for European Patent Application No. 14762419.1, dated Oct. 13, 2016, 7 pages.

International Search Report and Written Opinion received for PCT Application No. PCT/US2014/029536 dated Oct. 17, 2014, 11 pages.

Angles, Renzo, "A Comparison of Current Graph Database Models", IEEE 28th International Conference on Data Engineering Workshops, 2012, 7 Pages.

Kasneci et al., "NAGA: Searching and Ranking Knowledge", IEEE 24th International Conference on Data Engineering, 2008, 10 Pages.

López et al., "Literature Review about Neo4j Graph Database as a Feasible Alternative for Replacing RDBMS", Industrial Data, vol. 18, No. 2, 2015, pp. 135-139.

Nadeau et al., "A Survey of named Entity Recognition and Classification", National Research Council Canada, 2007, pp. 1-20.

Quiroga, Rodrigo Quian, "Searching for the Jennifer Aniston Neuron [Excerpt]", Scientific American, Feb. 1, 2013, pp. 1-7.

International Preliminary Report on Patentability received for PCT Patent Application No. PCT/US2014/029536, dated Sep. 24, 2015, 8 pages.

* cited by examiner

10
Metadata tables
9
Metadata list
Metadata:
entities relationships tables
Metadata:
relationship types translation tables
Metadata:
Property names translation tables
Metadata:
data types conversion tables
Metadata:
entities list
Metadata:
relationship types list
Metadata:
property names list
Metadata:
data types list 8
Knowledge Graph database storage
6
Smart Content database storage
12
Assign entity ID
13
Normalize content types
14
Normalize names of content elements
15
Normalize content data structures
16
Normalize content properties
2
Content Resources
1
Metadata storage 6
Knowledge Graph database storage
29
Update Knowledge store
25
Update Smart Content store
8
Smart Content database storage
27
Import RDF records
28
Rationalize RDF content
26
RDF content files
1
Metadata sorage

FIG. 10

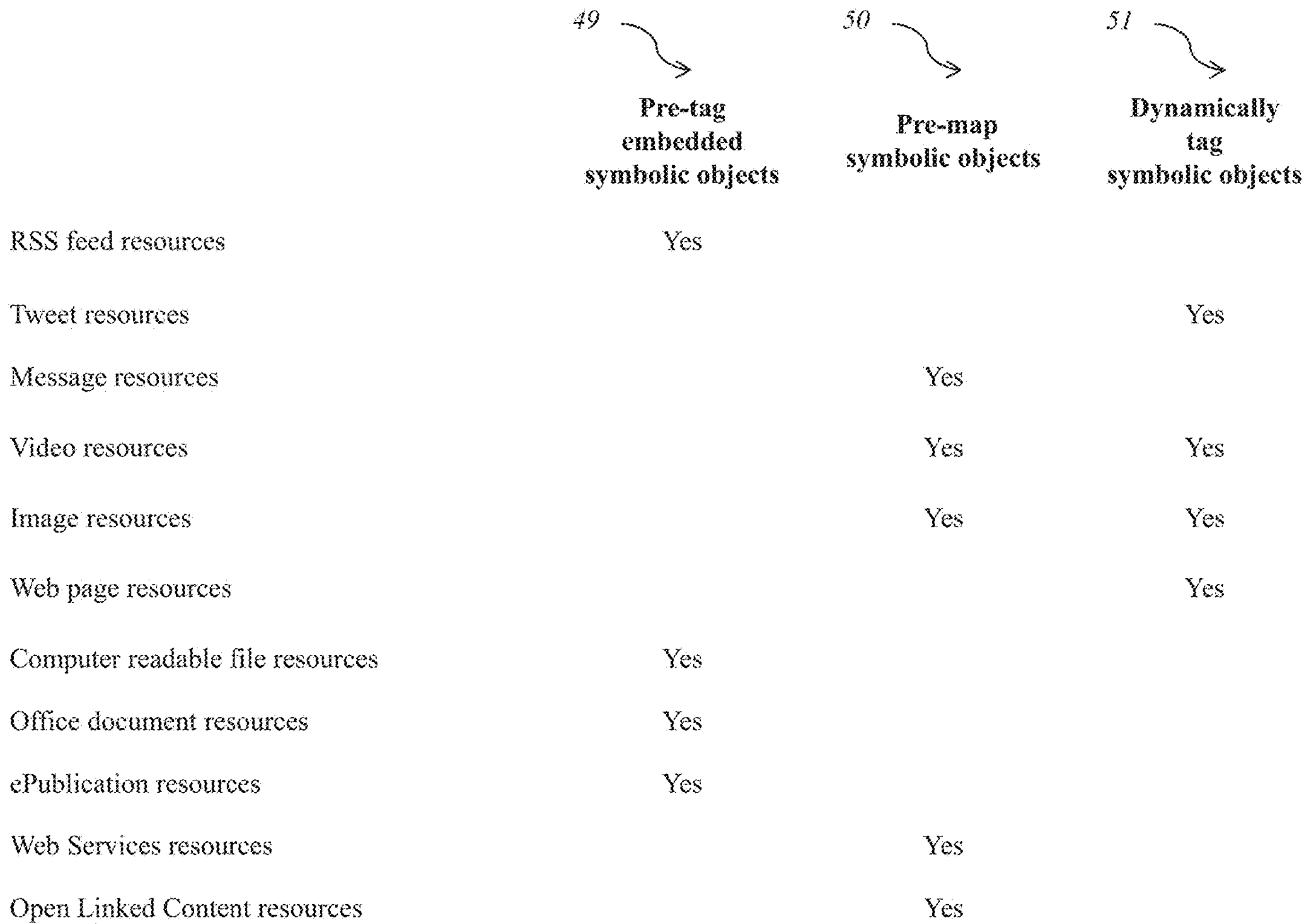

| | 49 Pre-tag embedded symbolic objects | 50 Pre-map symbolic objects | 51 Dynamically tag symbolic objects |
|---|---|---|---|
| RSS feed resources | Yes | | |
| Tweet resources | | | Yes |
| Message resources | | Yes | |
| Video resources | | Yes | Yes |
| Image resources | | Yes | Yes |
| Web page resources | | | Yes |
| Computer readable file resources | Yes | | |
| Office document resources | Yes | | |
| ePublication resources | Yes | | |
| Web Services resources | | Yes | |
| Open Linked Content resources | | Yes | |

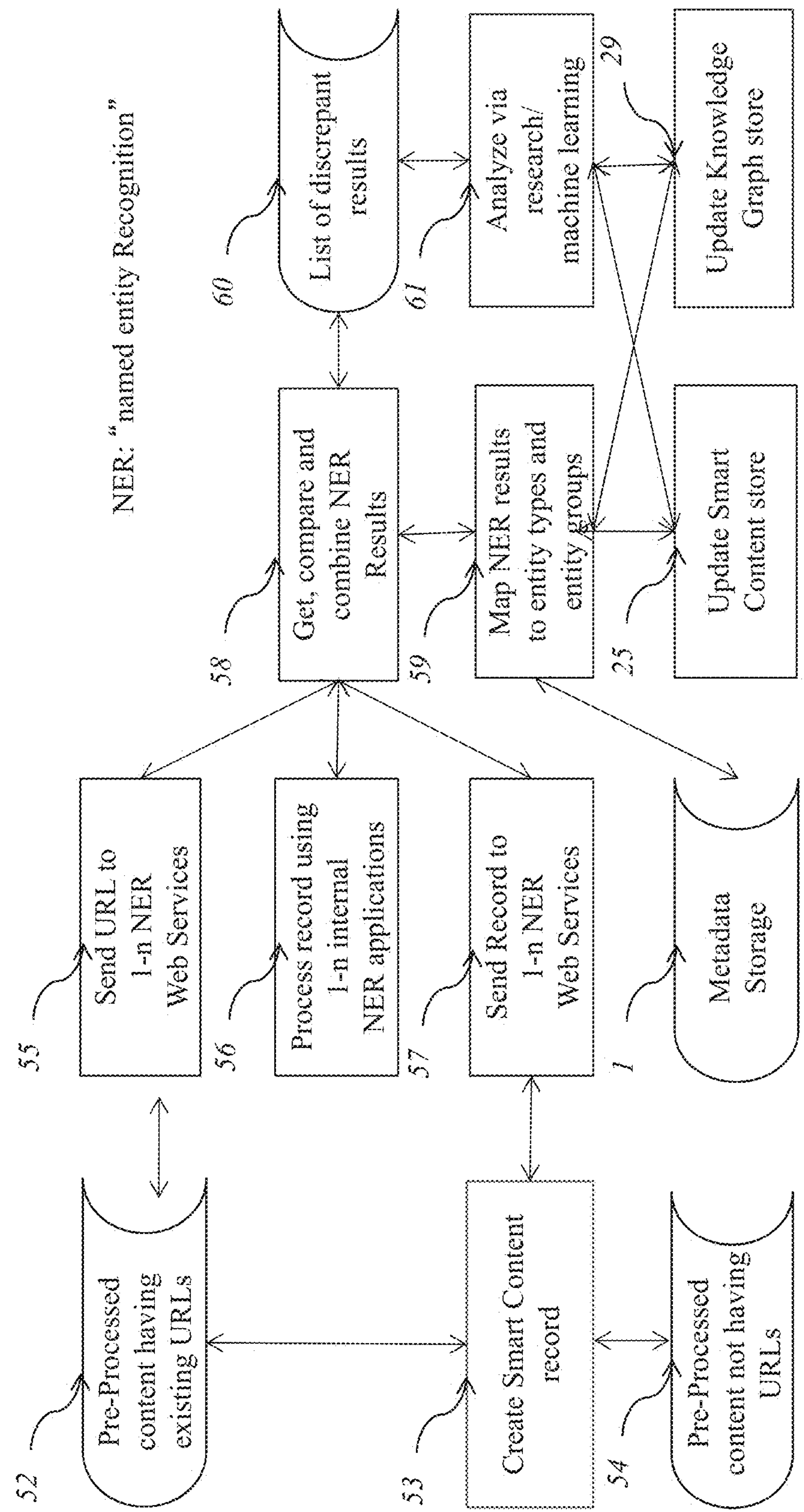
FIG. 11
NER: "named entity Recognition"
52
Pre-Processed content having existing URLs
53
Create Smart Content record
54
Pre-Processed content not having URLs
55
Send URL to 1-n NER Web Services
56
Process record using 1-n internal NER applications
57
Send Record to 1-n NER Web Services
1
Metadata Storage
58
Get, compare and combine NER Results
59
Map NER results to entity types and entity groups
25
Update Smart Content store
60
List of discrepant results
61
Analyze via research/ machine learning
29
Update Knowledge Graph store

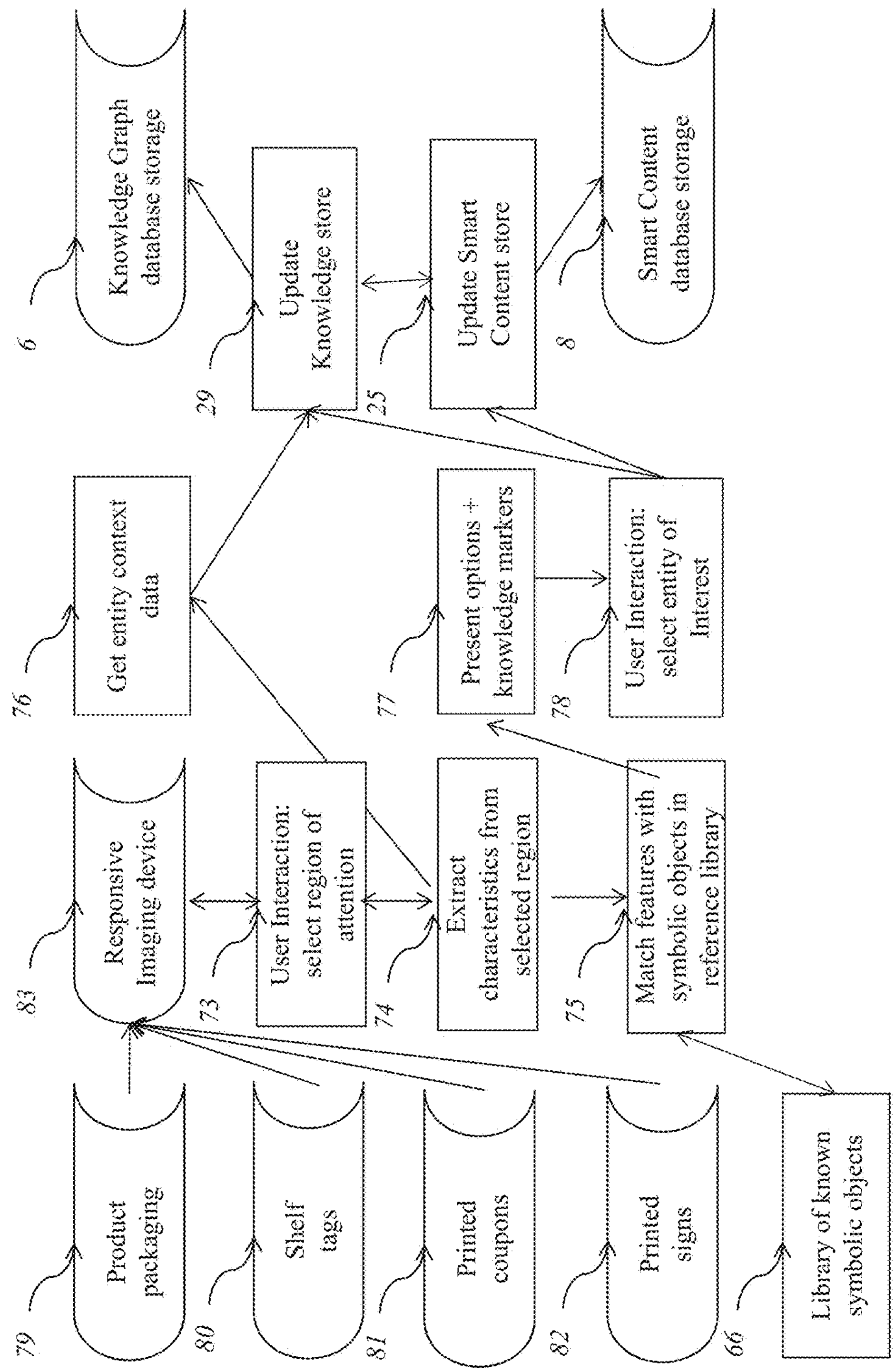
FIG. 15
6
Knowledge Graph database storage
29
Update Knowledge store
25
Update Smart Content store
8
Smart Content database storage
76
Get entity context data
77
Present options + knowledge markers
78
User Interaction: select entity of Interest
83
Responsive Imaging device
73
User Interaction: select region of attention
74
Extract characteristics from selected region
75
Match features with symbolic objects in reference library
79
Product packaging
80
Shelf tags
81
Printed coupons
82
Printed signs
66
Library of known symbolic objects 8
Knowledge Graph database storage
29
Update Knowledge store
25
Update Smart Content store
6
Smart Content Storage
108
Parse and analyze knowledge contributions from users
1
Metadata Storage 109
Smart Content record
110
Smart Content Summary record component
111
Smart Content Metadata record component
112
Smart Content Permissions record component
113
Smart Content Knowledge Map record component
114
Smart Content Summaries record component
115
Smart Content Object record component Example:

2001:0db8:85a3:0042:1000:8a2e:0370:7334/a/2013-03-06T03:17ZNews/BBC

Application No.: Not Yet Assigned Docket No.: 701242000100
Inventor: Robert Haddock
Title: INTELLIGENT INTERNET SYSTEM WITH ADAPTIVE USER INTERFACE PROVIDING ONE-STEP ACCESS TO KNOWLEDGE
32/51

172
User interaction:
select an entity
173
Search:
enter a search argument
select an entity
174
Browse:
list of symbolic objects
select a symbolic object
175
Browse:
galleries of symbolic objects
select a symbolic object
176
View text:
select an embedded tagged symbolic object
177
View images/ videos:
select an embedded untagged symbolic object 178
User search term(s) input
179
group 1 group 2 . . . group n
180
entity name entity type name
marker 1, marker 2, marker 3, marker n
entity name entity type name
marker 1, marker 2, marker 3, marker n
entity name entity type name
marker 1, marker 2, marker 3, marker n Gallery of symbolic objects
185
186
184
User interaction: select a symbolic object by touching a symbol 190
"12 Years a Slave" wins
the Academy Award for best picture.
text content
189
User Interaction:
select a
symbolic object
by touching an
untagged
word or phrase.

FIG. 45

| | 206 All entity groups All entity types All entities | 207 Entity group x All entity types All entities | 208 Entity group x Entity type y All entities | 209 Entity group x Entity group y Entity z |
|---|---|---|---|---|
| 210 Universal interactions | valid | | | |
| 211 Entity group specific Interactions | | valid | | |
| 212 Entity type specific applications | | | valid | |
| 213 Entity specific applications | | | | valid |

FIG. 47

| 217 Entity group | 218 Entity types | 219 Default file types for Content Objects | 220 Property templates for structured Content Objects | 221 Default Smart Interaction Method |
|---|---|---|---|---|
| Content | Fact | .XML | Property templates for facts | View a fact |
| Content | Article | .txt | Property template for articles | View an article summary |
| Content | Tweet | .XML | Property template for tweets | View a tweet |
| Content | Document | .ePub3 | Property templates for office documents | View a document |
| Content | Book | .ePub3 | Property template for ePub documents | Read an eBook |
| Content | Image | .JPG | Property template for images | View an image |
| Content | Diagram | .SVG | Property template for diagrams | View a diagram |
| Content | Video | .H264 | Property template for videos | Play a video |

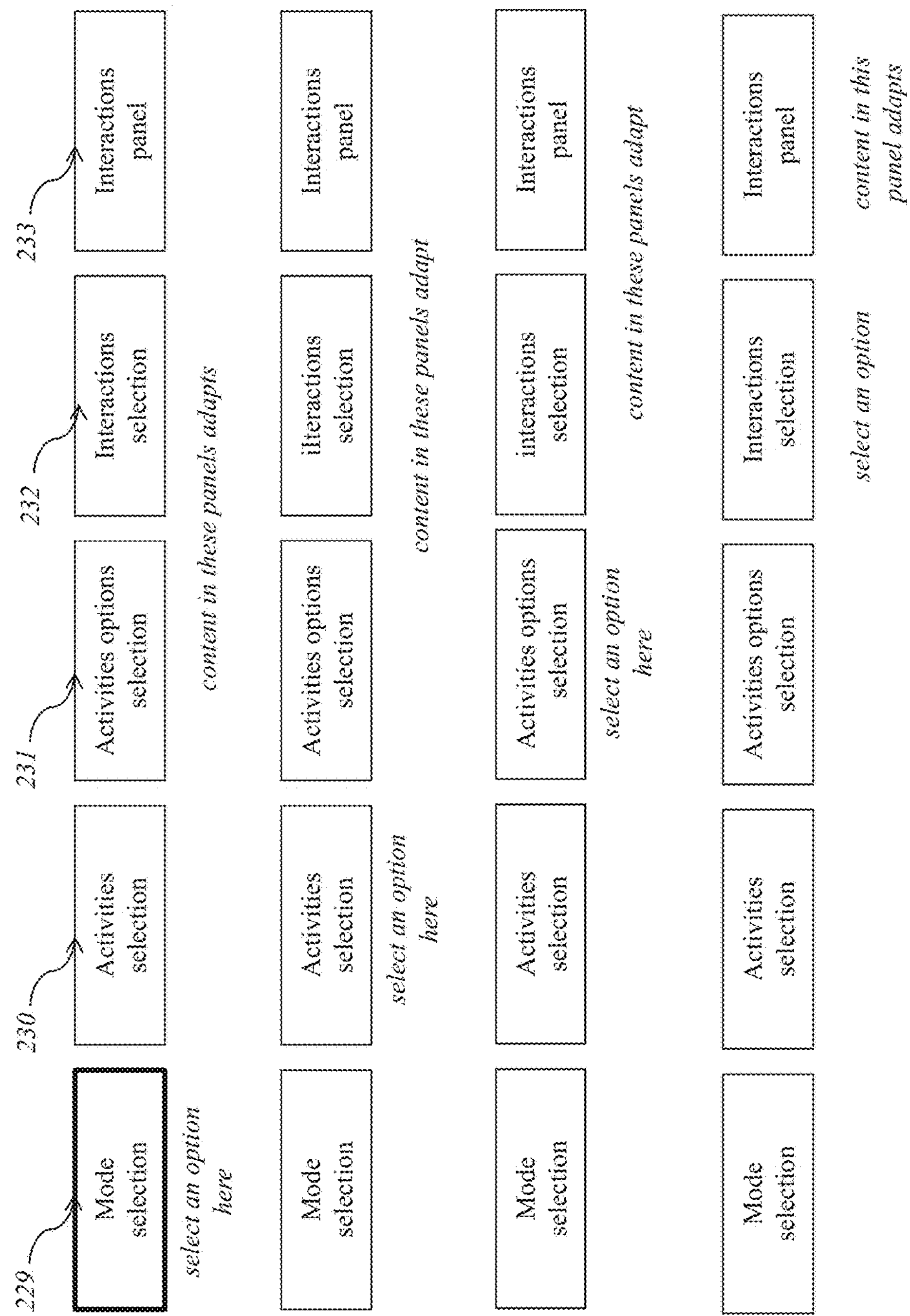
FIG. 49
229
230
231
232
233
Mode selection
Activities selection
Activities options selection
Interactions selection
Interactions panel
select an option here
content in these panels adapts
Mode selection
Activities selection
Activities options selection
iteractions selection
Interactions panel
select an option here
content in these panels adapt
Mode selection
Activities selection
Activities options selection
interactions selection
Interactions panel
select an option here
content in these panels adapt
Mode selection
Activities selection
Activities options selection
Interactions selection
Interactions panel
select an option
content in this panel adapts 239
User interaction: select a universal interactions
243
Popup a form for specifying details about the interaction
244
User interaction: select or specify an entity for the universal interaction
245
User interaction: specify details about the universal interaction
246
User interaction: activate the interaction method
247
Implement the specified interactions

INTELLIGENT INTERNET SYSTEM WITH ADAPTIVE USER INTERFACE PROVIDING ONE-STEP ACCESS TO KNOWLEDGE

CROSS-REFERENCE TO RELATED APPLICATION

The present application claims benefit to U.S. provisional patent application No. 61/800,302, entitled INTELLIGENT INTERNET SYSTEM WITH ADAPTIVE USER INTERFACE PROVIDING ONE-STEP ACCESS TO KNOWLEDGE, filed on Mar. 15, 2013, the entire content of which is incorporated herein by reference.

FIELD OF THE INVENTION

The disclosed embodiments relate generally to digital assistants, and more specifically to digital assistants that intelligently provide assistance to help users learn about and interact with things.

BACKGROUND AND SUMMARY

All human activities involve interacting with "entities," i.e., things real and imagined in our internal and external environments. Examples of entities include: people, places, organizations, companies, restaurants, movies, books, products, ideas, beliefs, theories, events . . . thousands of types of things we can uniquely perceive, understand, and name. Only a few of these entities are currently directly addressable by the Internet. The vast majority is not.

As people interact with entities, the human brain acquires knowledge about them, allowing future interactions to be more efficient. Some of this knowledge is passed on to future generations. Thus, there are two well-known repositories of encoded knowledge in humans: DNA (which encodes knowledge inherited from our ancestors) and memories (which encode knowledge we gain through our personal interactions with entities in the form of cellular changes to neurons in the brain). These knowledge structures help us interact with things in our environment more efficiently.

As described below, the Intelligent Internet system, according to one example, augments these two repositories, by providing a virtual networked system with the capacity to acquire, encode, store, access, use and share many types of collective knowledge known to humans and machines.

The Internet was originally designed as a network of networks, a mechanism for connecting computer servers, devices called terminals, content files and software applications. Each device connected by the Internet is assigned its own "Internet Protocol Address" (IP address), a numerical label assigned, often dynamically, to each device participating in computer networks that use the Internet Protocol for communication. Over time, the Internet has evolved to connect billions of devices, each such device having its own assigned IP address and each able to communicate efficiently with other devices having assigned IP addresses via the Internet.

Today's Internet has two major deficiencies: 1) it lacks an innate ability to acquire and apply knowledge about the entities it connects, and 2) it does not allow users to connect directly to and interact with the vast majority of entities currently lacking assigned IP addresses, for example: people, places, events and other things the human brain is able to recognize, understand and interact with. These deficiencies currently lack a commercially viable solution.

As a result, there is a major disconnect between a system that knows only how to locate and communicate with things having assigned IP addresses (devices, files and applications) and a fundamental need of many users to locate, connect with, learn about and interact with things of interest to them, most of which do not have assigned IP addresses. Today's Internet and the human brain essentially speak two different languages.

Thus far, the World Wide Web has been the most successful attempt to bridge this disconnect. The Web essentially allows us to create 2-dimensional "hypertext" connections between a tagged object in a file and a related addressable file, and very importantly the hypertext tags are capable of pointing only to a single IP address or a URL associated with an IP address. However, the Web only understands "files" while the human brain understands "things," i.e. entities. Both the Internet and the Web speak languages difficult for the human brain to decipher. The Web places upon its users the burden of making sense of the files with which it is capable of connecting. It only helps users connect with "things" that have assigned IP addresses. Once connected with these "things" users must do most of the work thereafter.

The Web has a number of other important deficiencies related to control and risk. Hypertext links are controlled by website owners, not users. Users who click on or touch a hyperlinked object typically have little idea where they may be taken, and indeed may end up accessing dangerous files. The World Wide Web paradigm has resulted in the creation of hundreds of millions of websites controlled by owners and operators of unknown reputation, each website having its own custom-made user interface.

A more recent paradigm called the "Semantic Web" has partially addressed the inability of the Web to understand "things." The Semantic Web organizes and stores two major kinds of knowledge (facts and relationships) about things in file structures that computers can understand. The Semantic Web generally uses a file structure called "Resource Description Framework" (RDF) which decomposes knowledge into small pieces. Today there are billions of RDF records from resources such as Wikipedia and The New York Times that contain snippets of knowledge accessible by devices connected to the Internet.

However, the Semantic Web has its own major deficiencies, including: 1) most importantly, like the Internet and World Wide Web, it lacks an innate capacity to acquire and apply knowledge; 2) it is designed to enable computers to understand its content, not humans; and 3) it stores only a few simple types of the knowledge that we humans consider useful or even essential for interacting with things of interest to us in our environment.

A widely accessible definition of "Intelligence" is: "the capacity to acquire and apply knowledge." (See, e.g., American Heritage Dictionary of the English Language.) As described herein, the Intelligent Internet system, according to one example, augments the capabilities of today's Internet by creating a networked system with the capacity to acquire, organize, encode, store, access, apply and share many types of knowledge about entities currently connected by the Internet, as well as entities not currently connected by the Internet.

The Intelligent Internet system, according to one example, has the capacity to directly acquire knowledge about human behaviors because it is a single unified system that allows users to interact directly with entities. It organically integrates the user interface, user interactions with entities, and an operating system having access to knowledge and resources, eliminating complex junction points between them. Alternate paradigms such as the World Wide Web, the Semantic Web and Mobile Apps all have complex junction points between the user interface, applications, operating system and various chaotic resources.

Entities can be difficult for both humans and machines to recognize and disambiguate. A major challenge in recognizing and disambiguating among entities is the fact that a specific entity may be represented by differing "symbolic objects." These symbolic objects appear everywhere in our environment: on display screens of devices, in things we see with our eyes or hear with our ears. They can include names ("Tim Berners Lee"), nicknames, aliases, images, videos, IDs, codes. They can appear in hundreds of types of computer readable content, such as news, tweets, messages, quotations, etc.

A user of the Intelligent Internet system, in one embodiment, can directly learn about these symbolic objects and the entities they represent without the aid of the World Wide Web, for example, by: selecting or specifying an entity of interest using a Smart Phone, tablet, PC, Smart TV or other computing and communications devices or by capturing images or videos of entities of using digital cameras or other imaging devices; etc.

In one example, the Intelligent Internet organizes, encodes and stores knowledge about entities in a new type of pol-dimensional digital structure referred to as "knowledge cells." Each of these knowledge cells represents the intersection of at least an entity and a content object. For example, a knowledge cell may represent the intersection of a single person, place, company, event, belief or other type of entity and a single content object such as a news article, a tweet or other type of content. In this example, the Intelligent Internet implements knowledge cells as poly-dimensional digital structures, each of which encodes a rich set of knowledge about a specific entity, including: factual knowledge about this entity; knowledge about relationships between this entity and other entities; knowledge about valid methods for interacting with this entity by humans and machines; knowledge about ratings, reviews and opinions; knowledge providing guides, guidelines and procedures for interacting with this entity.

In one embodiment, the encoded factual knowledge includes properties classified as "knowledge markers, which collectively have the capacity to uniquely describe an entity, thus allowing humans and machines to more efficiently disambiguate among entities.

In one example of the current invention, the Intelligent Internet provides a rich library of "Smart Interaction Modules" ("SIMs"), software that implements standardized methods for interacting with entities. Users accessing the Intelligent Internet with touch-enabled mobile devices or tablets can directly access these Smart Interaction Modules simply by touching any symbolic object wherever they encounter it . . . in a news article, a tweet, an image, a video or on a website. Users accessing the Internet with other types of devices can directly access these Smart Interaction Methods by using a point and click mechanism or by speaking to select an entity or specify it.

One aspect of the current invention implements a new unified paradigm to help users interact with entities of personal interest to them, including, for example: 1) a uniform scheme for uniquely identifying all types of entities (e.g. unique entity IDs); 2) an efficient multi-dimensional structure for encoding, organizing and storing our collective knowledge about entities; 3) one-step access to useful knowledge about entities of personal interest; 4) a standardized library of smart methods for interacting with entities; 5) a simplified way to learn about updates concerning entities; and 6) a simple, adaptive user interface that understands users, their context and the entities of interest to them, and adapts dynamically to help users interact with these entities and 7) a simplified, more efficient and secure way to communicate messages of all types.

In one aspect and example, the intelligent Internet system is a universal networked system that acquires, accumulates and efficiently stores knowledge about entities and symbolic objects representing these entities, and makes this knowledge easily available to users.

In another aspect and example, the Intelligent Internet system has the capacity to acquire and accumulate knowledge about entities from numerous diverse resources, including: news feeds, tweets, Web Services, Open Linked Content, Websites, digital publications, computer files, office documents and user behaviors and inputs.

In another aspect and example, the Intelligent Internet system, enables users to directly access knowledge about a symbolic object they see on the screen of a Smart Phone, tablet, PC or other Smart Device, simply by touching the symbolic object.

BRIEF DESCRIPTION OF THE DRAWINGS

The present application can be best understood by reference to the following description taken in conjunction with the accompanying drawing figures, in which like parts may be referred to by like numerals.

FIG. 10 shows a block diagram of an embodiment having methods for recognizing symbolic objects and adding knowledge tags to symbolic objects.

FIG. 11 shows a block diagram of an embodiment having methods for recognizing and processing symbolic objects embedded in text content resources.

FIG. 15 shows a block diagram of an embodiment having methods processing for recognizing symbolic objects embedded in printed content resources.

FIG. 45 is a decision matrix showing an embodiment having methods for managing user interactions with entities.

FIG. 47 is a block diagram showing examples of an implementation having methods for interacting with smart content.

FIG. 49 illustrates a design showing an implementation having methods for managing an adaptive user interface responsive to user selections of a symbolic object and/or an entity.

DETAILED DESCRIPTION OF THE INVENTION

Figure 1:
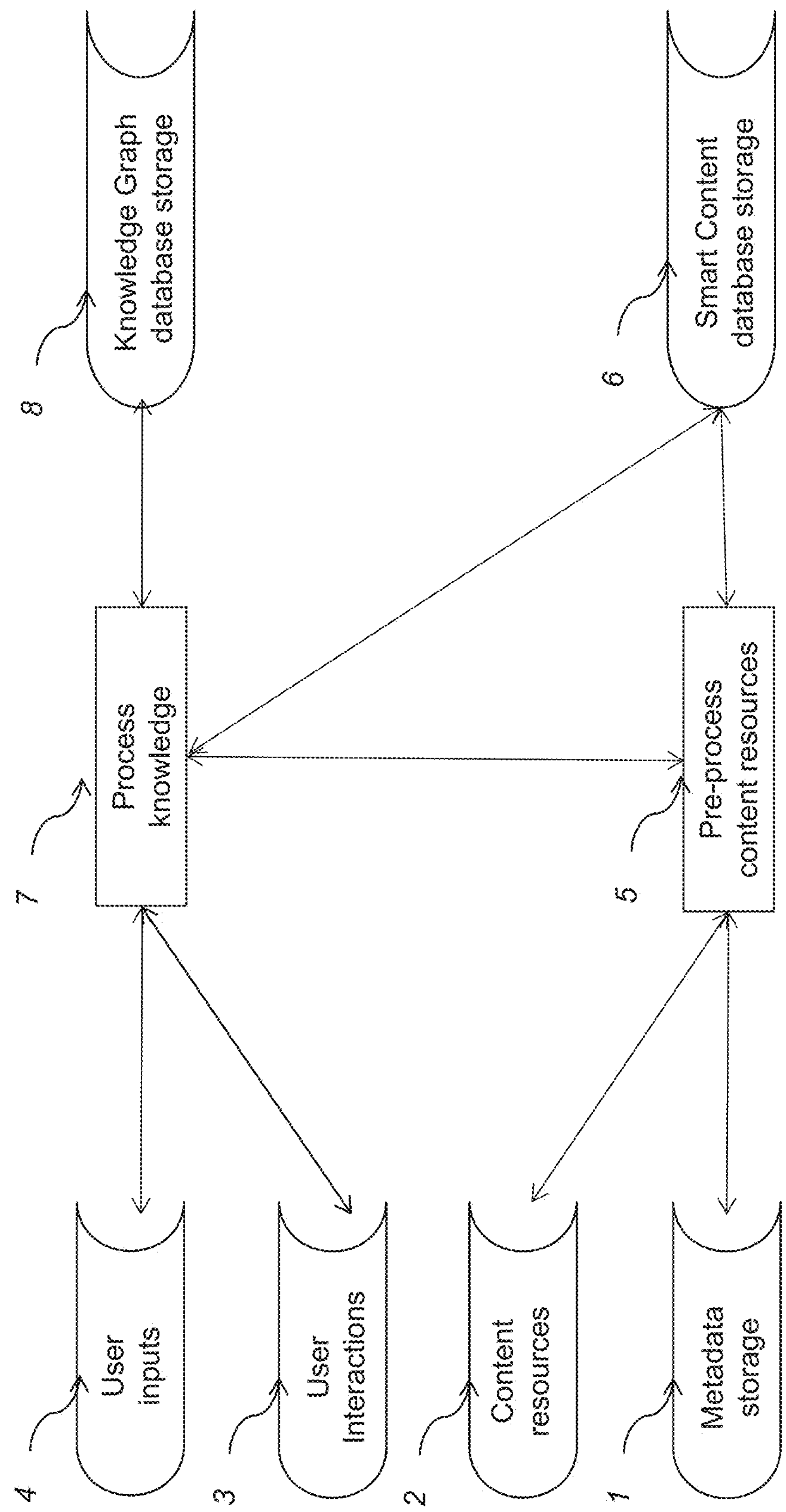
FIG. 1 shows a block diagram of a first embodiment of the invention having methods for acquiring, managing, storing and making accessible content and knowledge.

The following description is presented to enable a person of ordinary skill in the art to make and use the various embodiments. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the present technology. Thus, the disclosed technology is not intended to be limited to the examples described herein and shown, but is to be accorded the scope consistent with the claims.

Embodiments of the present invention provide users with simplified access to knowledge about "entities." Entities include all things humans can uniquely recognize, name and interact with, including for example: people, places, companies, schools, restaurants, events, ideas and much more. Entities may include everything one can see, hear, touch, feel or imagine.

Embodiments allow users to find and select entities of interest and interact with them, using "smart interaction modules" ("SIMs"), modular, integrated computer-implemented methods for interacting with entities.

Embodiments of the invention discover, organize, store, manage, utilize and make accessible multiple types of knowledge from multiple sources about multiple types of entities.

These embodiments have methods for creating and managing a specific group of entities called "content,' such content comprised of collections of words, images and auditory and visual media humans can experience, interact with and consume. Examples of content entities include, for example: news articles, tweets, blogs, office documents, eBooks, images and videos. Content entities may be complex structures, and always relate to one or more instances of unitary entities.

Any entity may have "symbolic objects" that represent it (for example, the entity "Abraham Lincoln" can be represented by a written or spoken word or phrase, a nick name, an ID, a code, an image or a video, etc.).

In an embodiment of the invention, users can select and interact with an entity of Interest simply by touching any symbolic object representing that entity. In other embodiments, users can click on or speak the name of a symbolic object or entity to select it for further interactions. These embodiments provide users with a simple one step process for accessing knowledge about entities and provide users a "Touch . . . and Know" or "Speak . . . and Know" experience.

An embodiment allows users to select entities of Interest by browsing lists or galleries of symbolic objects, each symbolic object representing an entity, and then selecting a symbolic object of interest from the list or gallery.

An embodiment allows users to select an entity by entering a search request in a user interface and interacting with Intelligent Agents. As the user begins entering a search request, methods activate an Intelligent Search Agent that starts analyzing the search request and initiates direct bi-directional communications with a "knowledge graph," a networked database having encoded, sharable knowledge about entities. If the Intelligent Search Agent determines that the knowledge graph contains more than one entity meeting the user search request parameters, it opens a visual panel in the user Interface and displays a list of such possible entities, along with knowledge about them, including: the names of the entities, and for each of the named entities additional knowledge about the entity, including its "entity group," for example "Person," denoting a broad category for the possibly matching entity; its "entity type," for example, "Actor," denoting a more narrow category for the possibly matching entity; and "knowledge markers", specific properties that, when viewed by the user, can help the user select a specific entity of Interest. Enabled to see such specific knowledge about each possible entity meeting their search request, users can disambiguate among them and select their specific entity of interest by touching it or clicking on it or speaking its name.

An embodiment allows a user to select a symbolic object embedded in any content displayed in the user interface or presented to the user via spoken words. Selecting any such symbolic object activates an "Intelligent Interaction Agent" that has direct-networked access to knowledge in the knowledge graph about the selected symbolic object, and the entity it represents. The Intelligent Interaction Agent, when activated, automatically performs several tasks for the user, including: retrieving knowledge about valid methods by which the user can interact with this entity, presenting a menu in the user interface from which the user can select how they wish to interact with this entity, and populating the menu with valid interaction options applying to this specific entity.

An embodiment includes a large library of "Smart Interaction Modules" (SIMs), that allow users, for example, to: read and interact with news; upload, organize, manage, view and interact with images and videos; read and interact with eBooks; view and interact with office documents; interact with a restaurant to reserve a table; find an event and interact with it; post a tweet; receive and view tweets about entities of interest and interact with them; post an update to a social network; receive, view and interact with updates from a social network and many other types of interactions with entities.

Embodiments of the invention have utility for supporting a wide range of user activities, including: learning about things; watching TV and interacting with people, places, events and ideas shown on a TV program; listening to a radio station and interacting with anything spoken or played; planning travel; buying and selling things; obtaining and providing personal and business services; investing and managing investment; creating, sending, receiving and interacting with messages about anything; managing and interacting with network connected devices and responding to the signals they create and transmit; analyzing "big data" resulting from methods that integrate content, interactions and analytic capabilities; and many more activities.

In an embodiment of the invention, the user interface allowing users to select and interact with entities consists of a single page, having panels that dynamically adapt to bring the user knowledge, content and other resources he or she seeks.

FIG. 1 shows a block diagram of a first embodiment of the invention having methods for acquiring, managing, storing and making accessible content and knowledge. All components in the invention are connected in a large network.

In an embodiment, "metadata" 1 is stored in a database such as MySQL in data structures that insure its consistency and integrity. The metadata includes lists 9 and tables 10 helpful to or necessary for categorizing and managing knowledge and "smart content."

In an embodiment, methods pre-process a variety of content resources 2 wherein said methods transform such content resources into "smart content" 6 i.e. coherent rationalized content that contains embedded knowledge about itself in a specific component of each smart content record.

In an embodiment, users interact with variables stored in the knowledge graph and the smart content database using a touch screen enabled device having a user interface that adapts responsive to: user inputs; variables stored in the user's device or available to the user's device, such as geo-location, movement, orientation, etc.; knowledge about the interests of a user stored in the knowledge graph and in the user's device; and knowledge about the past interactions of the user with various entities. The system encodes these user interactions 3 as behavioral knowledge in the knowledge graph.

In an embodiment, users contribute various types of knowledge to the Intelligent Internet system by directly contributing inputs to the system 4. Users may contribute many types of knowledge individually and collectively to the Intelligent Internet system, including, for example: questions and answers, opinions, how to's, procedures, guidelines, reactions both positive and negative, specifications of items or services they want or have to offer. The Intelligent Internet system may evaluate this knowledge, and correlate it to other knowledge to help establish its credibility. For example, the user may contribute a review about a restaurant, and the system may correlate this to knowledge stored elsewhere in the knowledge graph indicating the user has visited this restaurant, along with the number of times visited.

In an embodiment, methods pre-process content from content resources 2 and transform the content into smart content that it then stores in the smart content database 6, such methods including: standardizing and normalizing file types of the content, converting various file types into "standardized file types" efficiently supported by the system; standardizing and normalizing names for content properties; and standardizing and normalizing data types using data conversion methods, such as are implemented in various commercial open source tools as Spring data, into standard data types.

In this embodiment, methods convert resource file types, for example, PDF formatted files, into standard file types well understood by the system, such as HTML, XML, ePub3 or other widely used, easily managed and easily displayable standard file formats.

In an embodiment, methods convert Microsoft Office resource files, such as Word, Excel and PowerPoint files, into standard file types well understood by the smart content database 6, into file types such as, ePub3, In an embodiment, methods create "smart content" records and store these records in an enhanced version of a commercial or open source document database, such as MongoDB. This embodiment supports the storing of smart content in either structured or unstructured formats, or any mix thereof.

In an embodiment, methods transform content into "smart content" by organizing content records into smart content records, each such smart content record having embedded record components that include knowledge about the content, including: 1) a component having content metadata knowledge, 2) a component having content knowledge maps, 2) a component having content permissions knowledge, 3) a component having one or more content summaries and 4) a component comprised of the original content objects from content sources.

An example of content metadata knowledge component embedded in a smart content record may include such data as: Title of the content, author(s) of the content, Publication date of the content, publisher of the content and editor(s) of the content.

An example of a content knowledge map component embedded in a smart content record may include, for example: 1) a computer-generated unique entity ID (i.e. a unique random ID applying only to this content record); 2) an entity name (for example, the title of the content); 3) an entity group name (the default value for all smart content is "content"); 4) an entity type name (consisting of the name of a valid content type as listed in the metadata); 5) an author name for each author of the content; 6) a unique entity ID for each author of the content; 7) a unique entity ID for the resource supplying the content; and 8) a "timestamp-published" property recording the date and time the content was published, etc.

An example of a content permissions knowledge component embedded in a smart content record may in include such data as: 1) a "timestamp-authorized-release" content property, designating the date and time the content may first be released; 2) a "timestamp-end-of-life" content property designating the date and time further access shall be blocked; and 3) the entity ID of any user(s) or groups of users authorized to access this smart content record.

Examples of a content summaries component in the smart content record may include an "alert summary," consisting of a knowledge map component, knowledge permissions component and a summary of the content component, which may consist, for example, of 100 characters, sufficient for a user to get the gist of what the full content is about.

An example of a content object component in a smart content record would be the original content from the content resources 2, and such content may be enhanced to include embedded hidden knowledge tags containing a method for accessing knowledge in the knowledge graph about known symbolic objects in the content object.

In an embodiment, functions combine the capabilities of a document database such as MongoDB with those provided by software drivers, such as "Reactive Mongo," allowing the smart content database to quickly respond to requests for smart content related to an entity and outwardly stream results from such requests for such smart content in a fully asynchronous, fully non-blocking manner in real time to a large number of clients simultaneously. In this embodiment an intelligent monitoring agent may represent the interests of one or more users related a specific type of content about a specific entity.

In an embodiment methods process knowledge about entities 7, wherein such methods find and recognize knowledge about symbolic objects embedded in the content resources 2; process logs of user interactions 3 with such symbolic objects, process user inputs 4 that contribute to the knowledge about an entity 4 and encode and store the resulting knowledge in a "knowledge graph;" also referred to herein as "knowledge graph storage 8.

In an embodiment, methods: recognize "symbolic objects" (i.e. objects that represent entities, including words, phrases, codes, IDs, images and videos, etc.), embedded in or referred to in text files, image files, video files and other types of content files from content resources 2; compare and contrast data related to the recognized symbolic objects to establish confidence levels about the entities recognized; and add knowledge tags to these symbolic objects, each such knowledge tag, for example, comprised of at a minimum: a unique entity ID for the entity; the name of the entity group classification for the entity (for example, "Person"); and the name of the entity type (for example, "Physician") classification for the entity.

In an embodiment, "knowledge" about entities, entity properties, entity relationships and entity relationship properties is stored in the "knowledge graph storage," 8 a graph database customized and optimized for storing knowledge.

In this embodiment, methods enhance and transform a standard implementation of a commercially available graph database, such as Neo4J, into a customized knowledge graph that includes unique properties, rules and methods that allow optimization of the graph database to efficiently store, manage and access all types of knowledge about entities.

In this embodiment, all components of the knowledge graph have specific utility related to storing knowledge about entities: graph nodes represent entities; graph node properties represent entity properties; node relationships represent relationships among entities; and relationship properties represent properties associated with relationships among entities.

In this embodiment, all components of the knowledge graph have specific utility related to storing knowledge about entities: graph nodes represent entities; Node properties represent entity properties; Node relationships represent relationships among entities; and relationship properties represent properties associated with relationships among entities.

In an embodiment, each of the nodes of the knowledge graph are constructed using knowledge property templates, which specify "knowledge markers," i.e. a set of properties that, when considered as a whole, uniquely identify an entity and allow disambiguation among entities, each such set of knowledge markers varying according to the entity group and the entity type of the entity, and each such set comprising at least: an entity id, an entity name, an entity group name for the entity and an entity type name for the entity, plus other properties relevant to the entity group and entity type of the entity. For example, an entity having an entity group name "Services" and an entity type name "Restaurants," may have a set of knowledge markers for restaurants such as "geo-location," "country," "province/state," city," "street address," "phone number," "cuisine," "reservations flag," "delivery flag," etc. The knowledge markers for entity types such as "attorneys," "high school," "rivers," "blogs," "religious beliefs," etc. will all have differing sets of knowledge markers, that when presented as part of a list of entities to a user, will allow the user to immediately know which entity is the one he or she is interested in, and subsequently allow a search engine to find content about only the entity of interest to the user, eliminating content related to other entities having similar names, allowing a collaboration between users and machine algorithms, and making the search process more efficient for the user.

In an embodiment, relationship among nodes of the knowledge graph are constructed using knowledge relationship templates, comprising an entity relationship name for the relationship between the two entities connected, an entity relationship type name and entity relationship property names, varying according to the set of entity groups or entity types connected, along with the sequence in which they are listed. For example, a relationship between an entity having an entity group "Person" and an entity type "User" and another entity having an entity group "Content" and an entity type "News Article" may have relationship properties specific to this specific pairing of entities such as "read", "shared," "annotated," etc.

In an embodiment, smart content records in the smart content database have an embedded record component called a "knowledge map," comprising properties aligned with their corresponding entity node in the knowledge graph, such alignment including, for example: use of the same entity id for the smart content record and its corresponding entity node, as well as the same entity group name, entity type name and other properties specified as knowledge markers for this entity group and entity type. For example, the smart content record for a "News Article" would have a corresponding node in the knowledge graph for an entity having an entity group "Content" and an entity type "News Article," and both the smart content record and the node in the knowledge graph may have properties for "author name," author entity id," "date published," etc. The smart content record may also contain additional properties not included in the knowledge graph.

In an embodiment, various methods are applied to add to and/or update the knowledge graph, including adding or updating entity nodes, entity properties, entity relationships and entity relationship nodes. Additional methods are applied to add to or modify associated smart content records.

Figure 2:
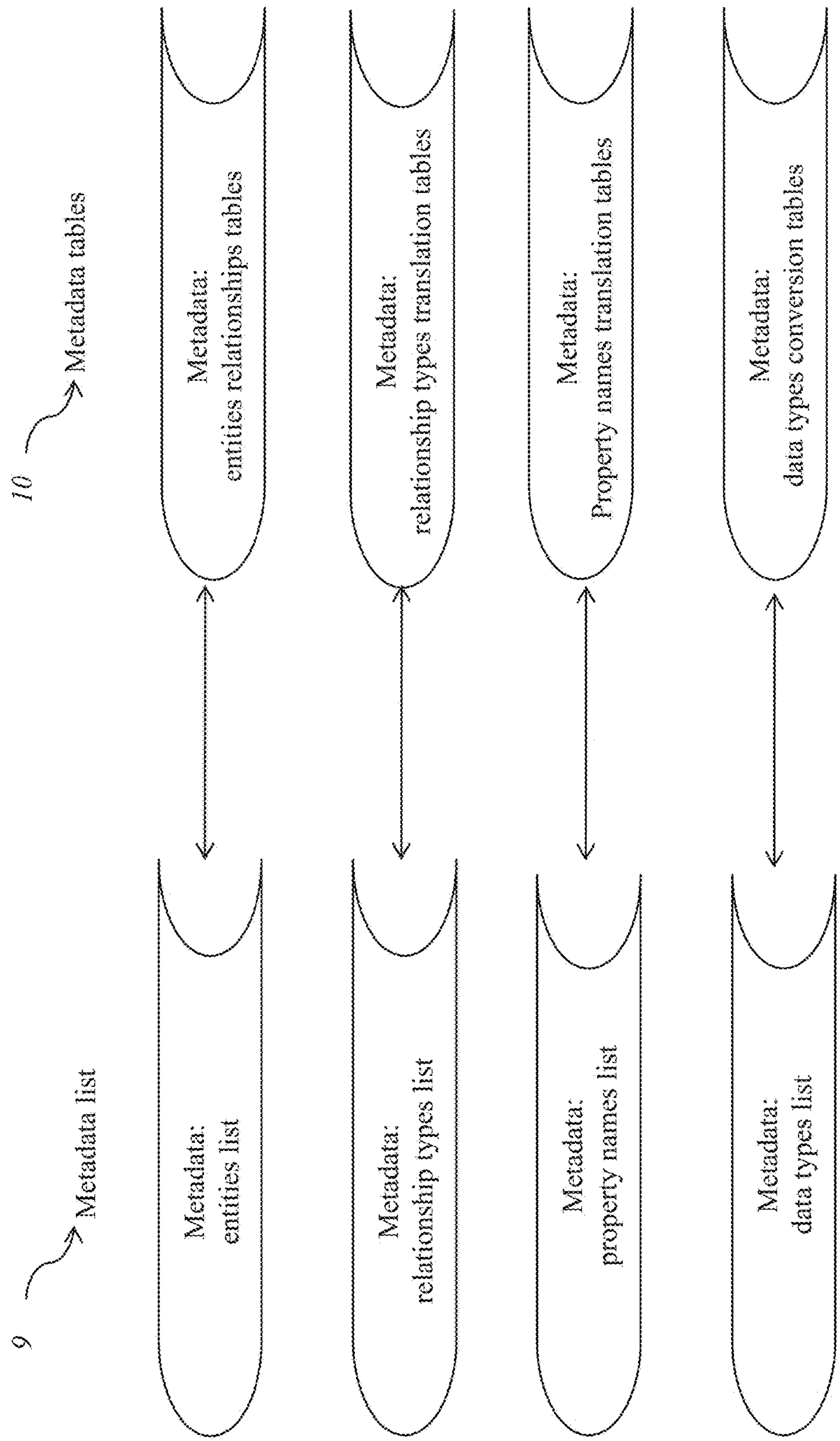
FIG. 2 shows a block diagram of an embodiment having methods for storing metadata components.

FIG. 2 shows a block diagram of an embodiment having methods for storing metadata components. This metadata is used by methods for standardizing the categorization and organization of knowledge. Such metadata includes: metadata lists 9 containing metadata elements and metadata tables 10 linking metadata elements to other metadata elements.

In an embodiment, metadata lists 9 include: lists of classification categories, interaction methods, intelligent agents, resource providers and entities.

In an embodiment, metadata tables 10 link items in metadata lists 9. Examples of such linked metadata include: entity types to entity groups; entity types to entity properties; entity types to entity markers; entity types to entity interaction methods; content types to file extensions; content types to content groups; content types to default entity Interaction Methods; resource property names to content objects; and standardized property names to content objects. For example, a table may consist of the names of properties as designated by a content resource called "Geonames," the names of properties as designated by a content resource called "DBPedia," and the standardized names of properties as designated in the Metadata, allowing for computerized rationalization of content from Geonames and DBPedia, and the storing of properties for content from such resources in the knowledge graph database and the smart content database in a normalized manner.

Metadata may be stored, for example, in a relational database such as MySQL, in order to insure the integrity of the metadata lists and mapped metadata.

Figure 3:
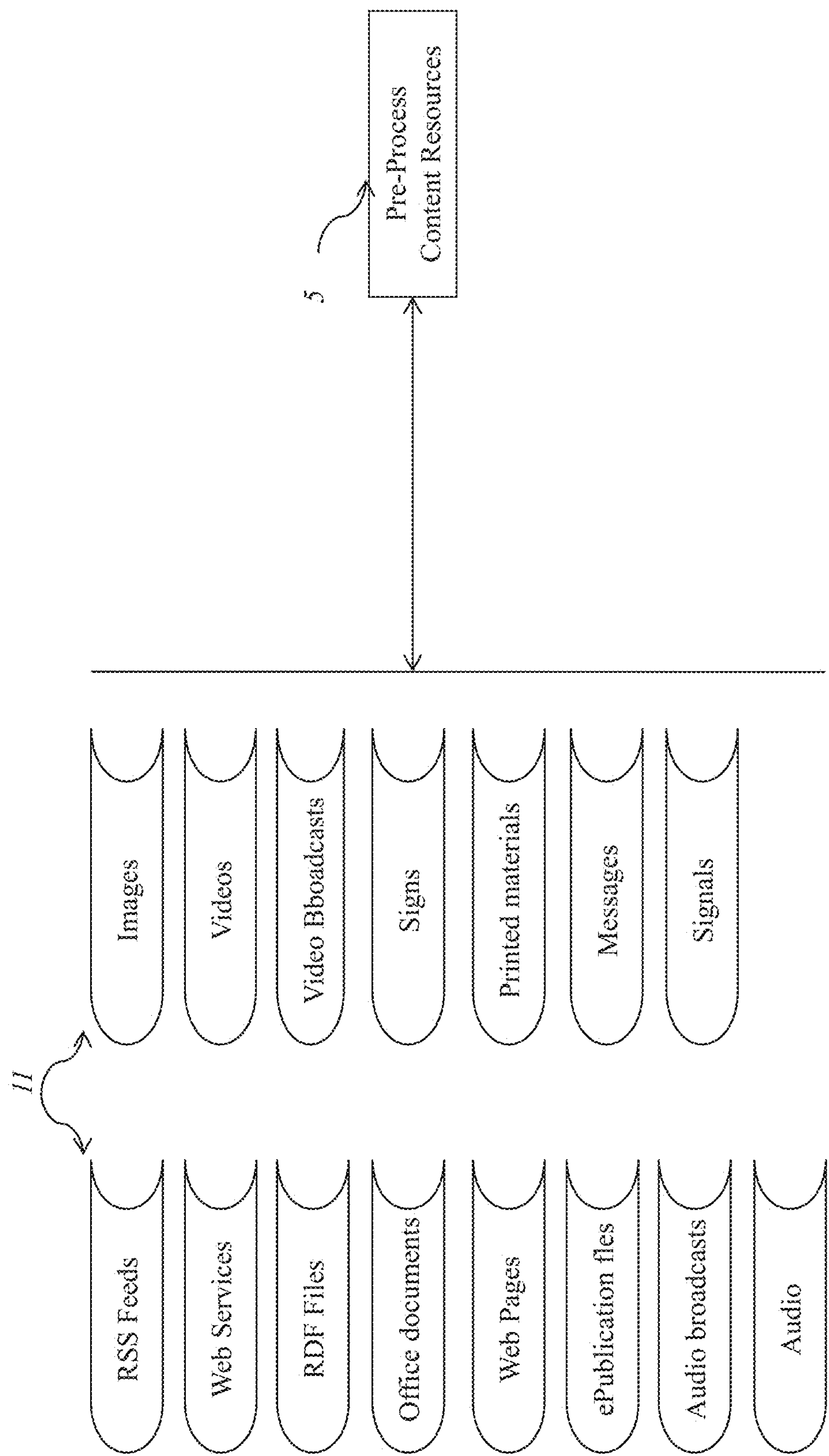
FIG. 3 shows an embodiment having methods for obtaining content and services from multiple types of content resources.

FIG. 3 shows an embodiment having methods for obtaining content from various resources. Embodiments include methods for processing such diverse content resources 11, for example, as: RSS Feeds, tweets, messages, images, videos, computer readable files, office documents, ePublications, Web Services data, Open Linked content ("RDF Files") data, as well as imaged print content and other types of content resources.

Figure 4:
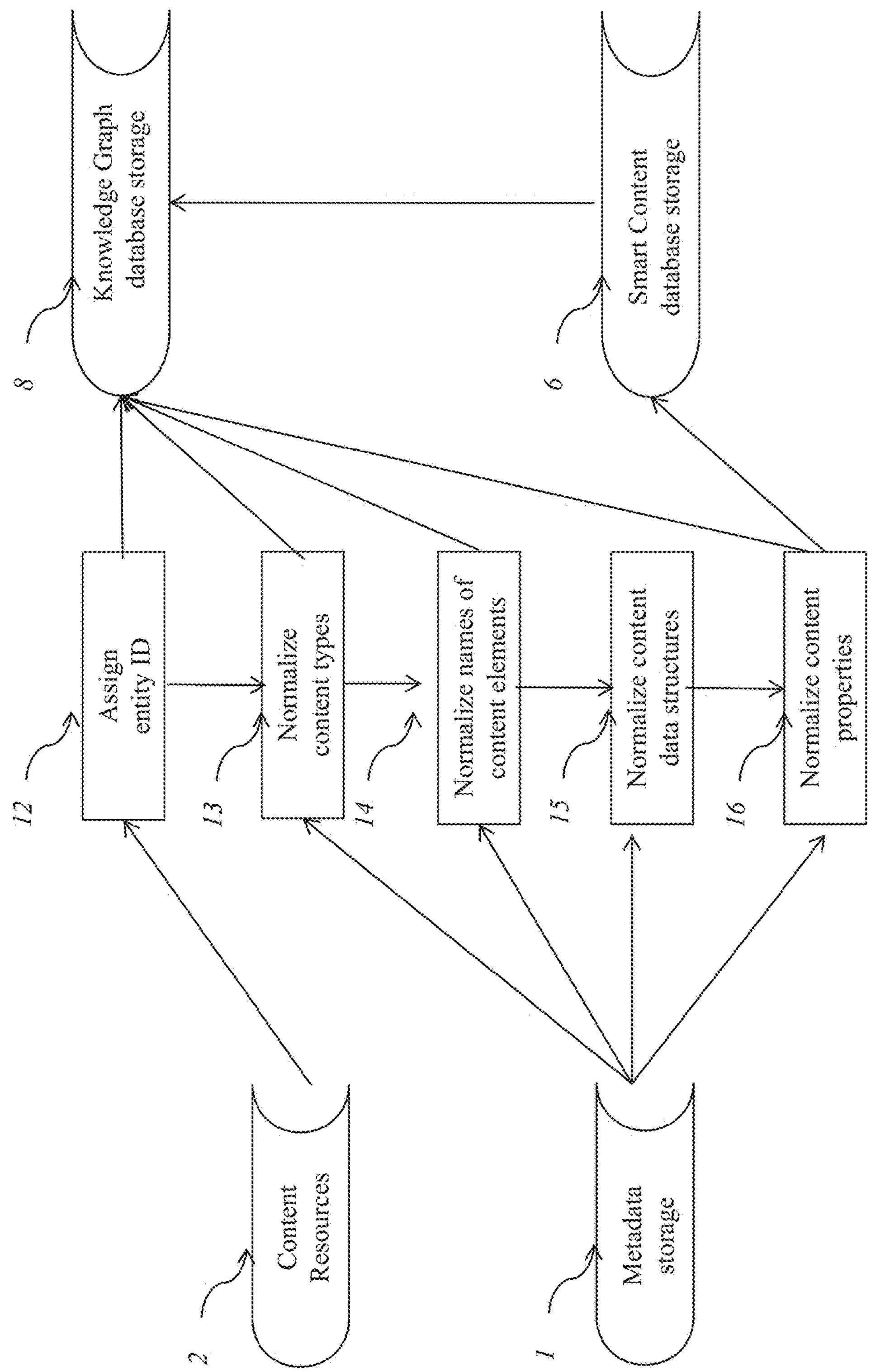
FIG. 4 shows an embodiment having methods for rationalizing content resources and making them available to the Intelligent Internet system.

FIG. 4 shows an embodiment having methods for rationalizing content resources 4 and making them available to the Intelligent Internet system.

In this embodiment, methods process content files from the content resources 2 to assign an entity ID for each unique content file 12, recognize content types for each unique content file 13, assign knowledge tags to symbolic objects in the content resources 2, creating smart content that is stored in the smart content database 6. In this embodiment the knowledge tags do not act as pointers to a file having a specific URL, as do hypertext tags supported by the World Wide Web and Web browsers, but point instead to a node in the knowledge graph, allowing a user direct access to knowledge about tagged objects upon indication of interest by the user.

In this embodiment, methods reduce the number of file types by converting various file types implemented in content from the content resources 2 into file content types 13 implemented in smart content records, such conversions using conversion maps defined in the metadata 1. An example would be converting a .jpg or .img file type into a content type of "image."

In this embodiment, methods normalize content elements names 14 for data elements in the original content, converting them into standard property names as implemented in the smart content database 6, using conversion tables defined in the metadata 1. An example would be converting a data element name "Publication date" into a standardized data element name "date published, thus simplifying downstream indexing and search methods In this embodiment, methods normalize content data structures 16 from the original content in the content resources 2 into standardized data structures in the smart content database 6, using conversion tables defined in the metadata 1.

In an embodiment, the knowledge stored in the knowledge graph database 8 and the smart content stored in the smart content database 6 shares the same entity ID. When a content record is added to the smart content database 6, methods add a corresponding entity node to the knowledge graph database 8. Methods allow linking the entity node record and its corresponding smart content record, by utilizing the same entity ID for access to the smart content database 6 and the knowledge database 8. Methods align the content properties 16 of these two records, for example, the entity group, the entity type and other properties.

Figure 5:
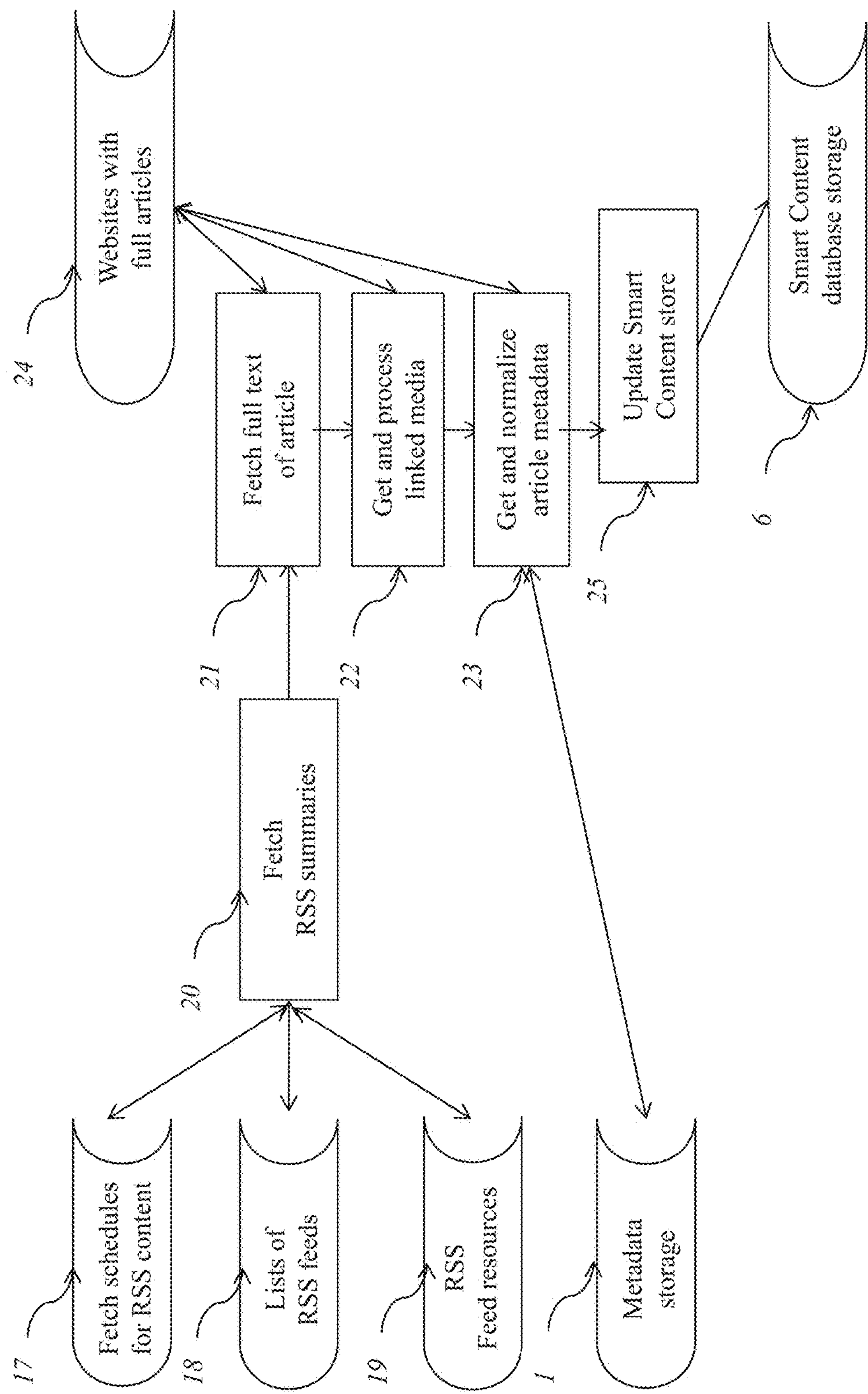
FIG. 5 shows a block diagram of an embodiment having methods for processing RSS content resources.

FIG. 5 shows a block diagram of an embodiment having methods for processing RSS content.

In an embodiment, methods fetch RSS summary records 20 from RSS feed resources 10 by sequentially going through a list of RSS feeds 18 known to the metadata. Fetches of such records are governed by fetch schedules for RSS content 17, also known to the metadata. For example, the system may fetch records from a BBC Sports RSS Feed every 3 minutes, and news feed about a neighborhood in Wichita, Kans. every day.

In an embodiment, methods: obtain the full text of an article 21 from a property in the RSS XML record that provides a hypertext link to the original article; obtain a list of links to images, videos and other files related to the article 22; and using the links, download such files, add them as records in the smart content database and as entity nodes in the knowledge graph.

In an embodiment, the standard XML properties in an original RSS summary record are mapped to the entity properties in an smart content record 23, such entity property names and data structures adhering to a template stored in the metadata 1.

In this embodiment, methods fetch records from URLs pre-defined in a metadata list of RSS feeds, each such URL in the metadata list having previously: been assigned a unique entity ID; having a Node created in the knowledge graph; and this Node having been linked in the knowledge graph with the entity Node designating the resource. In addition, each such resource having been previously assigned a unique entity ID and having an entity Node created in the knowledge graph.

In this embodiment, the smart content record in the smart content database 6 includes an entity ID for the RSS source content object, an entity ID for the RSS URL, and an entity ID for the RSS resource that has published the RSS content and entity IDs for each of the authors of the RSS content object. In this embodiment entity nodes in the knowledge graph database 8 are updated with relationships between the entity nodes for each of the above-mentioned entities.

In an embodiment, methods obtain metadata tags associated with the full text of an article summarized in an RSS feed, such metadata including Schema.org tags, rNews Tags and microformat tags. Methods have previously mapped these standard metadata tags to standard entity properties in the metadata. Methods store the values in these metadata tags 25 in a component of the smart content record for the RSS content object for the article.

Figure 6:
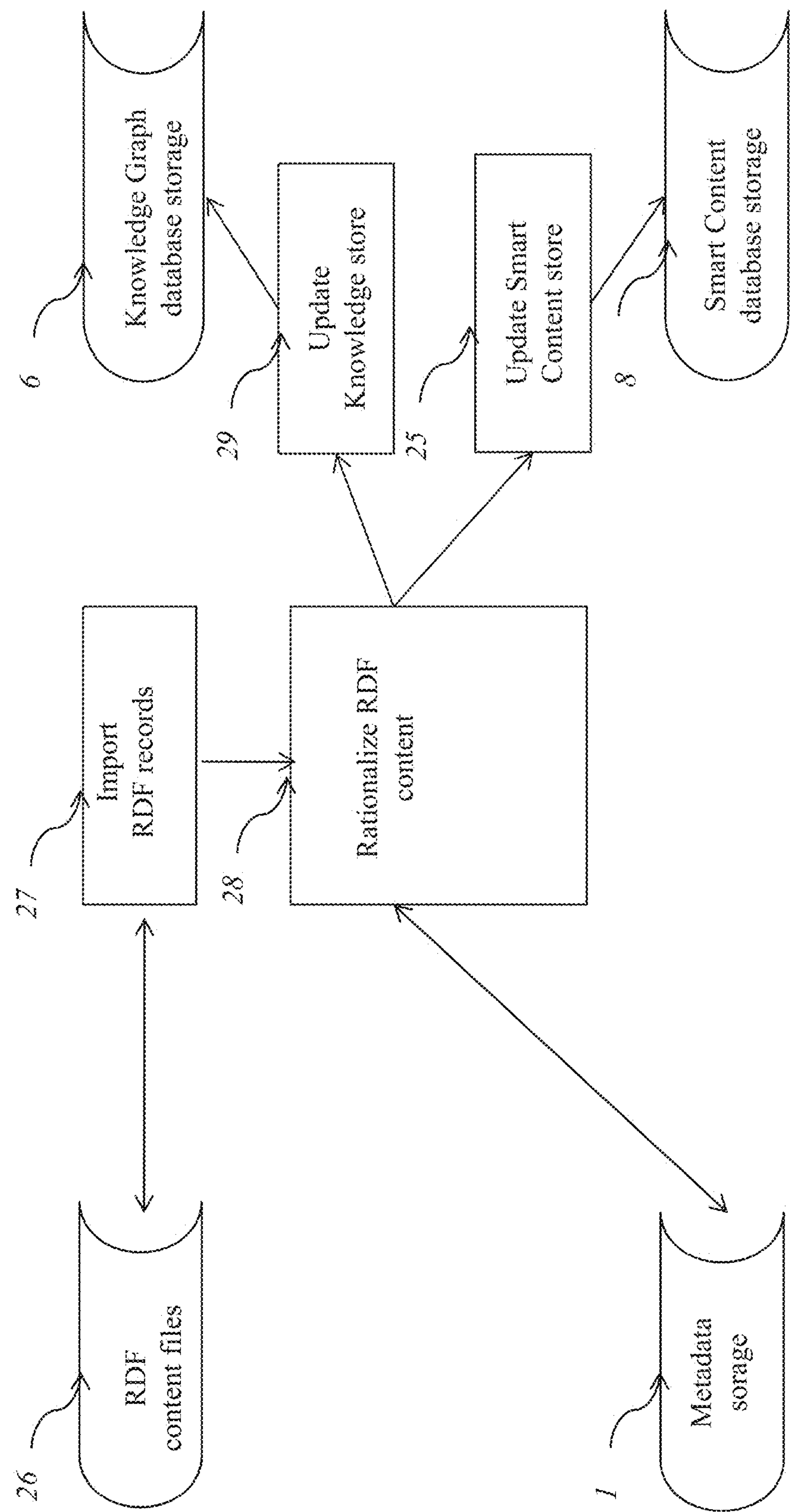
FIG. 6 shows a block diagram of an embodiment having methods to RDF content resources.

FIG. 6 shows a block diagram of an embodiment having methods to process RDF content.

In an embodiment methods import RDF file records 27 into a temporary storage space and rationalize the RDF content 28.

Examples may include importing various RDF datasets, such as those provided from DBPedia, a content resource 2 which stores semantic knowledge (i.e. knowledge about entity facts and entity relationships) found in Wikipedia and those provided by Geonames, a content resource 2 which stores semantic knowledge about millions of places. Various such RDF datasets may use different names for entity types. This embodiment rationalizes entity types names using a conversion table in the metadata storage 1.

This embodiment then updates the smart content database 25, and updates the knowledge database 26 with the normalized content.

Figure 7:
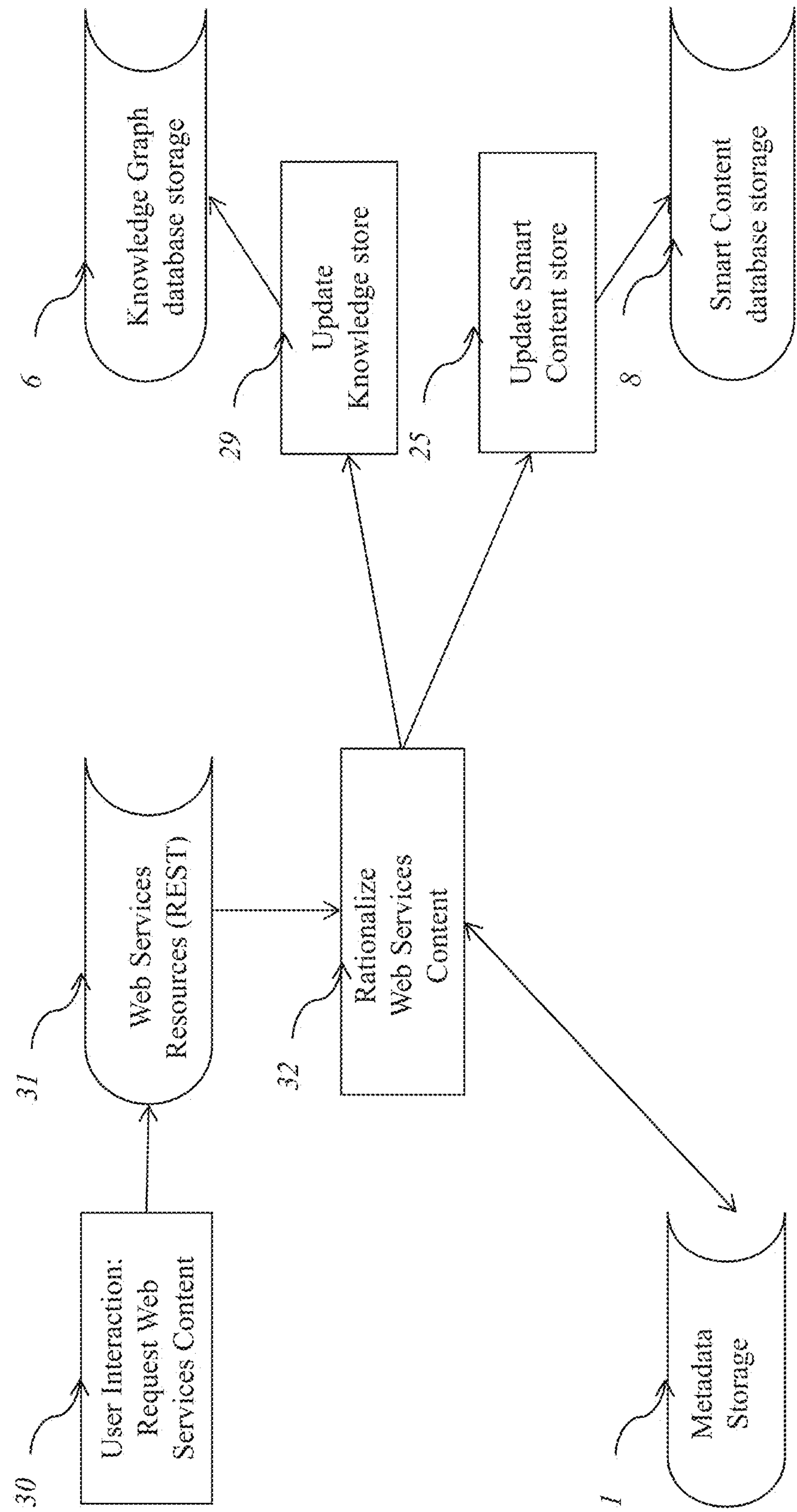
FIG. 7 is a block diagram showing an embodiment, having methods for processing content from Web Services resources.

FIG. 7 is a block diagram showing an embodiment, having methods for processing content from Web Services resources.

In an embodiment functions respond to a user Interaction 30 by accessing Web Services content resources via a REST interface 31.

Examples of Web Services users may wish to access include: YouTube, Google Search, Google Books, Yahoo Finance or any of thousands of other Web Services resources.

Various such Web Services may use different names for data elements they provide. An embodiment has methods for rationalizing the names of such data elements 32 from conversion tables in the metadata storage. For example, an image from one Web Service may have a property named by the Web Service as "Creator" while an image from another Web Service may have a property named by the Web Service as "Photographer." This embodiment would rationalize the names of these properties into a standardized name used by the system to simplify further access and processing.

This embodiment then updates the smart content database 25, and updates the knowledge database 26 with the normalized content.

Figure 8:
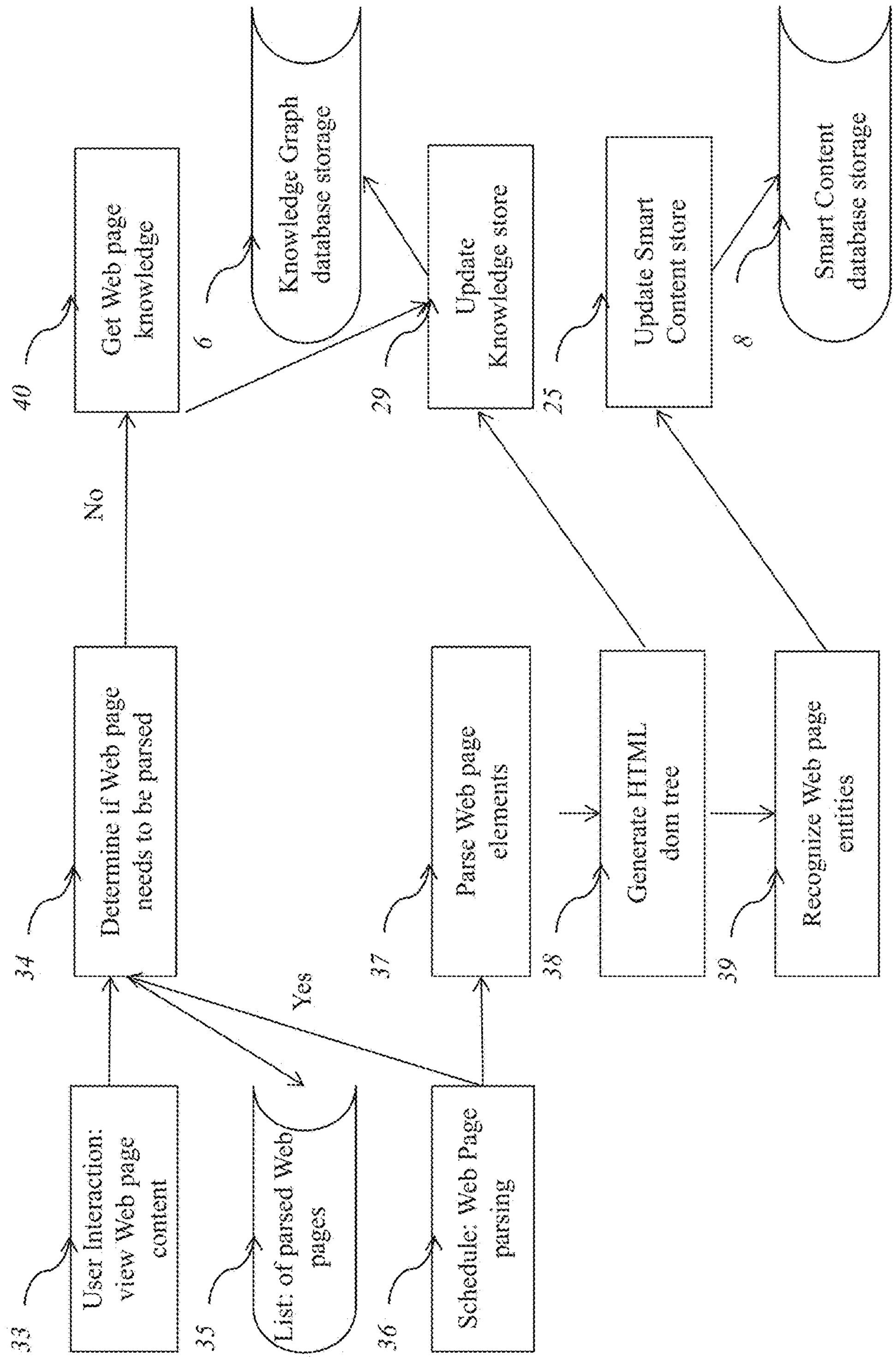
FIG. 8 shows a block diagram of an embodiment having methods to process Web pages content resources.

FIG. 8 shows a block diagram of an embodiment having methods to process Web Pages content. In an embodiment, methods respond to a user Interaction requesting access to the content on a Web Page 33.

In this embodiment, functions determine if the content on this Web page has been previously processed by the system 34 by accessing a list of previously parsed Web pages 35. Functions determine if the current Web page needs to be parsed and processed into smart content and knowledge about the contents of the Web page 34 by comparing characteristics of previously parsed Web Pages 35 with smart content stored in the smart content database 8.

If the Web page(s) content needs to be processed, functions schedule the Web page content for parsing 36, then parse the Web page elements 37 to generate an HTML Dom Tree 38. Functions then analyze this content to recognize entities associated with the content 39 using any of a variety of named entity recognition services or applications, for example, the Web Service Open Calaise.

If the Web page(s) content has already been processed, functions get access to knowledge about the content using the entity ID(s) of the smart content record(s) about the Web page(s) 40 from the knowledge graph storage 6 and update the knowledge Store 29 to reflect the user's interaction with the Web page content.

Figure 9:
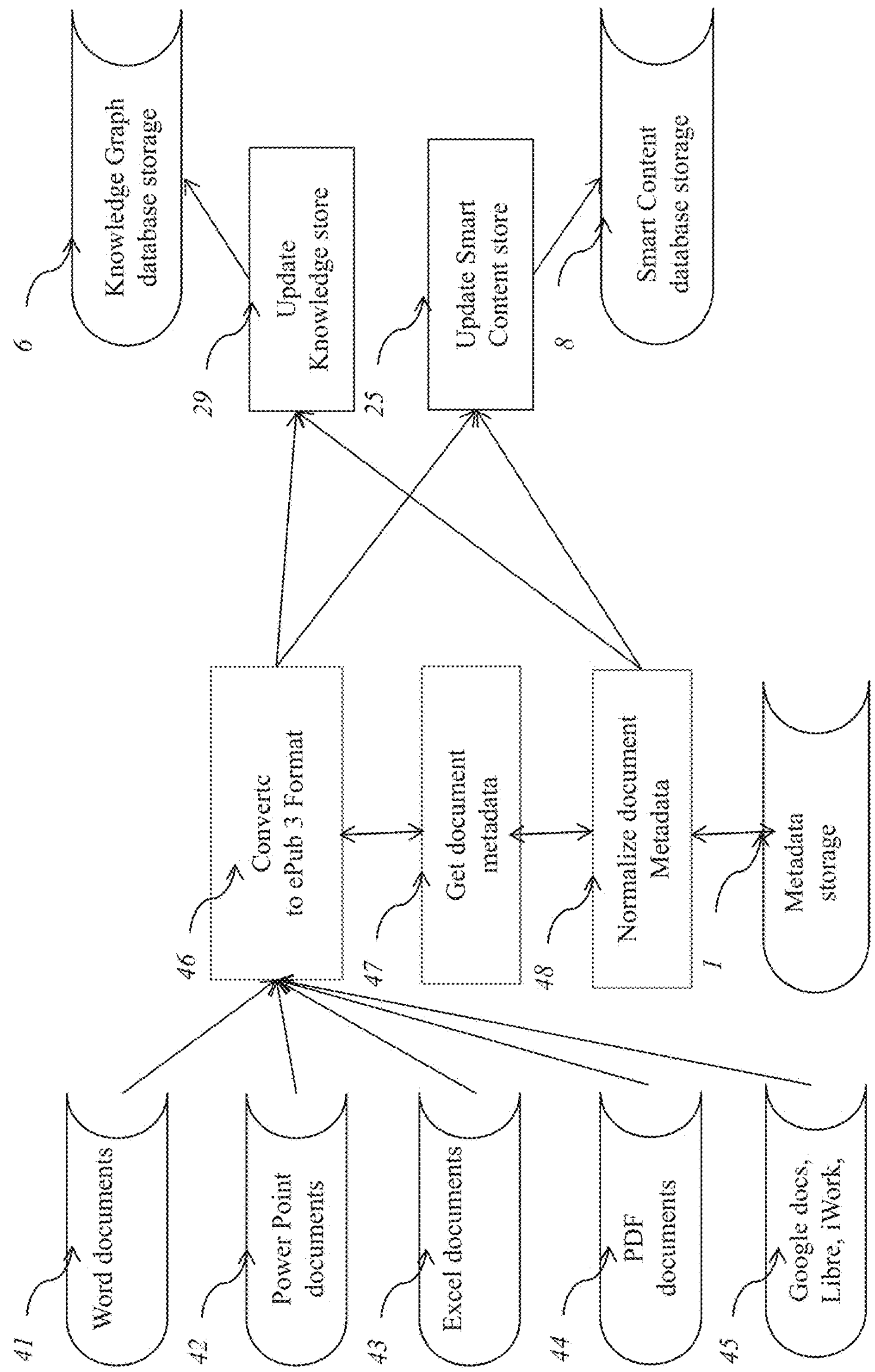
FIG. 9 shows a block diagram of an embodiment having methods for processing office documents content resources.

FIG. 9 shows a block diagram of an embodiment having methods for processing office documents content.

In this embodiment, methods upload office documents; recognize data objects in the content from the resource; and add knowledge tags to the data objects to create a smart content object.

In this embodiment, methods recognize and convert Word documents 41, Power Point documents 42, Excel documents 43 and PDF documents 44, Google Docs, Libre Docs and iWork Docs 45 into a standardized open file format, such as that supported in Office Libre; convert these files into standardized file types, such as for example, ePub3 files 46; and store these files as content objects in the smart content database 6.

Methods get document metadata 47 from the original content files and normalize this metadata 48 into standard metadata elements, according to the metadata database storage 1 and store this standardized metadata in the smart content database 8. Methods then update the knowledge database to create a node for each content file, populate this node with properties such as the entity ID for the smart content file, the content type for the smart content and the entity group (i.e. "Content") for the smart content. Methods then create relationships between this smart content and other entities linked to it and update the knowledge database 29.

FIG. 10 shows a block diagram of an embodiment having methods for recognizing symbolic objects and adding knowledge tags to symbolic objects.

In an embodiment, methods recognize and create knowledge tags 49 to symbolic objects embedded in the content object component of a smart content record in the smart content database, such smart objects being processed from various content resources 2, including, for example, content from RSS Feeds; content from computer-readable files uploaded by a user; content from office documents uploaded by a user; and content from openly accessible ePub files. Each such knowledge tag consists of a non-displayed entity id for an entity represented by the symbolic object in the smart content record.

In an embodiment, methods recognize symbolic objects embedded in the content and pre-map 50 the symbolic objects embedded in the content object component in the smart content record, each such tag consisting of a non-displayed entity id for an entity represented by the symbolic object in the smart content record and each such tag mapped to the symbolic object. For example, for content coming from a Web Service "Yahoo Finance," methods map source content elements such as the "Current price" of a stock to standard content elements as defined in the metadata, and other methods responsive to a user indication of interest in the "Current price" of a stock create a tag linking this content element to knowledge in the knowledge graph associated with this content entity In an embodiment, methods create a "knowledge map" for data elements in Web Services content and RDF content, allowing such data elements to be stored as normalized properties in a knowledge map component of a smart content record in the smart content database 50.

In this embodiment methods dynamically tag symbolic objects when they appear in proprietary content, including Web pages 51. In this embodiment upon indication of user interest in a symbolic object, methods cause a popup window to display a list of entities referred to by symbolic objects in the content, with an indication of the entity or entities matching the symbolic object of interest. For example, the content presented on a Web page is typically owned by the source of the content and legal restrictions may preclude embedding tags in the content object. In this case, methods receive an indication of interest by a user in a symbolic object and cause a popup to occur adjacent to or on top of the Web page content, such popup listing the entities related to symbolic objects on the Web page, thus allowing the user to indicate their interest in a symbolic object and directly access knowledge about the entity which it represents.

FIG. 11 shows a block diagram of an embodiment having methods for recognizing and processing symbolic objects embedded in text content.

In an embodiment, methods recognize symbolic objects in content having existing URLs 52, by sending the URL to one or more Web Services that recognize named entities 55. For example, during the processing of content having an existing URL, methods may send the associated URL to a Web Service such as Open Calais or Extractiv or other such named entity recognition Web Service, or multiple such Web Services. The Web Service documents the entities it finds in such content, and returns data, including, for example the names of entities it has recognized in the content, its confidence that it has matched the symbolic objects with these entities and the entity types of the entities it has recognized In an embodiment, methods recognize symbolic objects in content not having existing URLs, by creating a smart content record 53 and sending this smart content as a text record 57 to one or more Web Services that recognize named entities 57.

In an embodiment, methods recognize symbolic objects in any content by processing this content using a commercial or open source named entity Recognition application 56 such as, for example, GATE, LingPipe, Stanford Named Entity Recognizer, Illinois Named Entity Recognizer, or any of these tools used jointly.

In an embodiment, methods get results from multiple methods for recognizing named entities and compare and rationalize the results from these multiple methods 58. For example, if multiple different methods identify "Abraham Lincoln" as symbolic objects in a news article or eBook as representations of "Abraham Lincoln, a President of the United States, methods may determine with a high probability that this symbolic object represent an entity known to the system and will update components of the smart content record 25 in the smart content database 6 and the nodes and relationships in the knowledge database 8.

In an embodiment, when multiple methods for recognizing named entities produce discrepant results 60, functions process these discrepancies using machine learning tools 61 and/or human analysis.

Figure 12:
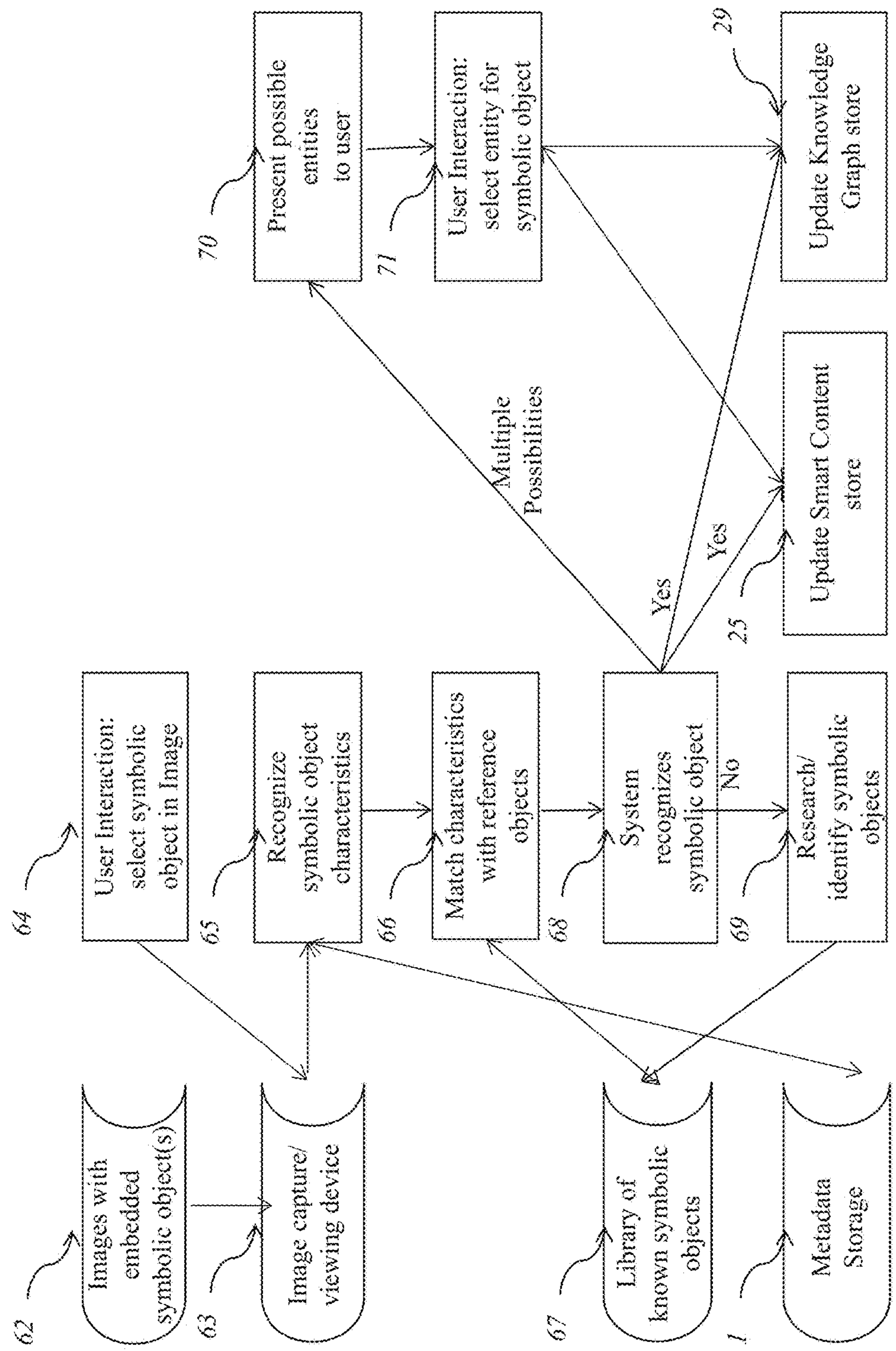
FIG. 12 shows a block diagram of an embodiment having methods for recognizing and processing symbolic objects embedded in image content resources.

FIG. 12 shows a block diagram of an embodiment having methods for recognizing and processing symbolic objects embedded in images content.

In an embodiment, methods implement "1" to "n" image recognition methods and compare and contrast the results returned. When the results are uncertain, methods provide users with knowledge markers to assist the user in deciding which entity to select. Methods allow users to link a symbolic object in an image to a specific entity.

In an embodiment, methods recognize symbolic objects representing entities embedded in images 61, such methods including multiple methods for recognizing people, places, cities, or facilities, such as stadiums, buildings; etc.

In an embodiment the user interacts with a device having functions to capture/view images 62. In this embodiment, the user selects a symbolic object in an image 63, by pointing to a region of the image on a display of the image capture/viewing device 62.

In an embodiment, methods recognize the characteristics 65 of the symbolic object in the region of interest selected by the user 64. Methods then match these characteristics 66 with those of images in a library of known symbolic objects 67. If these methods find a single match, they create or update a smart content record 25 in the smart content database 8 and update the nodes and relationships 29 in the knowledge database 6. If these methods find multiple entities matching the symbolic object of interest to the user, methods present a list of possibly matching entities to the user, along with "knowledge markers", properties useful to help the user select among these possibly matching entities 70. The user then indicates his or her choice of an entity for this symbolic object 71.

Where discrepancies remain unresolved, methods perform further machine learning to attempt to identify the entity represented by the symbolic object of interest to the user.

An example of this embodiment would be when a user points to a person in an image containing three people in front of mountain. The user may point to a region of the image showing the mountain, or to a region of the image showing a person. Methods would then determine the characteristics of the symbolic object in this region and compare these characteristics to a library of known symbolic objects; for example, a database containing previously recognized faces or previously recognized natural landscapes If the methods determine that the reference library has four faces that are similar to the one of interest to the user, it will display these four faces, along with information about each of the four people with faces possibly matching the face of interest to the user.

Figure 13:
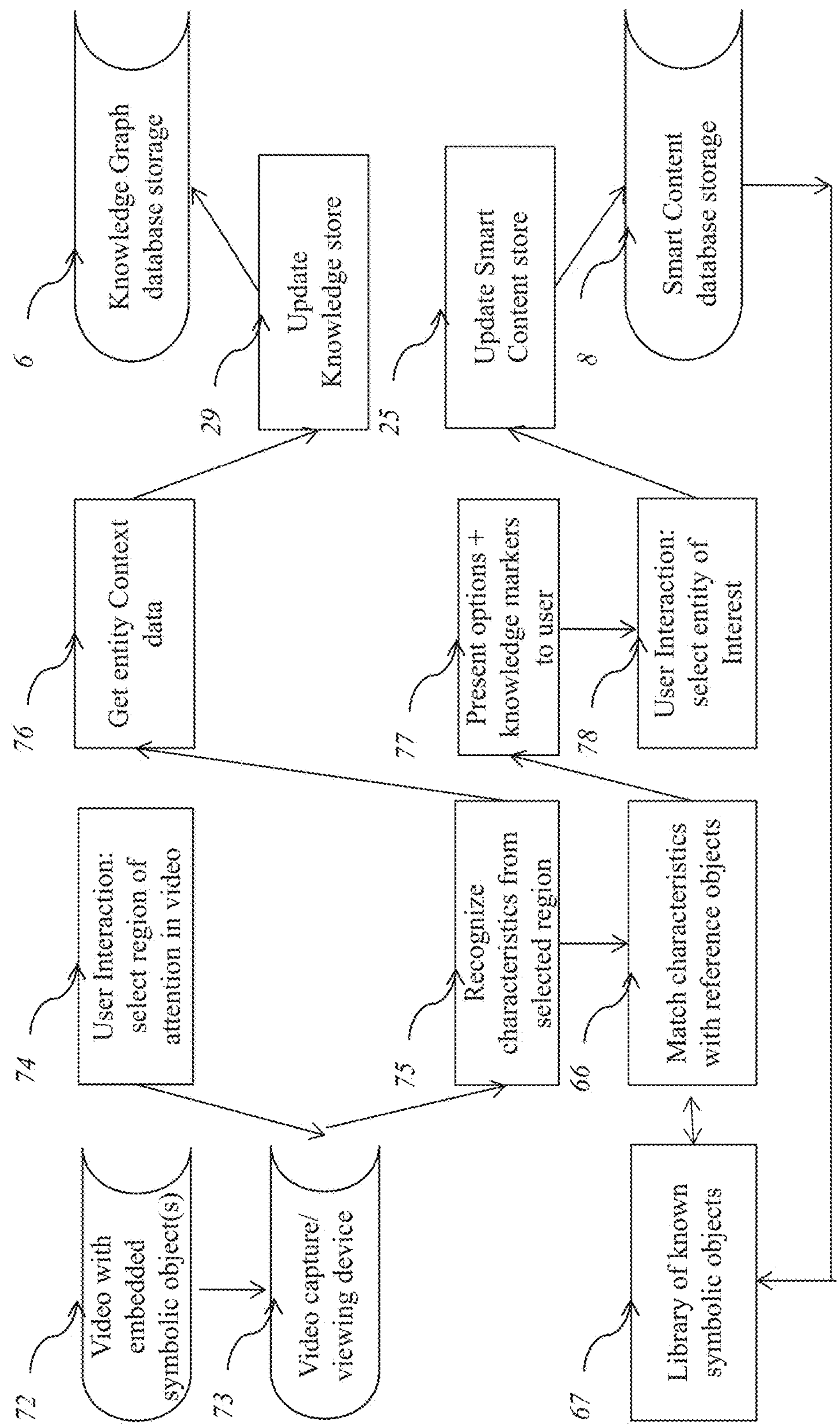
FIG. 13 shows a block diagram of an embodiment having methods for recognizing and processing symbolic objects embedded in video content resources.

FIG. 13 shows a block diagram of an embodiment having methods for recognizing and processing symbolic objects embedded in video files.

In an embodiment, methods recognize a region of attention in a video image indicated by a user, such region of attention defined by users touch-based gestures to circumscribe a region of attention, or by users point and click methods to define a region of attention.

In an embodiment, users interact with a device 73 capable of capturing and encoding a video, or capable of viewing a previously encoded video 72. In this embodiment, the user selects a region of attention in a video by touching or clicking on that region on the display screen of the device 73.

Methods recognize symbolic objects within a video 74, using algorithms such as SIFT, HMAX and/or Bayesian algorithms to determine characteristics of the symbolic object match these characteristics 66 with the characteristics of symbolic objects found in a library of known symbolic objects 67.

When methods find multiple possible entities that may match the symbolic object of interest to the user, methods provide a set of thumbnail images of such possibly matching entities and their associated knowledge markers 77 to help users disambiguate among these possible entities, and select their entity of Interest 78.

Methods get context data associated with the video from the content resource metadata 76 and update the smart content database 25 and the update the knowledge graph database 29.

Figure 14:
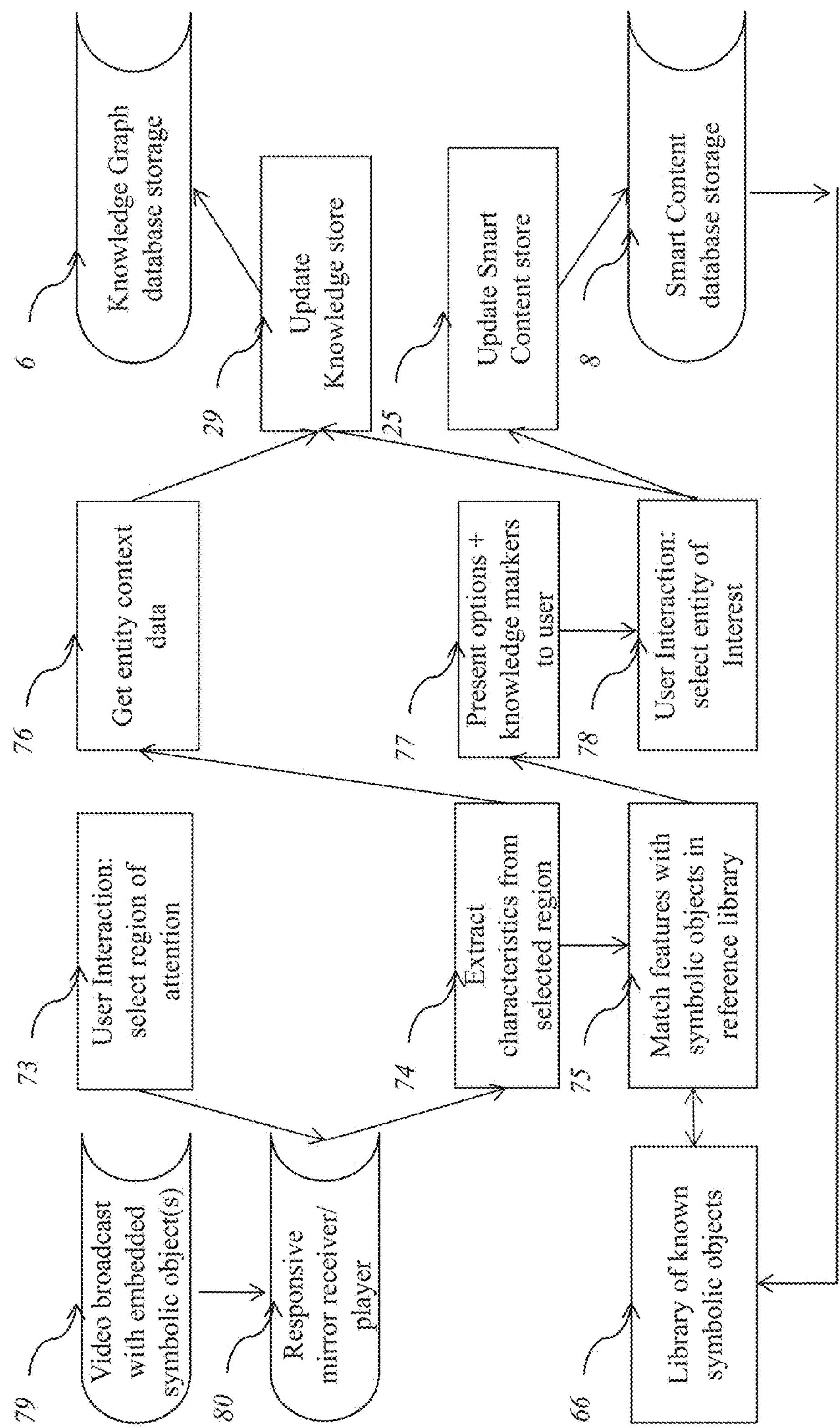
FIG. 14 shows a block diagram of an embodiment having methods for recognizing and processing symbolic objects embedded in video broadcast content resources.

FIG. 14 shows a block diagram of an embodiment having methods for recognizing and processing symbolic objects embedded in video broadcasts 79.

In an embodiment, users interact 73 with a touch-responsive device 80 capable of receiving and displaying a video broadcast 79, acting alone or as a mirror to a TV attached to a network capable of transmitting mirror broadcasts to multiple devices. In this embodiment, the user selects a region of attention in a video by touching that region 73 on the display screen of the device 80.

Methods extract characteristics from the selected region 74 and recognize symbolic objects within the broadcast video, using algorithms such as SIFT, HMAX and/or Bayesian algorithms to determine characteristics of the symbolic object and match these characteristics 75 with the characteristics of symbolic objects found in a library of known symbolic objects 66.

When methods find multiple possible entities that may match the symbolic object of interest to the user, methods provide a set of thumbnail images of such possibly matching entities and their associated knowledge markers 77 to help users disambiguate among the possibly matching entities, allowing users to select their entity of Interest 78.

Methods get context data associated with the video from the content resource metadata 76 and update the smart content database 25 and the update the knowledge graph database 29.

In an embodiment, methods allow a touch screen enabled smart phone, tablet or other small device 80, to tune into and receive a broadcast mirroring a broadcast being simultaneously shown on a larger screen device.

FIG. 15 shows a block diagram of an embodiment having methods processing for recognizing symbolic objects embedded in various types of printed content.

In an embodiment methods: capture an image of the printed materials content object using an imaging capable device 83; analyze a region of the printed materials image selected by the user 73 to recognize the presence of symbolic objects 74, including text objects and image objects; recognize text in the printed materials image object; recognize specific symbolic objects in the text; and associate these symbolic objects with entities known in a library of known symbolic objects 66.

In an embodiment, examples of printed materials content objects having methods for recognizing symbolic objects include, for example: product packaging 79, retail shelf tags 80, printed coupons 81, printed signs 82 and other printed content materials.

In an embodiment, if an image of a symbolic object is found in the printed materials image, methods: categorize the image into known characteristics and patterns for typical types of symbols, such as bar codes, QR codes, and brand logos 74; recognize the presence of such images; relate these images to symbolic objects in a library of known symbolic objects 66; update the smart content database 25 to include a record for this printed materials image; and update the knowledge graph 29 entity nodes, entity properties, entity relationships and relationship properties.

An example of this embodiment would be a user in a retail store using his or her Smart Phone to image a shelf tag. In this embodiment the system would recognize characteristics of the elements in the shelf tag, and relate the product designated by this shelf tag to one or more entities known to the knowledge graph, thus allowing the user to learn about this product/brand and further interact with it.

This has the advantage of providing users with a single consistent user experience that allows them to not only interact with entities currently connected to the Internet but also entities that are not currently connected to the Internet, in this example, a passive shelf tag, or any other kind of currently non-connected printed or otherwise visible materials or other content that can be imaged.

Figure 16:
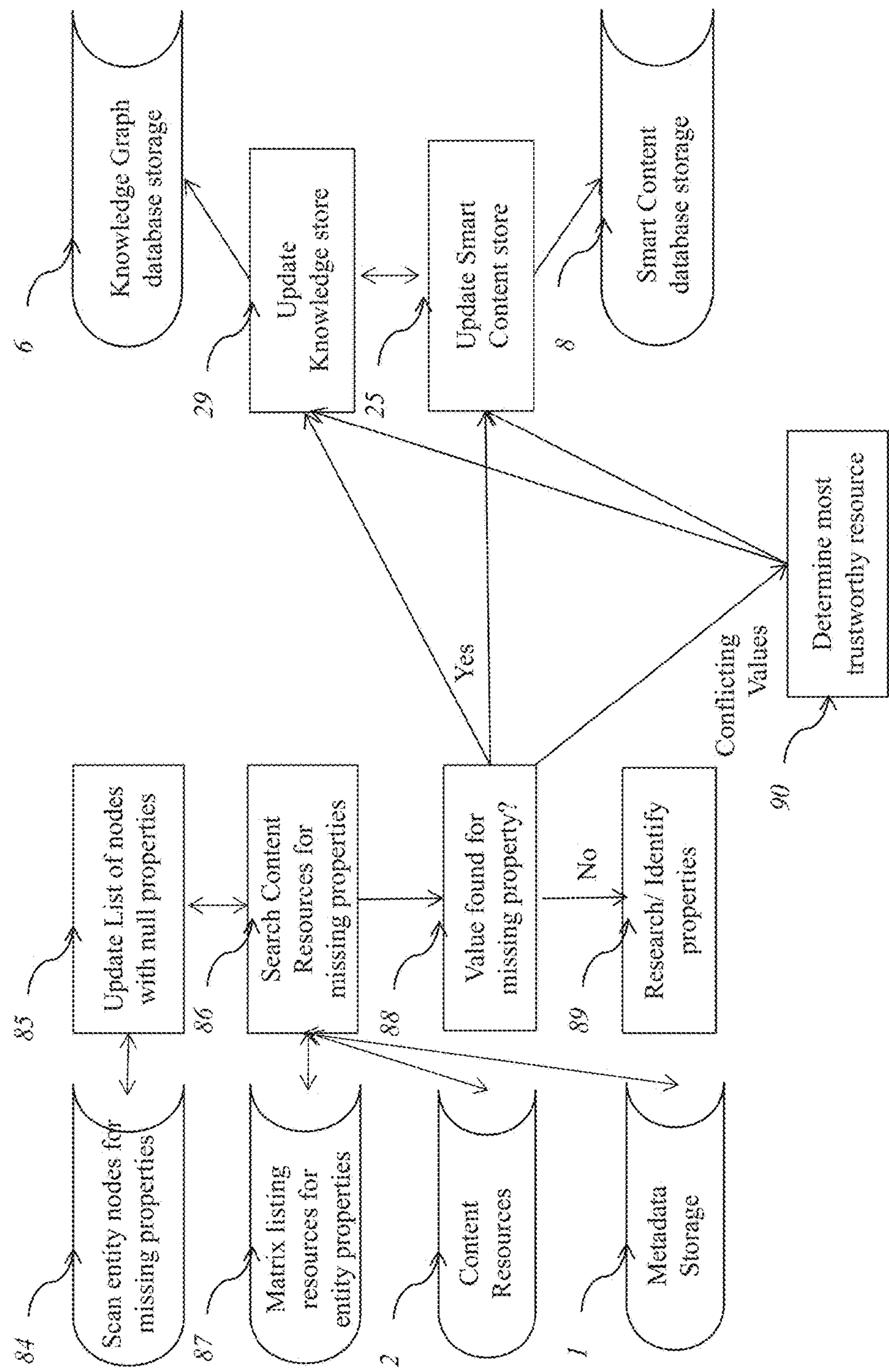
FIG. 16 is a flow chart showing an embodiment having methods for acquiring explicit factual knowledge about entities.

FIG. 16 is a flow chart showing an embodiment having methods for learning explicit factual knowledge about entities and storing this factual knowledge as properties in a knowledge graph database node and in a component of a smart content database record.

In an embodiment, methods scan entity nodes during times of light system resource usage to identify entity nodes with null values 84; create logs of entity nodes having missing properties; assemble a "missing properties" list based on such scanning 85; and search for content resources 86 by looking at metadata tables 1 mapping entity properties to content resources 2 to learn where to look for factual knowledge about such entity properties 87. Methods determine whether the content resources have data needed to fill in the missing properties and fetch records from these resources for further processing 88.

In this embodiment, if resources content records contain structured content properties, methods match these properties with missing entity properties in the knowledge graph 8, and also with corresponding properties in the smart content database 6, and then update such properties in the knowledge database 29 and update such properties in the smart content database 25. If methods find conflicting possible values for properties with null values, methods determine the most likely value by giving weight to the most-trustworthy resources 90.

An example of this embodiment would be when a method determines that a node in the knowledge graph is missing a property value for the birth date of some celebrity or historical person, methods would scan content resources such as The New York Times and Wikipedia. If methods find conflicting birthdates, methods would give weight to The New York Times or some other most trusted resource, populate the appropriate property in the node for that person, create relationships between that node and multiple nodes having an entity group of "Dates" and an entity type of "Birth Dates," such relationships designating a birth date for that person, and each such relationship having a property designating the resource for this relationship and another property designating its estimated trustworthiness based on machine learning.

Figure 17:
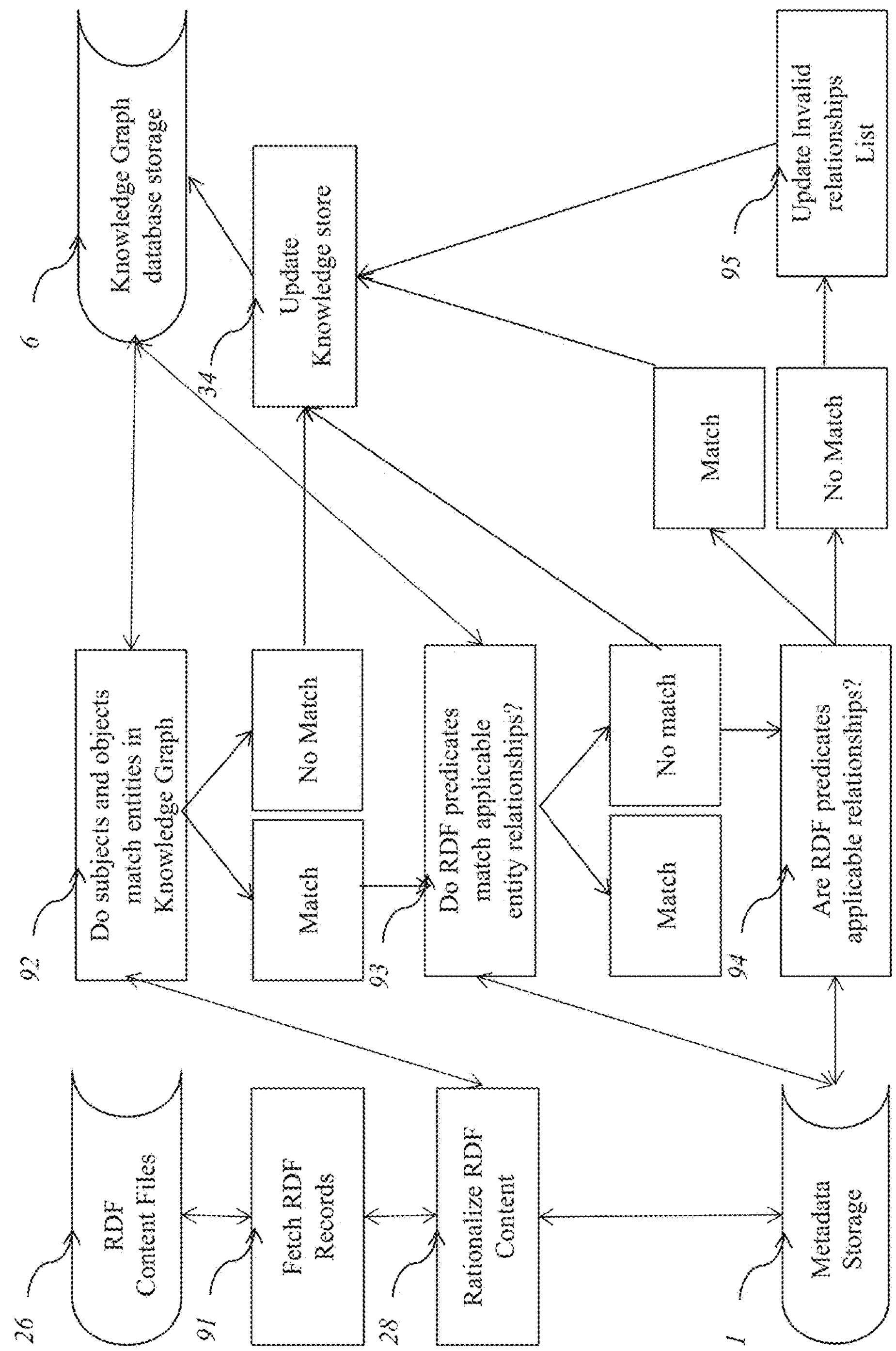
FIG. 17 is a flow chart showing an embodiment having methods for acquiring knowledge about explicit relationships among entities.

FIG. 17 is a flow chart showing an embodiment having methods for learning knowledge about explicit relationships among entities, and storing this relationship knowledge in the knowledge graph.

In an embodiment, methods periodically fetch updated RDF records 91 from RDF content Files 26 and rationalize the RDF content based on tables in the metadata storage 1. For example, methods would periodically fetch updated RDF records from a content source "The New York Times" which frequently updates its RDF database.

If the Subjects and objects in the Rationalized RDF records match entities in the knowledge graph 92 and the predicates in the rationalized RDF records match relationships in the knowledge graph 93, then do nothing. If either the subjects or objects in the rationalized RDF records do not appear in the knowledge graph 8, then update the knowledge graph storage 34. If a predicate in the rationalized RDF records do not match relationship in the knowledge graph, then update the knowledge graph storage 34. If a predicate in the Rationalized RDF records is not considered a valid relationship 94 according to the metadata storage 1, add the predicate to an invalid relationships exception list 95 for further analysis.

Figure 18:
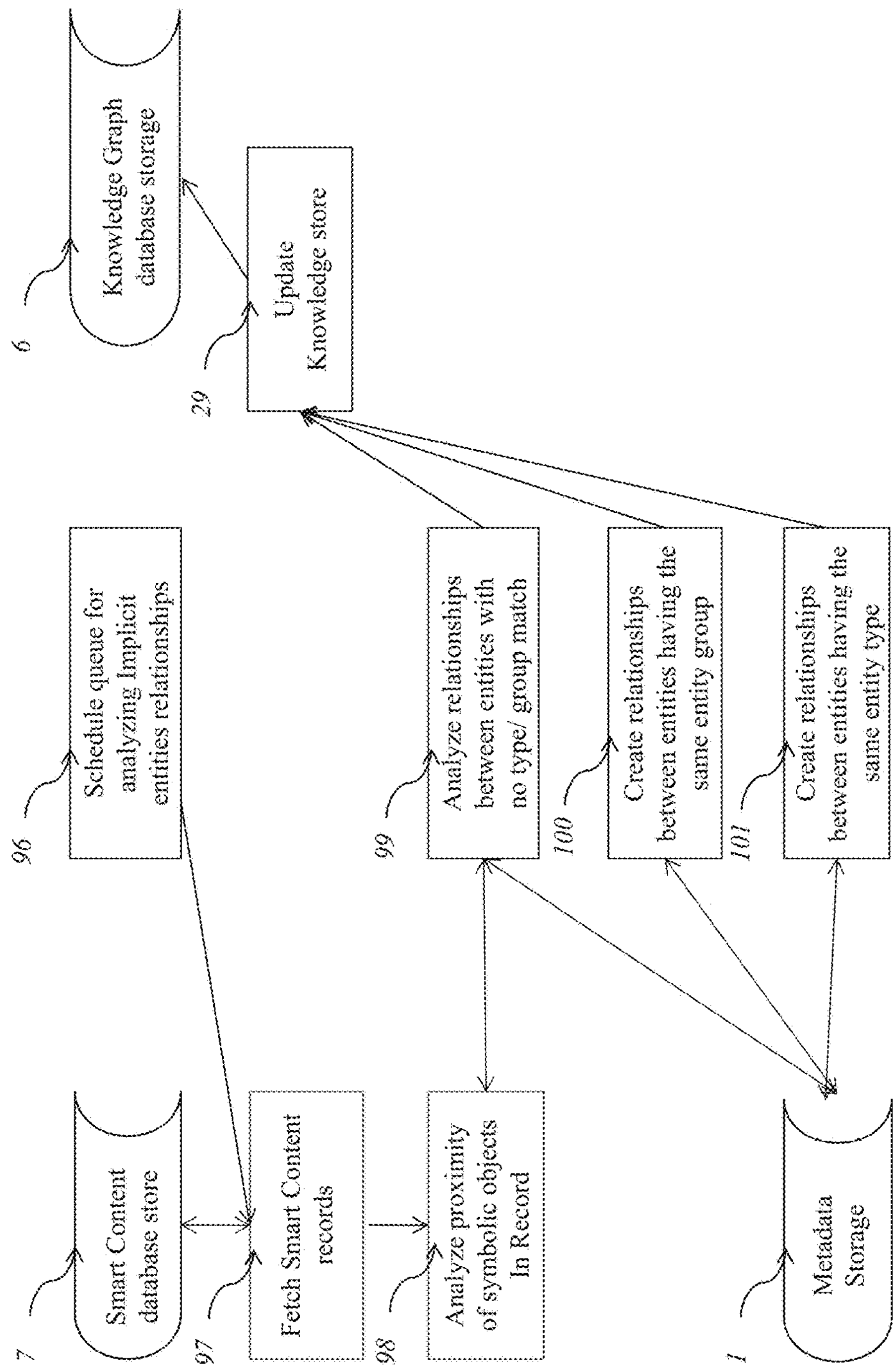
FIG. 18 is a flow chart showing an embodiment having methods for acquiring contextual knowledge about relationships among entities.

FIG. 18 is a flow chart showing an embodiment having methods for learning contextual knowledge about relationships among entities, and storing this relationship knowledge in the knowledge graph.

In an embodiment, methods create a queue for methods to analyze contextual entity relationships 96; fetch yet-to-be analyzed smart content records 97 and analyze the proximity of symbolic objects in each smart content record 98.

In an embodiment, methods analyze the smart content records 99 to determine if any contextual relationships exist among symbolic objects, including relationships in which, for example: 1) symbolic objects are embedded in the same smart content record; 2) symbolic objects are presented as parts of a list, separated by commas, within a single smart content record or are located in close physical proximity; or 3) symbolic objects that are images are located in close physical proximity to each other.

In an embodiment, methods determine if any symbolic objects that are contextually linked are classified as belonging to the same entity type 100, or the same entity Group 101 and methods create relationships between them.

In this embodiment, for example, if methods find two separate entities having an entity type of "NASDAQ listed Companies" in close proximate relationship in a content object having a content type of "Research Report," a method may create a relationship between them 100 and assign a relationship type of "is mentioned in a Research Report along with."

Figure 19:
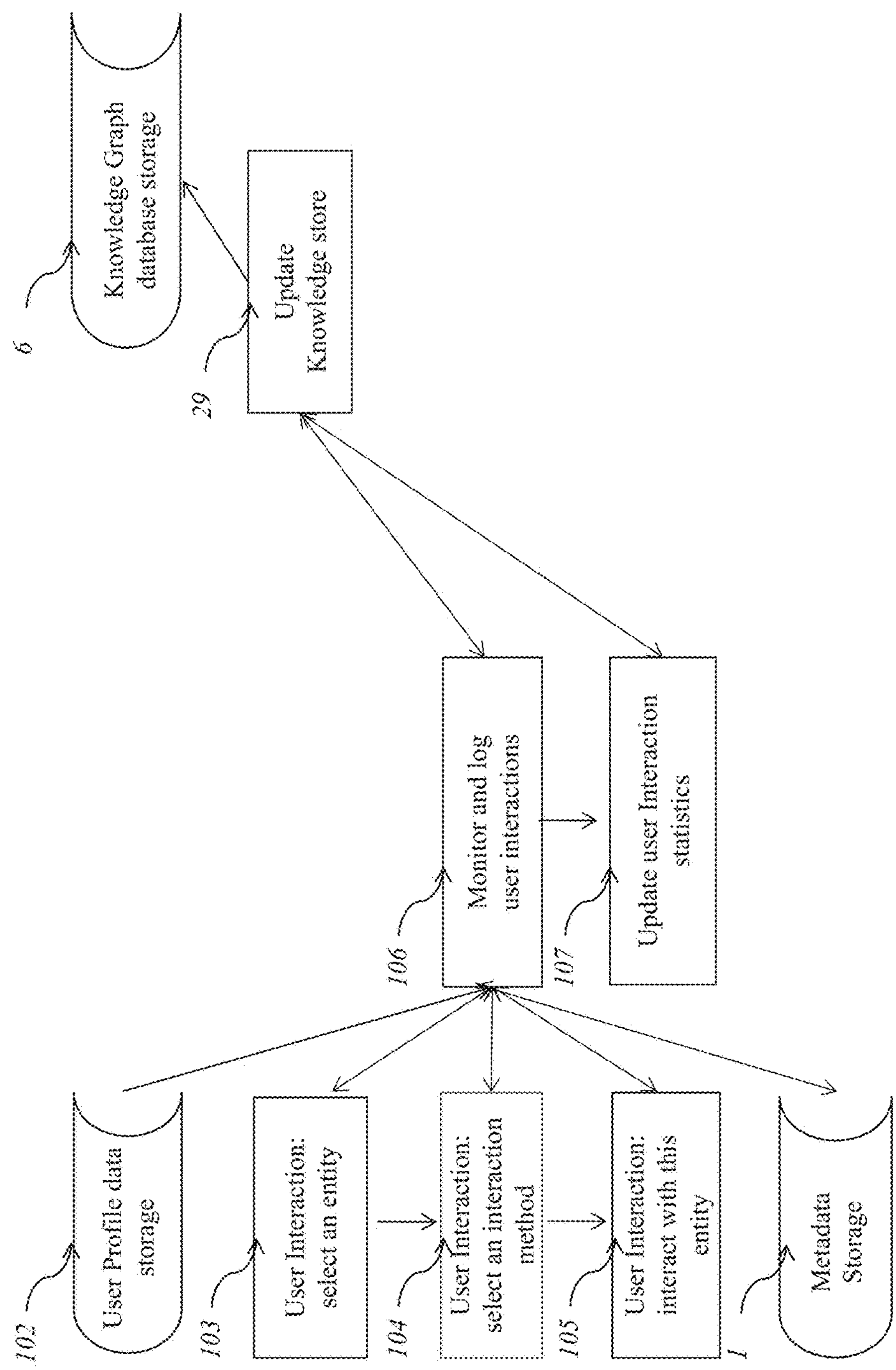
FIG. 19 is a flow chart showing an embodiment having methods for monitoring and processing user interactions with entities.

FIG. 19 is a flow chart showing an embodiment having methods for monitoring and logging user interactions with entities 106.

In an embodiment, methods monitor and log user interactions with entities, including symbolic object entities and content entities.

In an embodiment, a user may select an entity using any of a variety of methods 103, and then select a method for interacting with the selected entity from among a set of valid interaction methods 104, then Interact with this entity 105.

In an embodiment, methods log user interactions 106, and enhance the data in these logs with user profile/context data 102.

In an embodiment, methods update user interaction statistics in a content collection in a document dataset 107. For example, when a user "remembers" an entity "Ford F1" vehicle, methods create and then progressively dynamically update a statistics record for the entity "Ford F1" showing the cumulative number of times users have remembered this entity.

In an embodiment, methods continuously monitor and read the interactions logs and interactions statistics and update the knowledge graph database 29.

In this embodiment, for example, the knowledge graph may be updated to document that "user A (an entity node) remembered (a relationship) entity 1 (an entity node)," or that "user A (an entity node) is following (a relationship) news (an entity node) about (a relationship) entity 2 (an entity node)," or "user A (an entity node), made a reservation (a relationship) at entity 3 (a Node)," etc.

Figure 20:
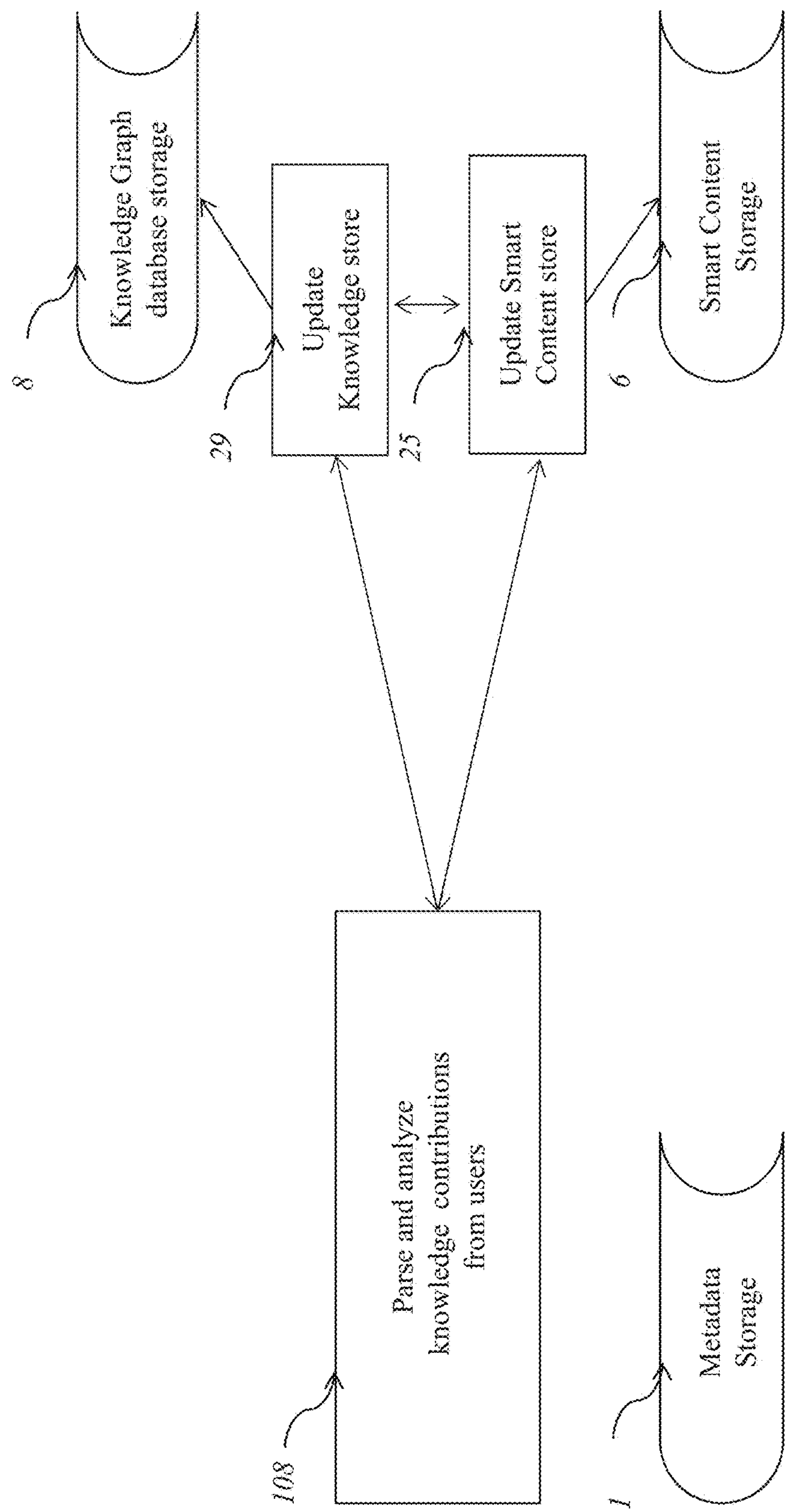
FIG. 20 shows a block diagram of an embodiment having methods for processing and storing knowledge contributed by users.

FIG. 20 shows a block diagram of an embodiment having methods for organizing and storing knowledge contributed by users.

In an embodiment, methods analyze smart content records 108 having content types that, according to the metadata 1, may include records of user experiences, reactions, advice and other forms of knowledge related to an entity.

Examples of such content types include: "Travel Reviews," "Restaurant Reviews," "Travelogues," "Product Reviews," "Hotel Ratings," "Guide for selecting a hotel in San Francisco," etc.

In an embodiment, methods determine: if the smart content is written from a first person viewpoint, or from an observational viewpoint; if the smart content contains one or more keywords from among of list of keywords in the metadata indicating a type of user contributed knowledge, for example: "review," "experience," or "visited." Methods add new entity relationships between the author of the smart content and entities embedded in the smart content, assigning a relationship type, for example of "wrote a review referring to," using rules based on the metadata.

Figure 21:
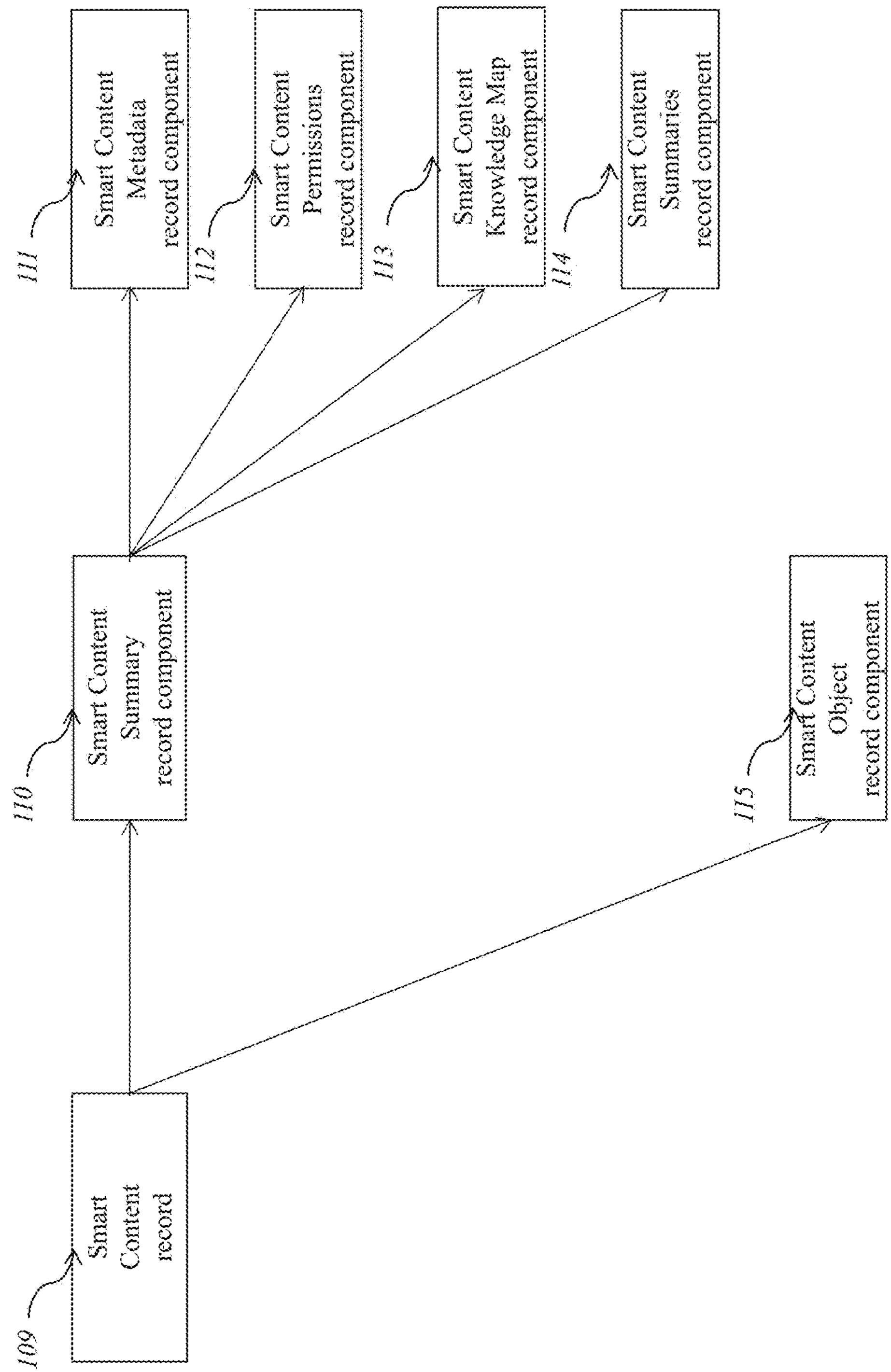
FIG. 21 shows a block diagram of an embodiment having methods for organizing metadata for smart content records.

FIG. 21 shows a block diagram of an embodiment having methods for organizing components of smart content records.

In an embodiment, methods organize smart content records into smart content record components, including: a smart content metadata component 111, a smart content knowledge map component 112, a smart content permissions component 113, a content summaries component 114 and a smart content object component 115. Methods also organize smart content records into smart content summaries 110 and smart content objects 115.

In this embodiment, the smart content metadata component 111 contains metadata about a content record provided by the content source as part of the original content record. For example, some content sources add tags to their content using the Schema.Org standard. Others use the rNews standard for tagging content. Yet others tag content using Microformat standards. Methods rationalize these varying standards using tables from the Intelligent Internet's metadata storage, and create a record in the smart content storage containing these rationalized metadata tags.

In this embodiment, the content knowledge map component 112 contains factual knowledge about the content stored in a template-based structure having data elements, including, for example: the entity ID for the content; the entity name (i.e. title); the entity group name (set at "content" by default); the entity type name (which varies according to the content type); the name of the author(s) of the content; the entity IDs of the author(s) of the content; the name of the resource from which this content was obtained; the entity id of the resource; and timestamps for the date and time published, date and time this content may be released and date and time at which this content may no longer be made accessible to users.

In this embodiment, the smart content permissions component 113, as defined by the resource providing the content or by the author of the content, may include, for example: a flag indicating the access rights assigned to the content, such flag denoting access rights as, "Private;" (accessible only to the resource or author(s)), "Individual" (accessible only by an individual user named by the resource or author(s)); "Groups" (accessible only to a group named by the resource or author(s)); along with lists of individuals and groups authorized to access or update the content.

In this embodiment, the smart content summaries component 114 may come from the author or resource providing the content, or may be generated by known methods for summarizing content. A given smart content record may contain multiple summaries, for example it may contain a summary consisting of 140 characters suitable for sending text messages or tweeting, and it may also contain a summary consisting of 500 characters suitable for displaying a summary of a news article, an email, a product promotion or an event.

In this embodiment, the smart content object component 115 is the original content obtained from the resource, enhanced by the addition of hidden knowledge tags linking a recognized symbolic object in the content object with an entity in the knowledge graph.

In an embodiment, a smart content object component 115 may consist of structured elements, each of which can be dynamically updated by a resource. For example, a smart content object comprised of a form displaying stock market data about an entity, may have individual smart content properties updated in real time by a resource. A smart content object displaying structured content about a gasoline station may have a smart content property for "price per gallon or liter," updatable by the gas station at any time. Methods can process these updates and additional methods may generate automatic notifications to users who have chosen to "follow" content about this entity.

The benefits of having each content record containing knowledge about itself are manifold. By creating a universally understandable and utilitarian structure for content up front, either at its point of origin or as part of a large-scale repository of knowledge enhanced content, downstream methods that manage and use this content may operate more efficiently. Real time analysis of "Big data" becomes possible because the significant amount of "after the fact" cleaning up of data again and again by analysts at multiple research firms or brands may be replaced by a single "before the fact" point of creation of "coherent content," having all data aligned and normalized and having knowledge embedded in the smart content record before such smart content is exposed to further methods and interactions.

Figure 22:
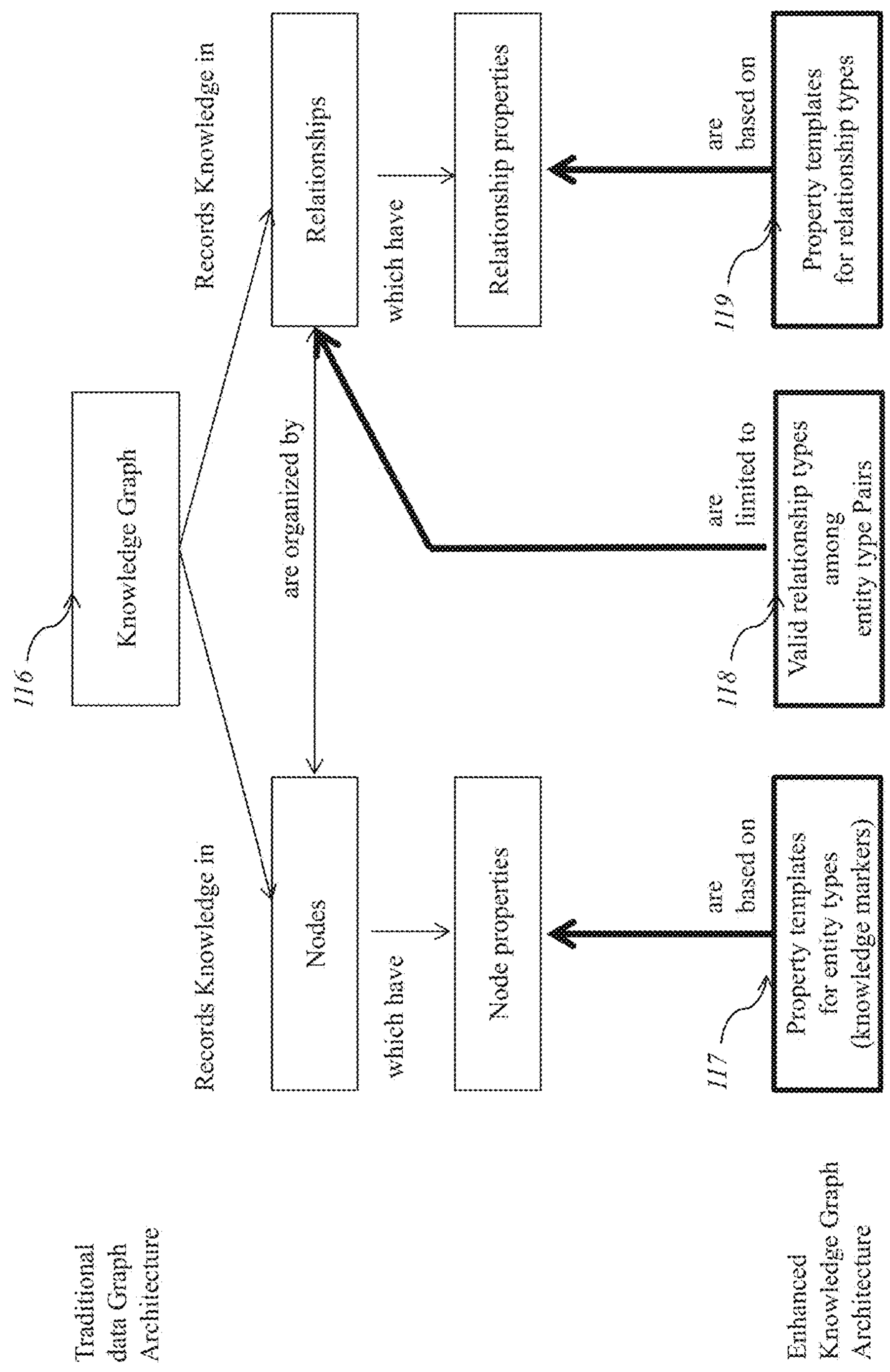
FIG. 22 shows a block diagram of an embodiment having methods for implementing metadata-defined elements and structures in a knowledge graph.

FIG. 22 shows a block diagram of an embodiment having methods for implementing metadata-defined elements and structures in a knowledge graph.

In this embodiment, methods customize and optimize the standard architecture of an open sourced or commercially available graph database to explicitly store knowledge about entities.

In an embodiment, the customized knowledge graph 116 contains: nodes, each representing a unique entity; node properties, each defining factual properties related to the entity denoted in the node; node relationships, each representing a relationship between two entities; and node relationship properties, each defining declarative knowledge about the relationship between two entities.

In an embodiment, every entity node in the knowledge optimized graph has entity properties including: entity properties universally implemented in all entity nodes, such as: node id, a unique entity id for the entity denoted by the node, an entity group classification for the entity denoted by a node, an entity type classification for the entity denoted by a node; and a timestamp created property denoting the data and time this node was created.

In this embodiment: 1) entity nodes have properties conforming to the entity type of the entity represented by the node, and each such set of properties is derived from an entities type property template 117 for entities belonging to this entity, each such entities type property template defining specific "knowledge markers" for a specific type of entities, i.e. properties that allow disambiguation among entities; 2) relationship between two entities conforming to a list of valid relationships 118 between the entity types for the two entities; with each such relationship type has a relationships property template 119 defining valid relationship properties for that relationship type.

Figure 23:
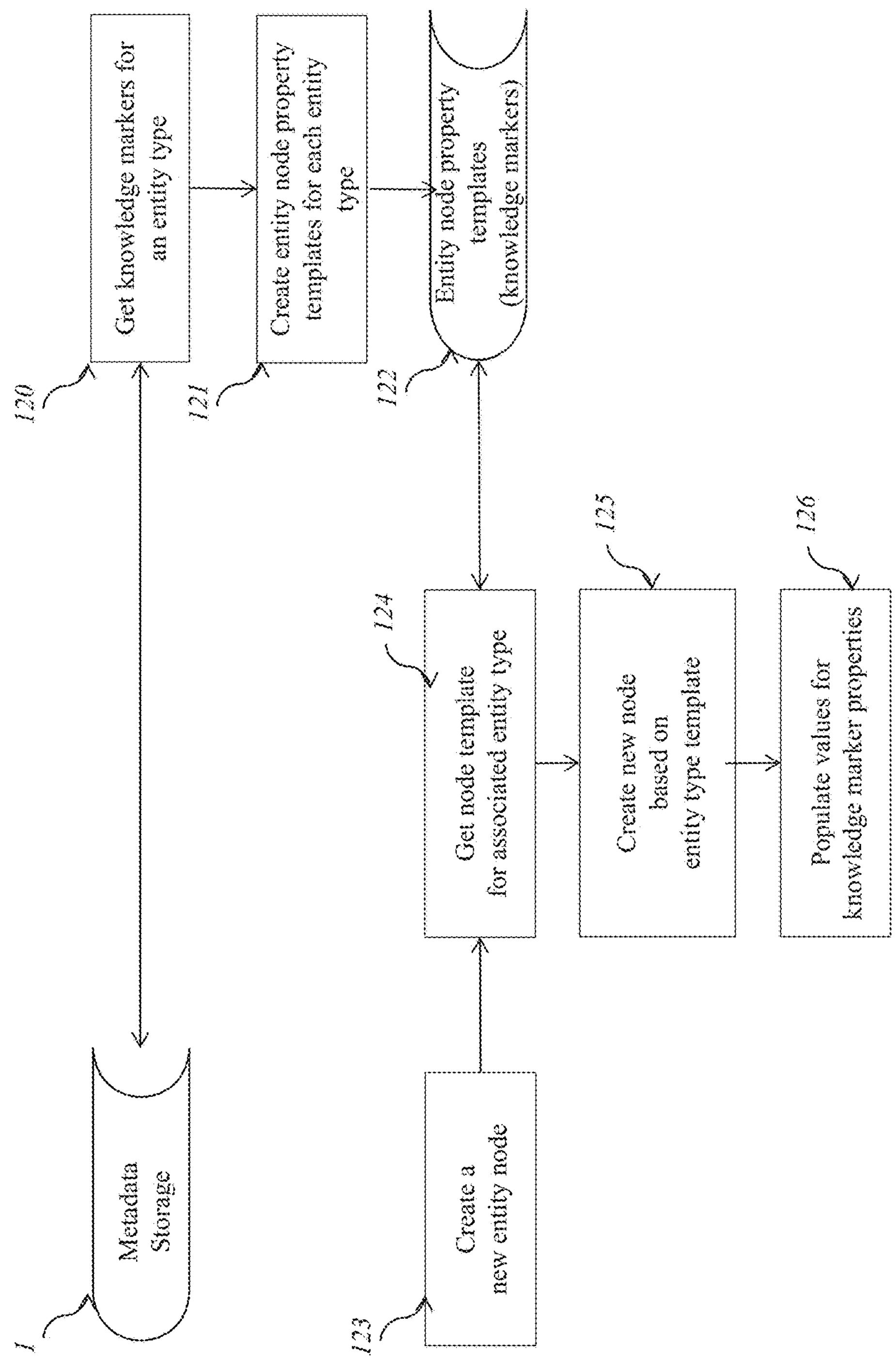
FIG. 23 shows an embodiment having functions managing the creation of entity nodes based on "entity type" node templates.

FIG. 23 shows an embodiment having functions managing the creation of entity nodes based on entity type node templates.

In an embodiment, the metadata 1 for the knowledge graph contains: a list of knowledge markers from the metadata storage 1 for each entity type known to the system, such knowledge markers consisting of a small number of specific entity properties needed to disambiguate among entities. 120. These knowledge markers, when presented to users, allow them to quickly perceive which entity they want to interact with, from among a list of similar entities. They also facilitate machine processing and organizing of knowledge and smart content.

In an embodiment, methods create new entity type node templates 121, including properties for each of the knowledge markers defined in the metadata storage 1 for that entity type 122. Methods set values for two universally required properties in each of these entity type node templates: the "entity type name" and "entity group name,' with all other properties for a given entity type node template initially set at null.

In an embodiment, methods process content from content resources, and for each content record processed create a new entity node record 123 in the knowledge graph by using the entity type node template 124 for the content type of the content record processed.

In this embodiment, methods assign a unique entity ID to each new content entity Node, and assign the same entity ID to a new associated record in the smart content database, thus providing alignment and integration between the two databases, and facilitating methods that subsequently index and search for content related to entities and vice versa. Methods then populate the knowledge marker properties in the entity node containing knowledge about a given content record 126.

Figure 24:
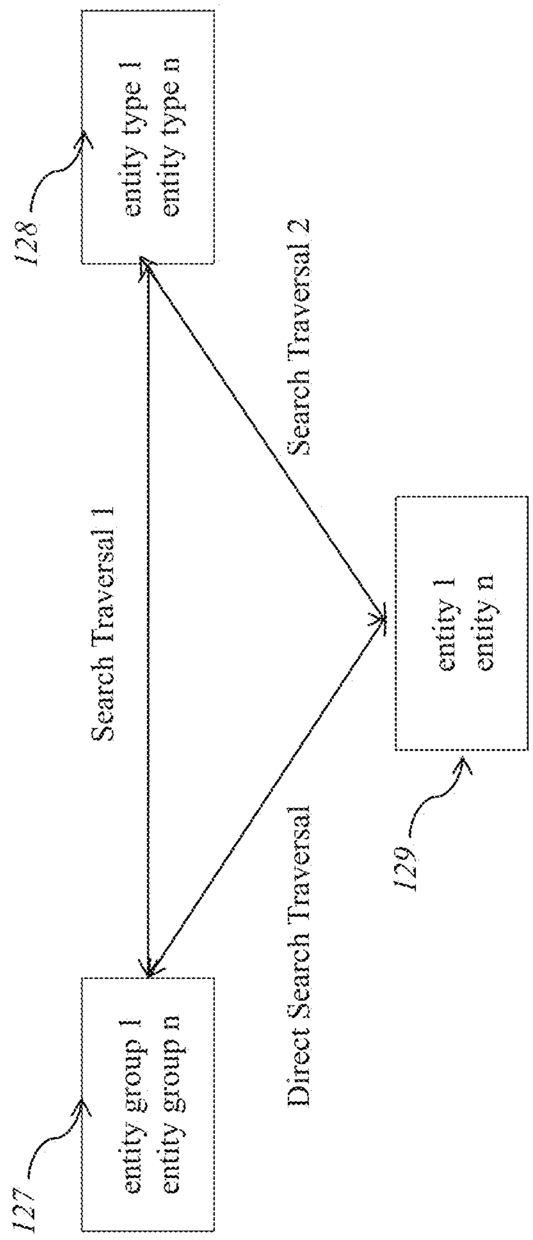
FIG. 24 shows an embodiment having functions to optimize searching for knowledge about entities in a knowledge graph.

FIG. 24 shows an embodiment having functions to optimize searching for knowledge about entities in a knowledge graph.

In an embodiment, methods optimize accessing knowledge about entities to require from one to a few node traversals by customizing a commercially available graph database such as Neo4J.

In an embodiment, methods traverse between one entity node and another entity node bi-directionally, with either node being a starting point for the traversal.

In an embodiment, the knowledge graph contains entity nodes for each entity group and each entity type known from the metadata 127. Any entity group or entity type node may act as the starting point for subsequent node traversals. This embodiment allows search methods to efficiently finding all entities having a specific entity type, for example "News" (having an entity group of "Content" and an entity type of "News Articles") about "Obama" (an entity).

In this embodiment, functions for accessing knowledge about entities include: traversing the knowledge graph to find knowledge about a particular entity, including an entity consisting of a collection of entities, an entity consisting of content objects and an entity consisting of collections of content objects; starting the traversal with the "0" node, as in other graph databases; traversing to nodes representing entity groups or entity types 128; then traversing to nodes representing individual entities 129, each such node containing node properties denoting entity properties and each such entity node being linked to other related entity nodes via entity relationships.

In an embodiment methods allow the encoding of many types of knowledge into a common structural framework, such framework consisting of a combination of entity nodes, entity node properties, entity relationships, entity relationship properties and smart content records, Examples of types of knowledge include:

- Factual knowledge required for disambiguation among entities: may be encoded in one entity node having a few entity properties.
- Factual knowledge for describing entities in detail: may be encoded in one entity node, having entity properties for the node and one smart content record linked to the entity node via use of a common entity id; with the entity node and the smart content records sharing a common entity id.
- Knowledge about relationships between entities: may be encoded in two entity nodes having one or more relationships between the two entity nodes.
- Behavior knowledge: may be encoded in two entity nodes, one for the entity denoting the actor (a user or a device) and one for the entity denoting the thing with which the actor interacts, having a relationship between the two nodes denoting the type of interaction, such relationship having relationship properties denoting unique details about the interaction.
- Knowledge about reactions of users to entities: may be encoded in two entity nodes, one for the entity denoting the user, one for the entity denoting the thing which the user has reacted to, such nodes having a relationship between them denoting the type of reaction (voted, expressed an opinion, liked, disliked, etc.), and such relationship having relationship properties denoting unique details about the reaction (polarity of the reaction, magnitude of the reaction, etc.)
- Advisory knowledge generated by users: may be encoded in one entity node denoting a content entity, such node having entity properties denoting entity markers for the content and one smart content record having a content component object containing the advice; with the entity node and the smart content record sharing a common entity id.
- Procedural knowledge: may be encoded in one entity node denoting a smart content entity, such node having entity properties denoting entity markers for the content and one smart content record having a content component object containing the advice; the entity node and the smart content record sharing a common entity id.

Embodiments of the invention have methods for encoding knowledge in well-defined structures in a graph-based storage resource such as Neo4J, such resource customized for encoding of various types of knowledge, including such types of knowledge as: factual knowledge, knowledge about relationships among entities, knowledge about the behaviors of people and devices, knowledge contributed by users, including attitudinal knowledge, procedural knowledge, advisory knowledge, etc.

Figure 25:
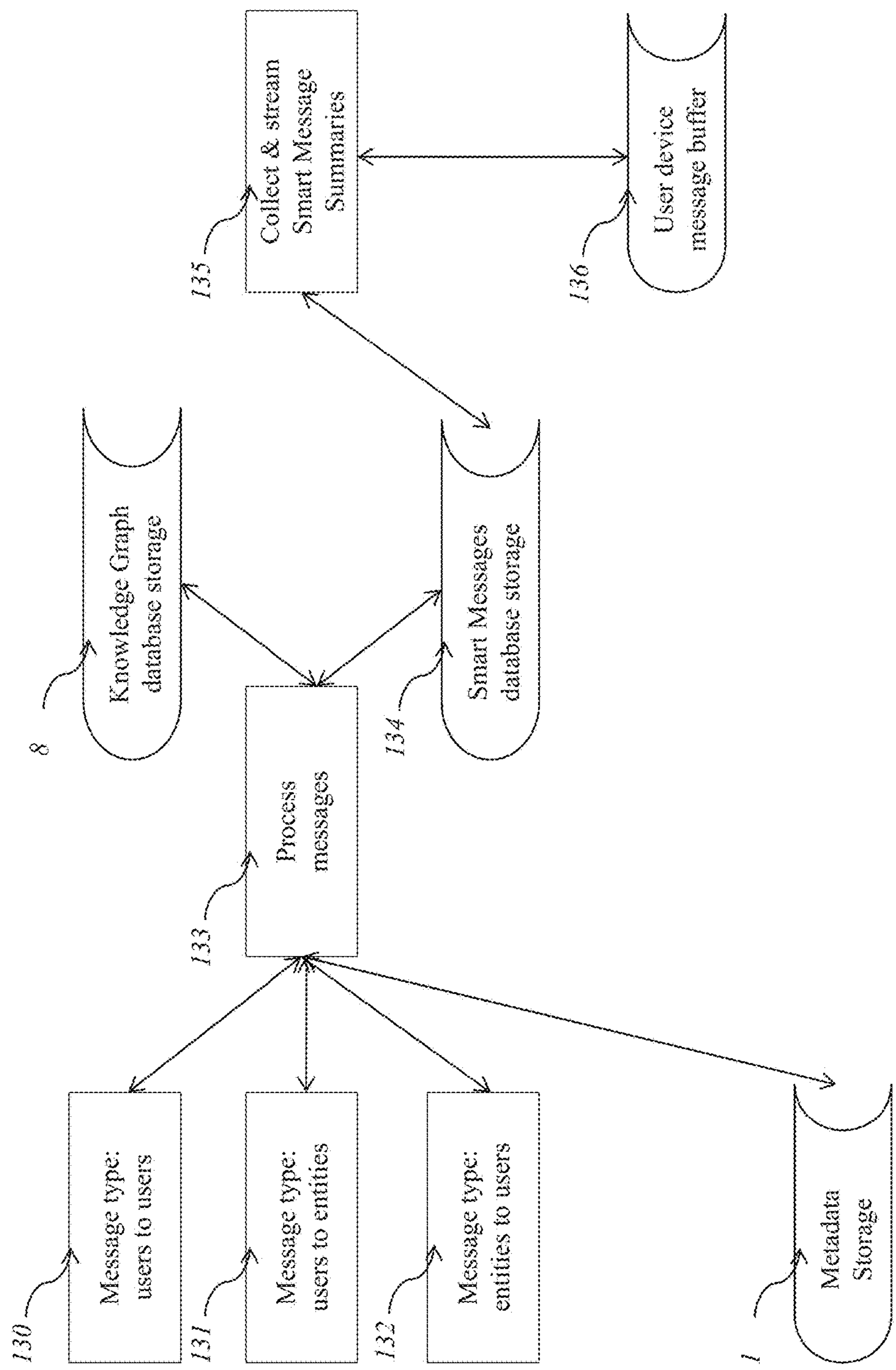
FIG. 25 is a block diagram showing an embodiment having methods for processing smart messages.

FIG. 25 is a block diagram showing an embodiment having methods for processing smart messages, special types of content useful for communicating among users and between users and devices.

Embodiments of the invention have methods for various of types of "message resources" into one unified messaging stream of "smart messages," i.e. messages having knowledge about themselves and the content they contain, embedded in a component of each smart message record. These methods include support for processing, managing, transmitting, subscribing to and receiving smart messages.

In an embodiment, methods process and rationalize many types of incoming messages into one unified smart message database 134, having the capability to stream 135 large numbers of smart message summaries in real time to the message buffers of any of a variety of network connected devices employed by a user 136.

In this embodiment, functions organize all messages into one unified system, allowing any entity to communicate in real time with any other entity, supporting for example: users-to-users messages 130, users-to-entities messages 131, and entities-to-users 132.

In an embodiment, functions process messages 133: to rationalize data stored in standardized components of a smart messages record stored in a smart messages database 134, and to recognize and document knowledge related to these messages in a knowledge database 8.

The types of smart messages may be highly diverse, and may include, for example: emails from individual contacts; messages from individuals in groups of Interest; messages related to groups of interest; tweets from people of interest in a Twitter list; tweets about entities of interest from any Twitter member; summaries of news articles related to entities of interest; deals related to entities of interest; coupons related to entities of Interest; social updates from contacts at Facebook, Twitter and LinkedIn; sports statistics for entities of interest; notices of events related to entities of interest; messages related to signals from or showing the status of network connected devices and numerous other types of messages.

Figure 26:
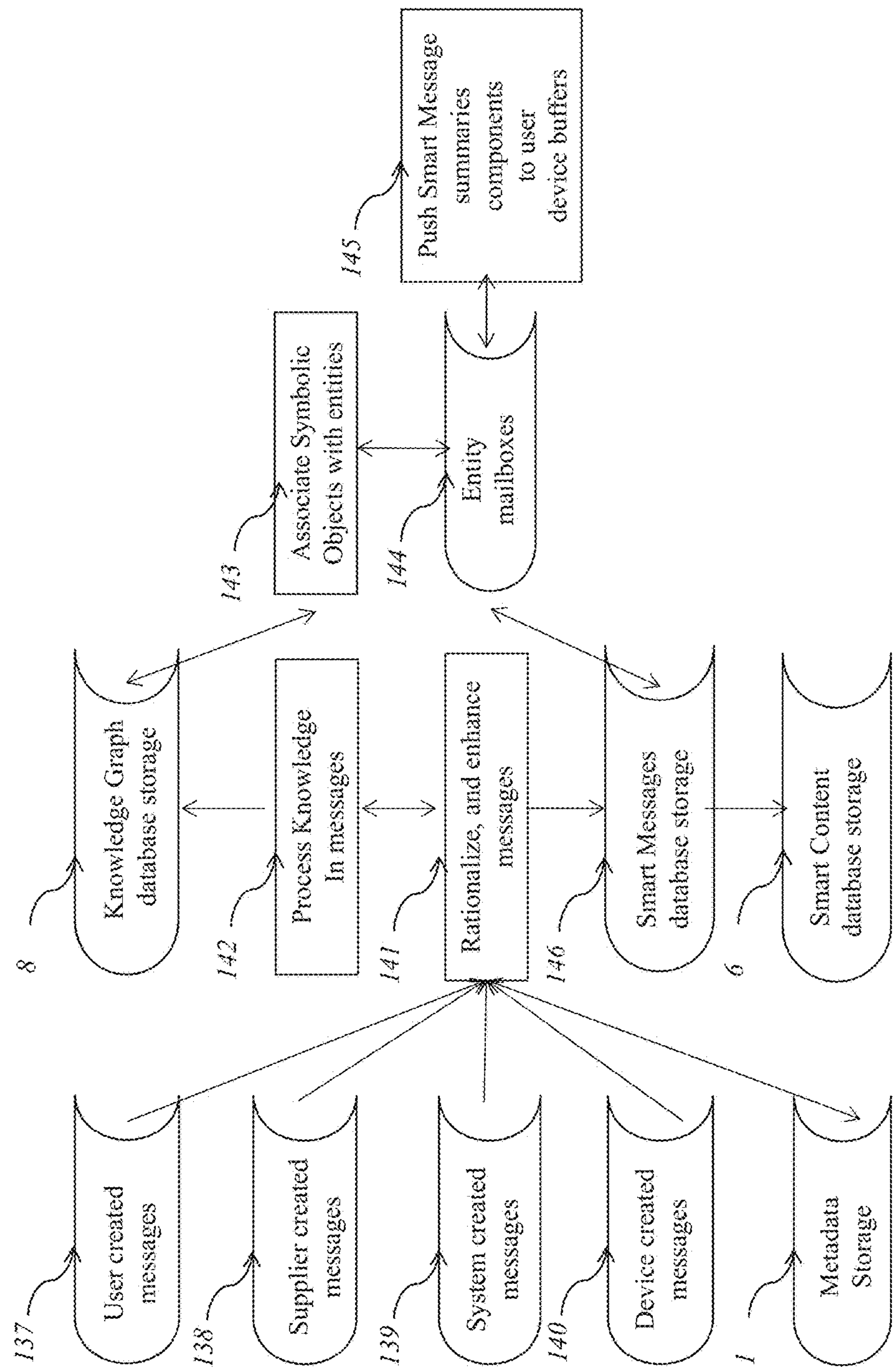
FIG. 26 is a block diagram showing an embodiment having methods for processing messages from message sources.

FIG. 26 is a block diagram showing an embodiment having methods for processing messages from diverse message sources to create a unified repository of smart messages.

In an embodiment, methods allow users to generate many types of "messages" 137, including, for example: "reviews" about an eBook; "comments" about an entity, including a content entity; "notes" about an entity, including a content entity, "questions" about an entity, including a content entity; "answers to questions" about an entity, including a content entity; "requests for a price quotation" for an entity; "terms for purchasing" an entity; "requests to reserve" an entity; a "purchase order" for an entity provided by an entity; "requests for facts" about an entity; a "list of facts" about an entity; "requests for an image" about an entity; "requests for a video" about an entity; an "electronic bill," an "electronic statement," an "authorization to pay a bill," a "summary of data" derived from signals generated by network connected device, "instructions" for managing a network connected device; and other possible types of messages.

In an embodiment, methods allow suppliers to generate standard and customized smart messages 138 to individual users, and to groups of users interested in their products and/or services, including, for example: customized "time-limited offers" for a hotel room, "special offers" from a restaurant to a user within a specific radius of distance or in a particular locality, "recall notices" related to a defective product, "news" about a new product or service, a "warning" related to using a particular credit card and many other types of messages.

In an embodiment, methods allow devices to generate and send smart messages 139 to users and/or other devices, including for example: a "smoke alert" condition in the user's home, an "alert" indicating the unlocking of a door in the user's home, an "alert" indicating failure of a furnace in the user's home, a "notice" about low ink in a toner cartridge (allowing the user to purchase a new toner with a single action) and many other types of messages.

In an embodiment, methods allow the Intelligent Internet system to generate and send smart messages 140 to a user, including for example: the availability of new content related to an entity the user has chosen to "Follow."

In an embodiment, methods allow users to insert or associate another smart message or a smart content record with a smart message. For example a user may send an Email to another user or group of users, with his or her comments about a news article. The message with comments, in this example, would contain knowledge embedded in the smart message record about the comment and the news article would contain knowledge about the smart message record about the news referred to in a smart content record.

In an implementation, methods process all generated messages to: 1) rationalize such messages 141 to conform to the metadata 1 and 2) process knowledge related to the smart message 142 by recognizing symbolic objects embedded in the messages, associating such symbolic objects and metadata with specific entities 143 and 3) document knowledge about such symbolic objects by adding entity nodes and entity relationships to the knowledge graph 8.

In an implementation, methods store smart messages in entity nodes, entity node properties, node relationships and node relationship properties in the smart messages database 148, and update properties in components of the smart content database 6.

In an implementation, methods create "entity mailboxes" 146 containing links between a specific entity and smart messages related to this entity. In this implementation, methods push "smart message summaries" to "smart message buffer" in any of the device registered to a specific user 147 interested in or subscribing to entities.

Figure 27:
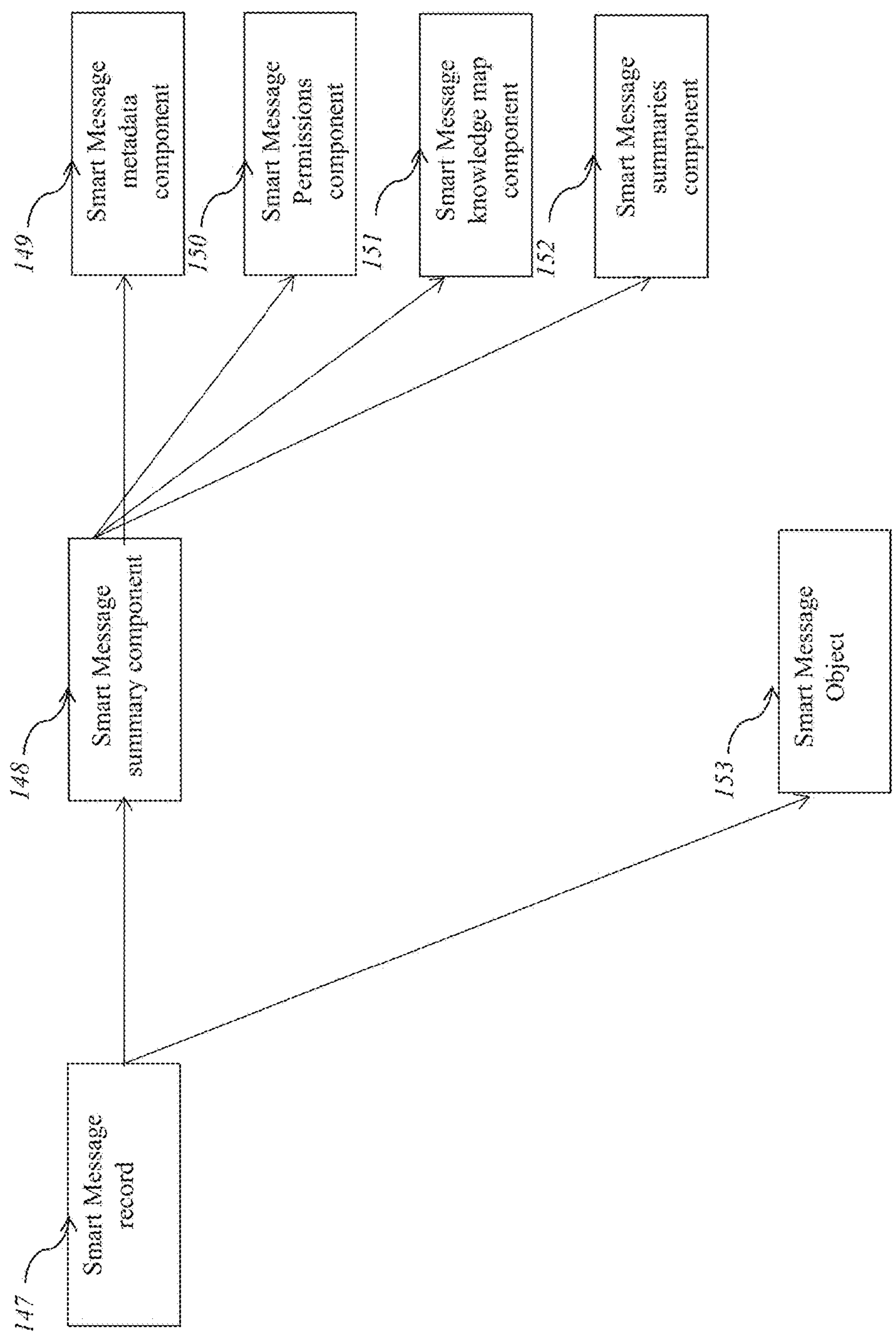
FIG. 27 is a block diagram showing an implementation having methods for partitioning smart messages into smart message components.

FIG. 27 is a block diagram showing an implementation having methods for partitioning smart messages into smart message components.

In an implementation, methods manage the storage of smart message records 147 by separating such smart messages into smart message components, each containing the entity id for the message, such components, including for example: a smart message metadata component 149, a smart message permissions component 150, a smart message knowledge map component 151, a smart message summaries component 152 and a smart message object component 155.

In this embodiment, the smart messages metadata component 149 contains metadata about a smart messages record provided at the time of the creation of the messages record by its author or generated by automated methods during its conversion into a smart message, such metadata including for example: the name(s) of the author(s) of the smart message and the entity ids of the author(s) of the smart message.

In this embodiment, the smart content permissions component 150, as defined by the author of the content, may include, for example: one or more flags indicating the access rights assigned by the author(s) to the smart message, such flags denoting access rights as, "Private;" (accessible only to the author(s)), "Individuals" (accessible only by one or more designated individuals named by the author(s)); "Groups" (accessible only to a group named by the author(s)), along with lists of individuals and groups authorized to access or update the smart message and "Public' (accessible by all users).

In this embodiment, methods create a smart message knowledge map component 151 containing knowledge about the smart message, with data in the knowledge map component stored in a template-based structure having knowledge-related data elements, including, for example: the entity id for the content; the entity name (i.e. the title for the smart message); the entity group name for the entity (set at "Content" by default); the entity type name for the entity (which varies according to the message type); the name(s) of the author(s) of the smart message; the entity ids of the author(s) of the smart message; and timestamps for the date and time of the sending of the smart message and date and time at which this smart message may no longer be accessible.

In this embodiment, methods create a smart messages summaries component 152, using a summary coming from the author of the smart message content, or methods for automatically summarizing content. A given smart message record may contain multiple message summaries, for example a summary consisting of 140 characters suitable for sending text messages or tweeting, a summary consisting of 500 characters suitable for displaying more of the smart message.

In this embodiment, methods create a smart message object component 153, having the original message created by its author, enhanced by the addition of hidden knowledge tags associated with recognized symbolic objects embedded in the smart message content object.

In an embodiment, a smart message content object component 153 may consist of structured elements, each of which can be dynamically updated by a content resource. For example, a smart message object component comprised of a form displaying stock market data about an entity may have individual smart content properties updated in real time by a content resource. A smart message object displaying structured content about gas at a gasoline station may have a smart content property for "Price per Gallon," updatable by the gas station or a central service at any time.

The benefits of having each smart message record contain knowledge about itself are manifold. By creating a universally understandable and utilitarian structure for each type of message up front, either at its point of origin or produced soon thereafter by automated methods as part of pre-processing the message for storage in a large-scale repository of smart messages, subsequent methods that manage, use and distribute these smart messages may operate more efficiently.

In this implementation, access to smart messages is optimized to allow users to view a message summary from a storage buffer in the user's device or from a networked storage device. When requested by the user, methods retrieve the full message.

Figure 28:
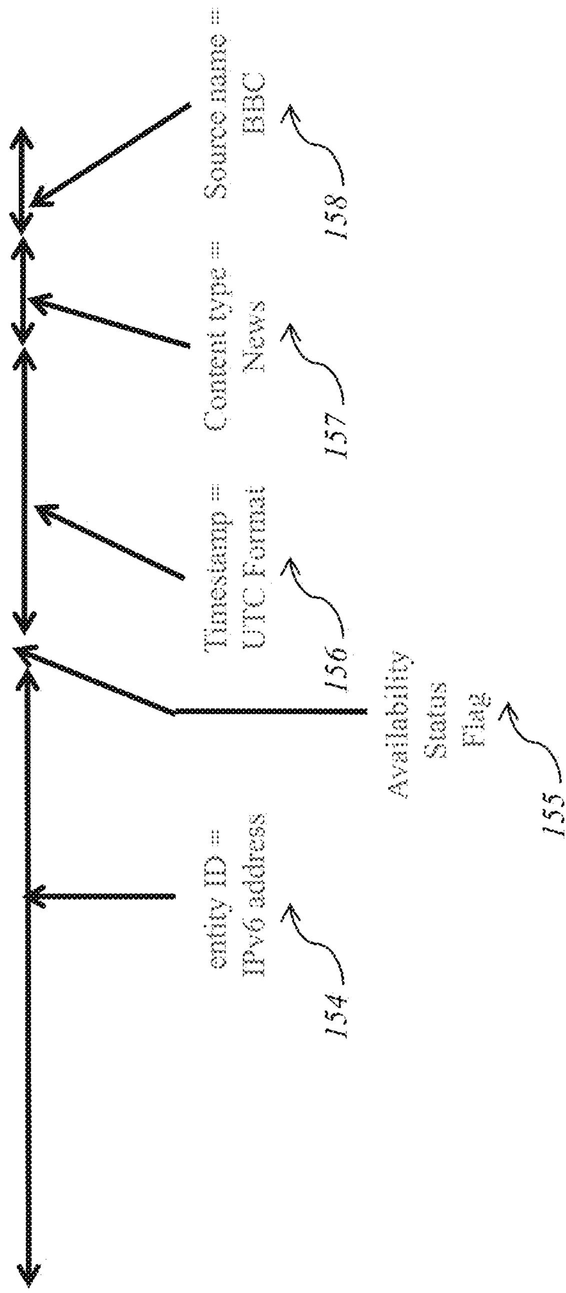
FIG. 28 is a block diagram showing an embodiment having methods for storing smart message summaries in an iPv6-addressable storage system.

FIG. 28 is a block diagram showing an embodiment having methods for storing smart message summaries in an iPv6-addressable storage system, with one IPv6 assigned per entity.

In this implementation, methods assign a unique IPv6 address 156 for each entity known to the knowledge graph. Methods store smart message summaries, including availability status flags 157, time-created timestamps 157, the content type 159 and the name(s) of the author(s) or source of the smart message 160 in a smart message store having data structures optimized for both indexed and sequential reading of such message summaries.

Figure 29:
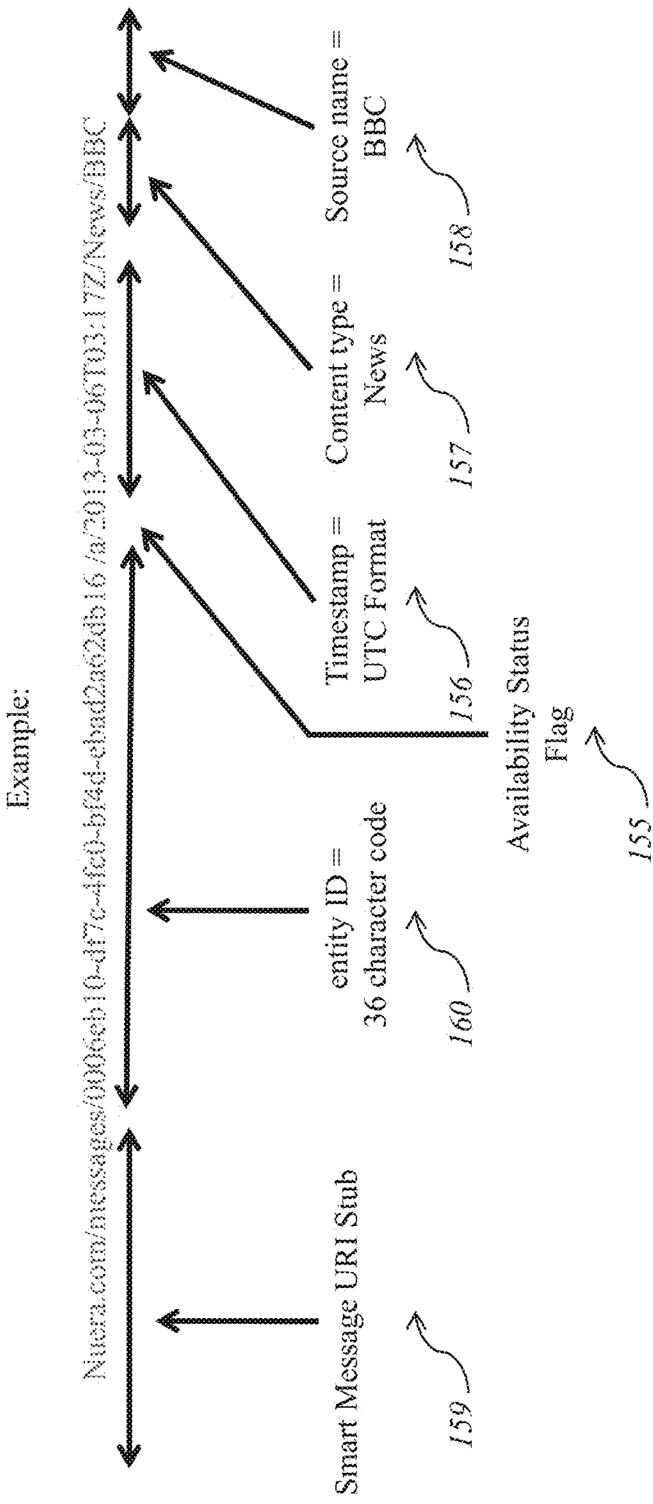
FIG. 29 is a block diagram showing methods for implementing an alternate embodiment storing smart message summaries in an URI-based system.

FIG. 29 is a block diagram showing methods for implementing an alternate embodiment storing smart message summaries in an URI-based system.

In this implementation, methods assign a unique URL stub address 159 for each entity known to the knowledge graph. Methods store smart message summaries, including availability status flags 155, time-created timestamps 156, the message content type 157 and the name of the author(s) or source of the smart message 158 in a smart message store having data structures optimized for both indexed and sequential reading of such smart message summaries.

Figure 30:
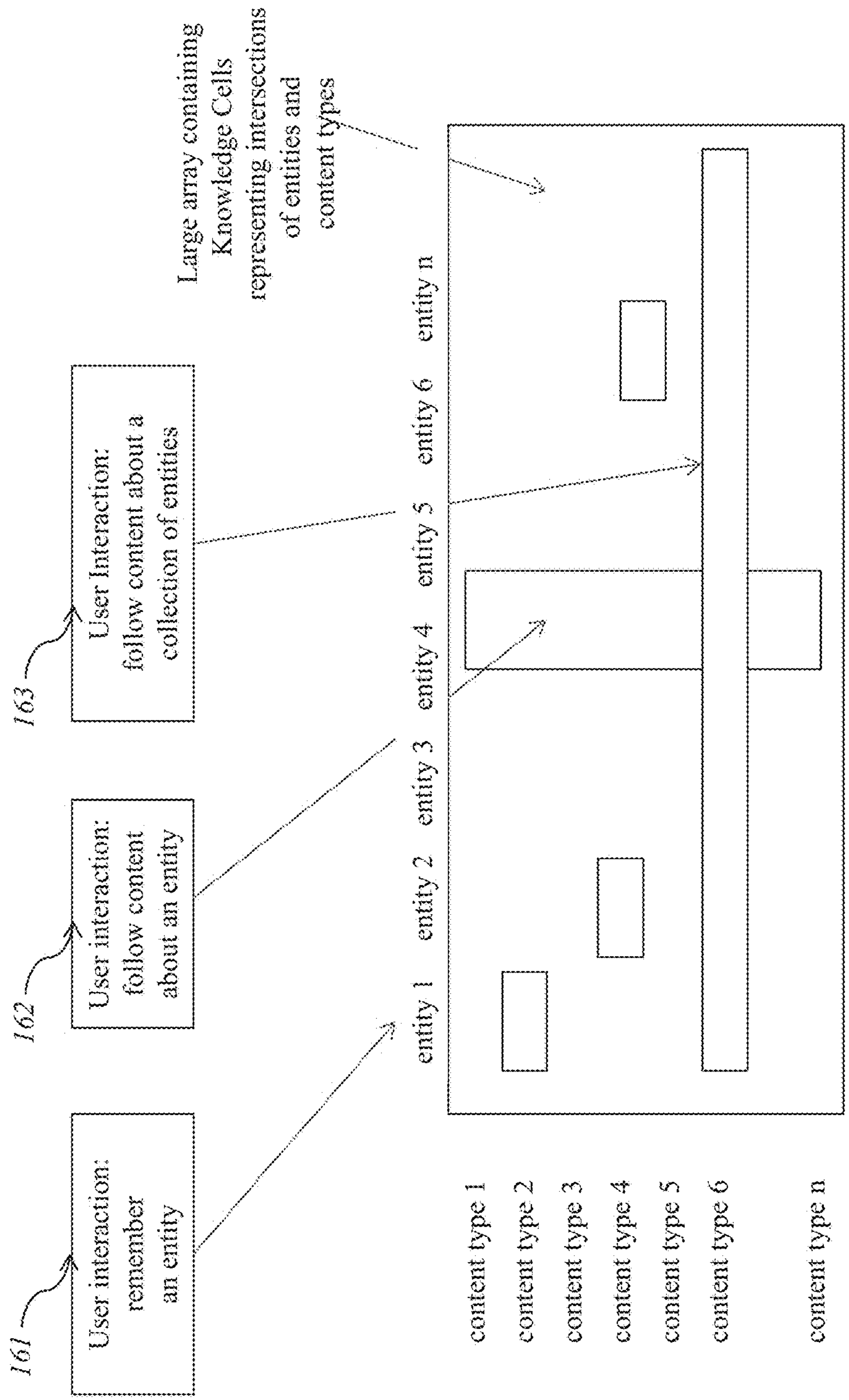
FIG. 30 is a block diagram showing me an embodiment having methods for subscribing to smart message summaries.

FIG. 30 is a block diagram showing an embodiment having methods for subscribing to smart messages.

In an embodiment, methods allow users to: subscribe to 1) smart message summaries about a single type of content about a single entity 161; 2) smart message summaries about multiple types of content about a single entity 162; subscribe to all types of content about a single entity; subscribe to a single type of content about all entities 163; and any other set of content types and entities, or content types and entity types or content types and entity groups with each intersection of a content type and an entity constituting a "knowledge cell" that methods can index, search and present to users.

In an embodiment, methods index use a commercial or open source tool, such as Lucene, or Apache SOLR, which uses the Lucene library, to index smart content in a document database such as MongoDB, as well as knowledge about entities in a graph database such as Neo4J, to create single or multiple federated indexes, such indexes having capabilities for example, to manage full-text search, highlighting of indexed terms, faceted search, dynamic clustering, database integration, and rich document handling.

In and embodiment, methods create "Knowledge Cells," each of which is comprised of "Content Particles" having: 1) a specific type of content 2) about a specific entity, with each knowledge cell indexed by content type and by entity.

This architecture facilitates the ability of a user to follow "news" (a content type) about "Obama" (an entity).

Figure 31:
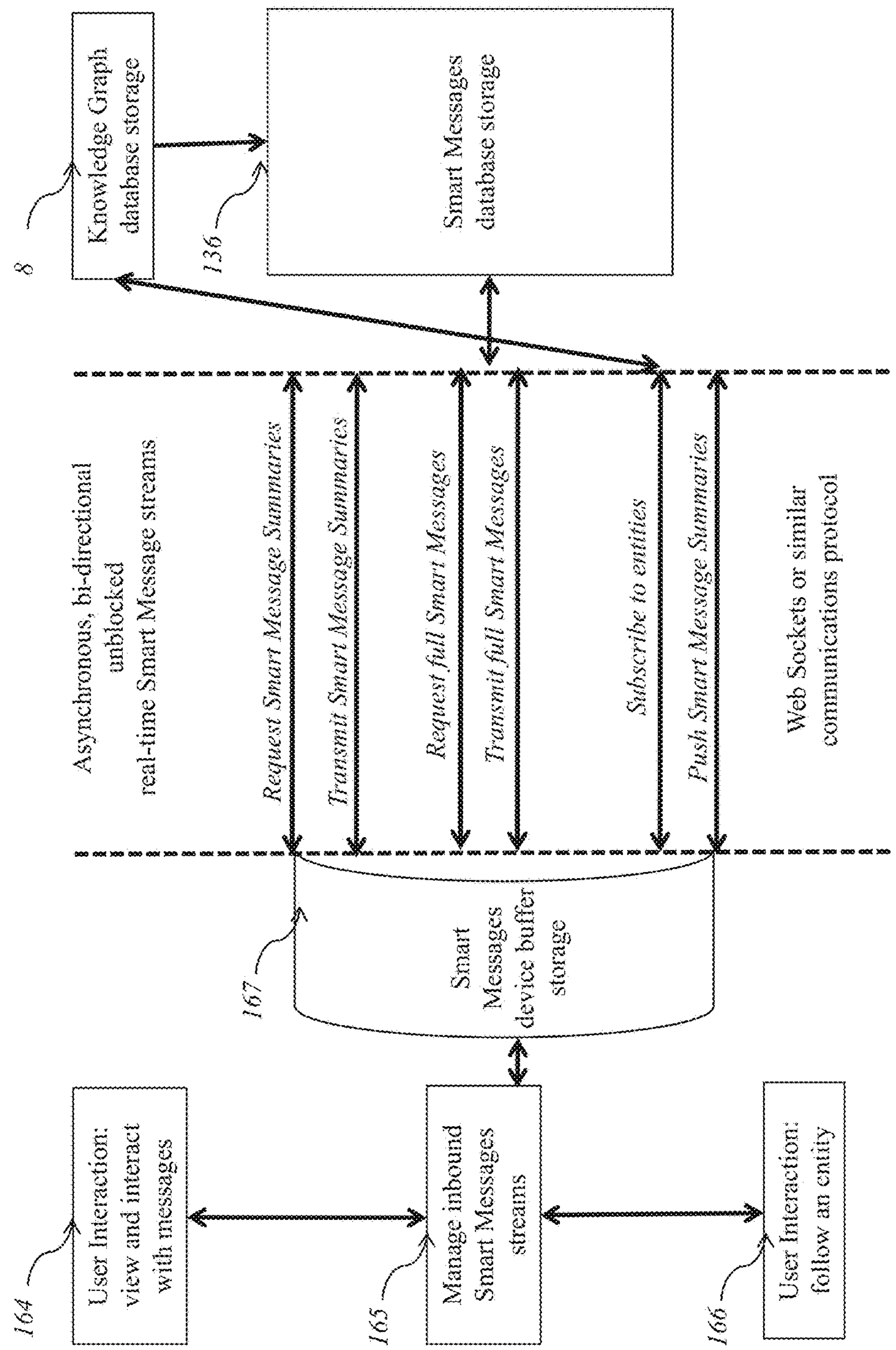
FIG. 31 shows a block diagram showing an embodiment having methods to "Follow" smart messages about any entity.

FIG. 31 shows a block diagram showing an embodiment having methods to "Follow" smart messages about any entity.

In an embodiment, methods allow a user to view and interact with smart messages about any entity 164.

In an embodiment, methods request to receive a continuous stream of smart messages related to a selected entity; manage the organization and composition of this inbound message Stream 165; and manage the storage of the inbound smart message summaries in a real time in a smart messages buffer of device(s) associated with a user 167.

Methods allow "push-based" delivery of a continuous smart message stream to each of the user's registered devices, allowing the user to receive in real time or near real time, alerts about new smart content related to, for example: "Ford Motor Company," or more specifically about "News" (a specific content type) related to "Ford Motor Company." Other examples include allowing the user to subscribe to tweets (a specific content type) regarding a job candidate, or about new deals about an entity type classified as "digital cameras." This ability allows the user to triangulate on a specific type or types of content about a specific entity, allowing the user a single unified user experience for learning about new smart content relevant to entities of interest to them.

Figure 32:
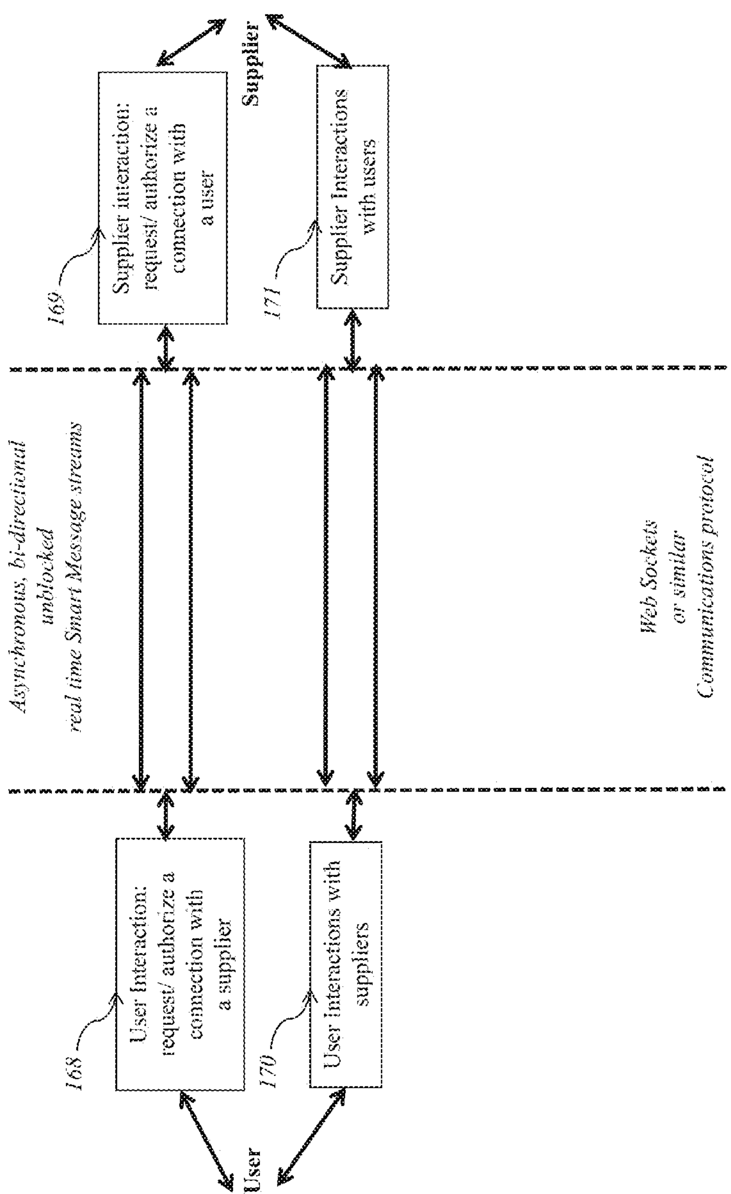
FIG. 32 is a block diagram showing an embodiment having methods allowing users and suppliers to communicate one-to-one in real time.

FIG. 32 is a block diagram showing an embodiment having methods allowing suppliers of commodities, goods, products and services to communicate one-to-one in real time with "opt-in" users explicitly interested in what they may have to offer.

In an embodiment, methods allow bi-directional real time communications between users and suppliers, such communications requiring the user or supplier to request such communications with its counterpart(s) 168, and the user or supplier to authorize such communications with its counterpart(s) 169, In this embodiment, methods allow either party to interact directly with the other party 170, 171 by sending unstructured smart messages, structured smart messages or a combination of structured and unstructured smart messages, examples including: requests from a user for a specific type of content about an entity; requests for deal terms in a structured format from a supplier, supplemented by personalized notes; and indications of interest in buying or offering commodities, goods, products or services.

In one example of such an embodiment, methods may allow a user, or an intelligent agent acting on behalf of a user, to publish a request for a hotel room for a particular date or span of dates, and provide structured parameters indicating the user's preferences and requirements. In this embodiment methods allow a hotel manager to receive requests from users and match user parameters for renting a hotel room on a specified date or span of dates with their inventory of rooms. Methods may also allow the hotel manager to model the risks associated for making a particular price offer, and anonymously issue an offer to the user, along with basic details about the room and the hotel making the offer. Methods may: allow both parties to remain anonymous during this process; allow the user to accept or reject the offer; and allow the user to finalize the transaction in one step, including paying a deposit, or paying for the room.

In an embodiment, methods would allow users, seeking any kind of commodities, goods, products or services to send smart messages to suppliers having inventories that match characteristics of what a user seeks; for a supplier to receive messages only from qualified users; and for a supplier to respond with personalized offers to the user. This embodiment thus creates a personalized one-to-one virtual purchasing system for the user and a highly efficient and cost effective personalized one-to-one marketing system for the supplier.

In various embodiments, the one-to-one marketing interaction paradigm may replace a wide array of existing non-personalized eCommerce systems with personalized interactions that meet the real time needs of users and the real time inventories of suppliers.

Figure 33:
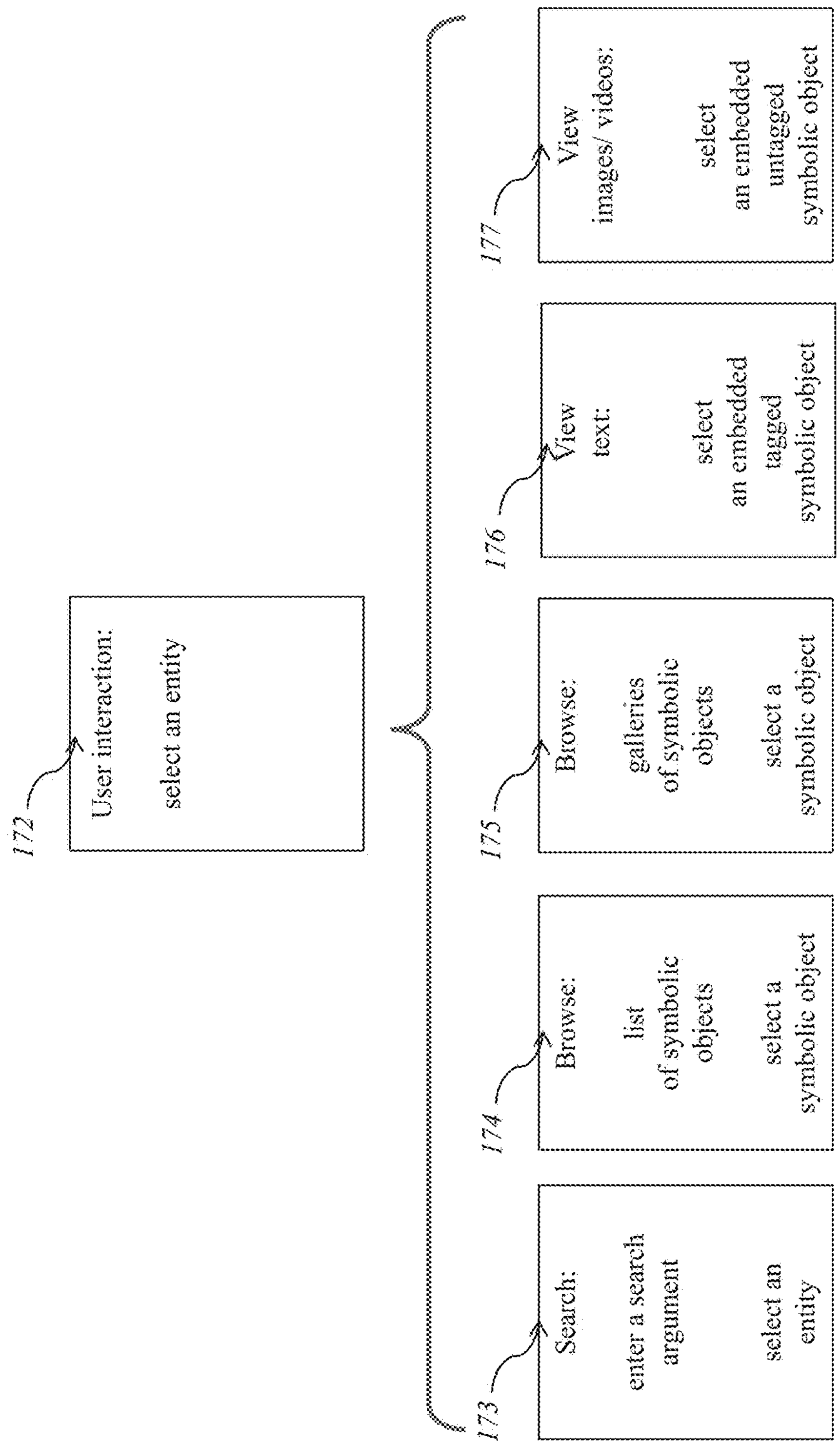
FIG. 33 shows a block diagram of an embodiment having methods for selecting entities for interactions.

FIG. 33 shows a block diagram of an embodiment having methods for selecting entities for interactions.

In this embodiment, methods support: selecting an entity for interaction 172 via 1) searching for entities using key words, assisted by entity knowledge markers 173; 2) selecting a symbolic object representing an entity from among a list of symbolic objects 174; 3) selecting a symbolic object representing an entity from among a gallery of symbolic objects 175; 4) selecting a symbolic object representing an entity embedded in smart text content 176; or 5) selecting a symbolic object representing an entity embedded in untagged content, including text content, image content, images of printed materials and images captured from videos 177.

Methods allow users to select entities for interaction using multiple strategies; giving users the freedom to get what they want how, when and where they want it.

Figure 34:
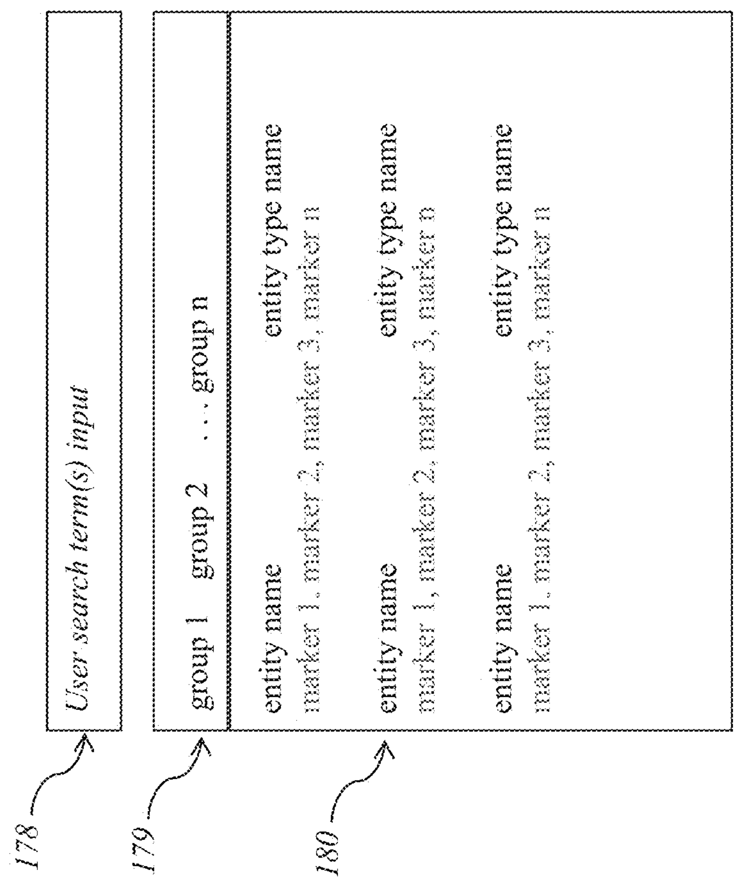
FIG. 34 is a block diagram showing an embodiment having methods to search for entities, assisted by entity knowledge markers.

FIG. 34 is a block diagram showing an embodiment having methods to search for entities, assisted by entity knowledge markers.

In this embodiment, methods for detecting an indication of a user initiated search and activating an "Intelligent Search Agent." Methods support analyzing the incoming stream of characters from a search 178; communicating with a knowledge graph to request a list of entities potentially match the search arguments in the search request; requesting and displaying knowledge markers (properties for disambiguating among entities) associated with those entities 180 organized by entity Groups 179 and entity types 180 to help the user quickly select what they want; and receive a list of valid interaction methods for an entity selected from the list. Such methods serve a similar purpose to methods employed for disambiguating among people based on a small set of specific fingerprint "markers" and other methods employed for disambiguating and discriminating among people and among species of living things based on a small set of "DNA markers." Employing methods to discriminate among symbolic objects and relate them to specific entities using a small set of "knowledge markers" consisting of specific comparable properties may improve up-front disambiguation and indexing of symbolic objects, thereby reducing the potential for the "false" matches that may be returned by many search engines currently employed.

In an embodiment, methods support progressively narrowing the list of such entities upon receipt of further characters in a search argument.

If the Intelligent Search Agent receives more than one potential result, it opens a panel in the user interface; displays a list of potential entities and their knowledge markers 180; organizes the list by the entity group 179 and the entity type 180 of the potential entities.

Methods support monitoring inputs received by the user interface, and upon receiving an indication that the user has selected a specific entity, opening a user interface panel showing a menu listing valid interaction options for the selected entity.

Methods support "crowd understanding" of symbolic objects, by taking into account the number of tunes users associate a specific symbolic object having specific characteristics with a specific entity, as well as the levels of expertise of users making such associations. Additional methods may then highlight or otherwise indicate that a specific entity is the most likely match for a specific symbolic object indicated to be of interest to a user.

Current methods for searching Web content and many other types of content index such content using Lucene or another such indexing tool to allow searching for specific character strings. These methods return content that may or may not have relevance to the user. In an embodiment, methods provide instant access to knowledge about specific entities, allowing the user to precisely specify which of these entities he or she wishes to interact with. This collaboration between humans and machines provides greater control by users, and may reduce time spent navigating among various Web pages by a user to find what he or she wants.

Figure 35:
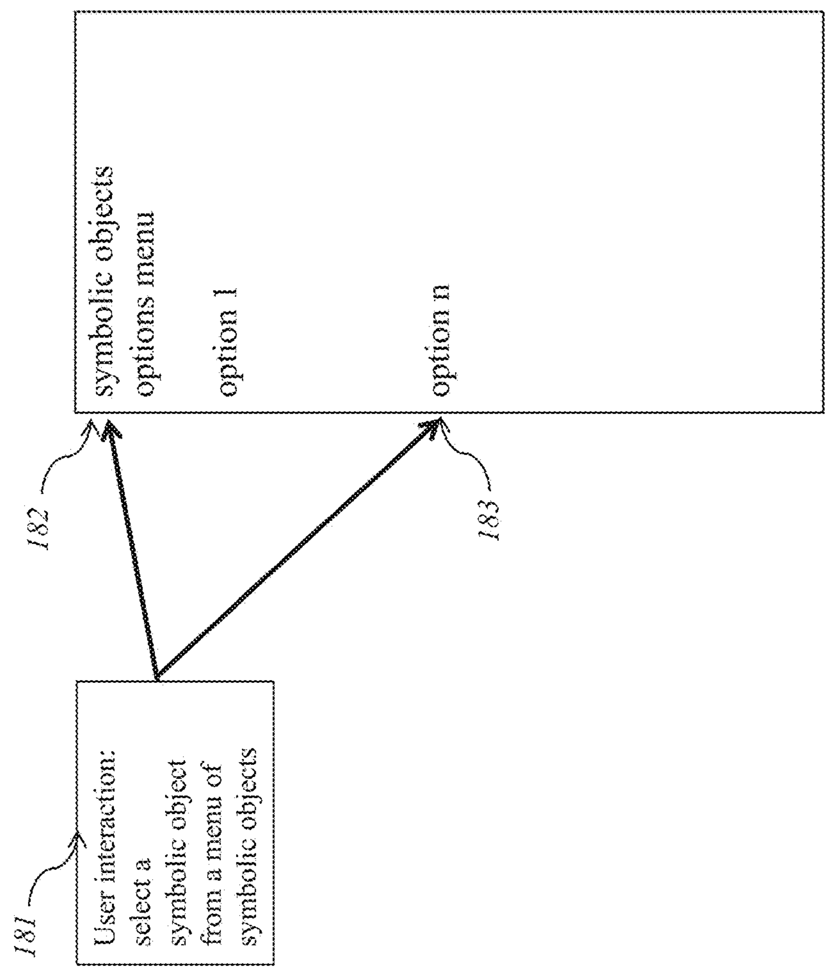
FIG. 35 is a block diagram showing an embodiment having methods for selecting an entity of Interest from among a list of symbolic objects.

FIG. 35 is a block diagram showing an embodiment having methods for selecting an entity of interest from among a list of symbolic objects.

In an embodiment, methods support displaying a list of symbolic objects in a panel in the user interface 184, and detecting an indication that the user has selected a specific symbolic object 185 from this list 153.

In this embodiment, each item in the list of symbolic objects is associated with a unique entity, along with its entity group and entity type. If the entity is a content entity each item in the list of symbolic objects is associated with the content type of the entity.

In an example of this embodiment the system may display a list of topics for browsing news content, each such topic being a symbolic object easily understandable by users. When the user selects one of these topics, methods then retrieve news content related to the selected entity.

Figure 36:
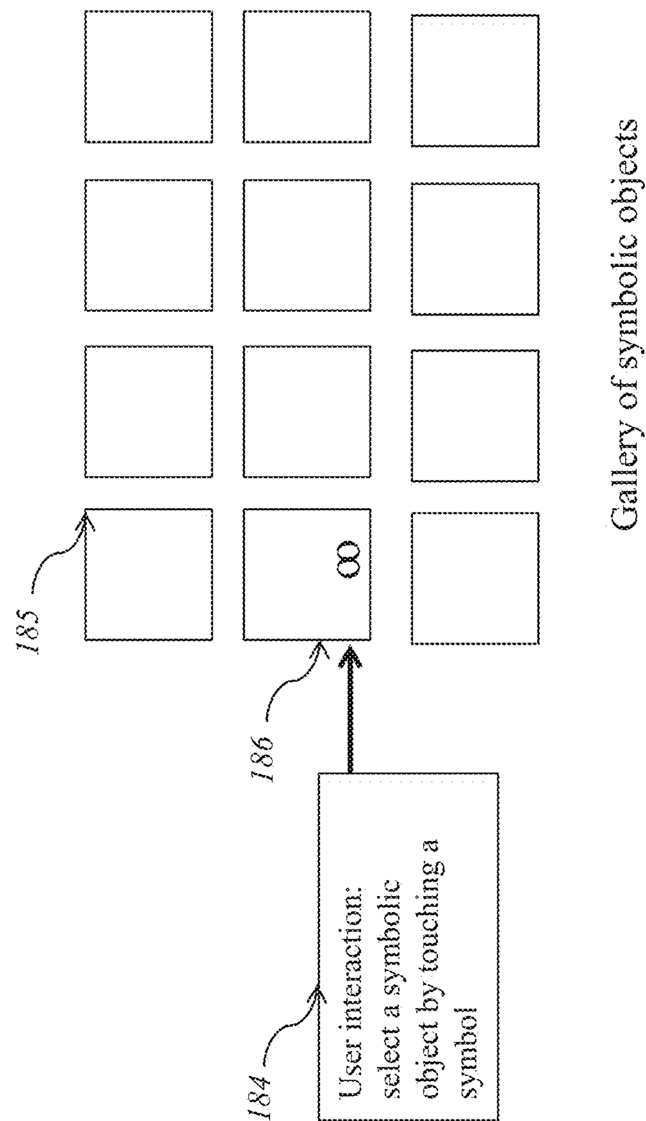
FIG. 36 is a block diagram showing an embodiment having methods for selecting an entity from among a gallery of symbolic objects.

FIG. 36 is a block diagram showing an embodiment having methods for selecting an entity from among a gallery of symbolic objects.

In this embodiment, methods support: displaying a gallery of visual symbolic objects in the user interface 185 and detecting an indication that the user has selected a symbolic object from this gallery 184.

In this embodiment, each item in the gallery of symbolic objects, for example a "thumbnail image" of the cover of an eBook, is associated with a unique entity (i.e. an eBook), along with its entity group and entity type.

In an embodiment, methods support placing a consistent icon 186 to flag an entity with which the user may interact, adjacent to or within each symbolic object in the gallery, such icon being responsive to user indications of interest, and any such indication of interest triggering methods that retrieve and display a list of valid methods for interacting with the entity of interest to the user.

Figure 37:
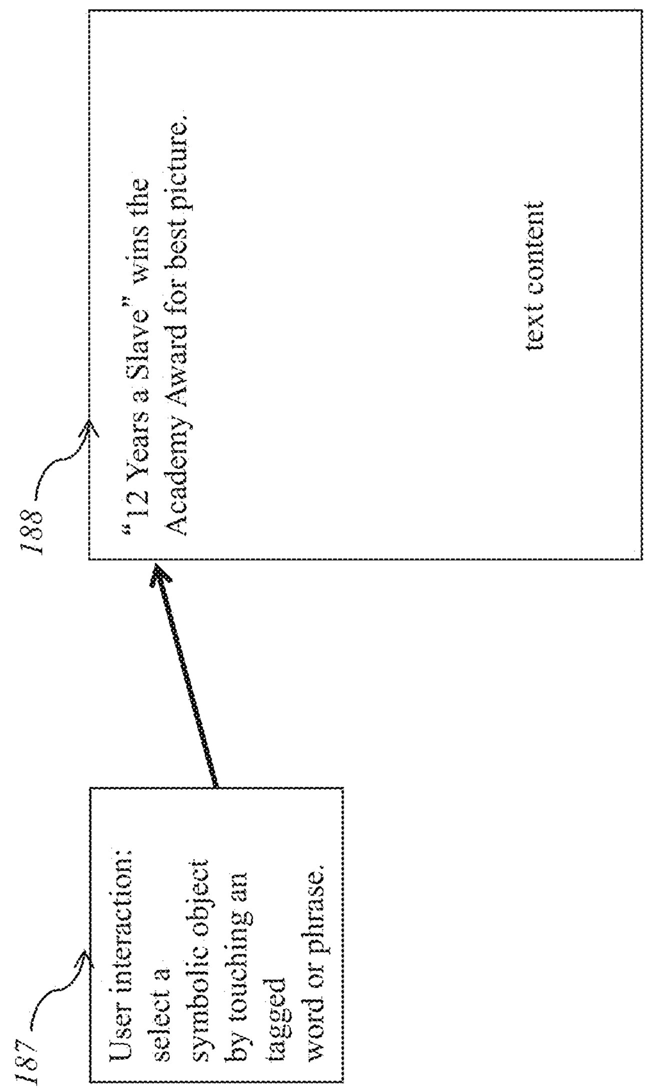
FIG. 37 is a block diagram showing an embodiment having methods for selecting a tagged symbolic object embedded in smart text content.

FIG. 37 is a block diagram showing an embodiment having methods for selecting a tagged symbolic object embedded in smart text content.

In an embodiment, methods support displaying smart content objects consisting of text, with each such textual symbolic content object having one or more embedded knowledge-tagged symbolic objects. Methods support detecting an indication that the user has selected a specific hidden knowledge-tagged symbolic object 187. The knowledge-tag 188 associated with the symbolic object consists of an entity id for the entity represented by the symbolic object, along with the entity group and entity type for the entity.

Figure 38:
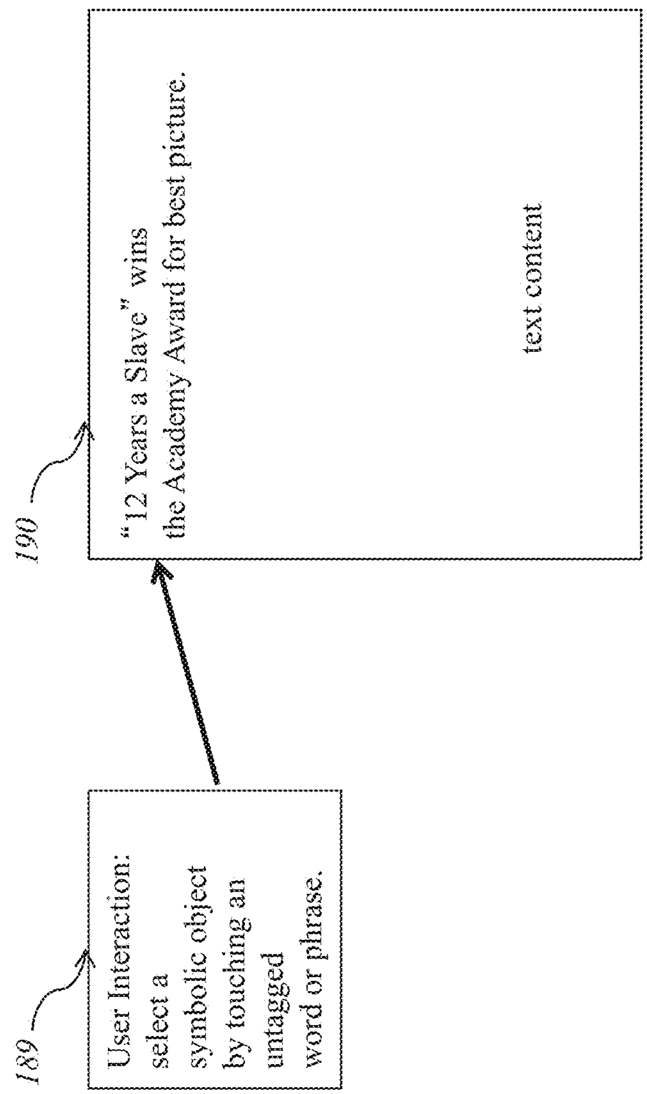
FIG. 38 is a block diagram showing an embodiment having methods for selecting an untagged symbolic object embedded in smart text content.

FIG. 38 is a block diagram showing an embodiment having methods for selecting an untagged symbolic object embedded in smart text content.

In an embodiment, methods support displaying symbolic objects consisting of text, such symbolic objects having untagged symbolic objects; detecting an indication the user has selected a physical region of the content object 189; and activating symbolic object recognition methods. If the symbolic object recognition methods recognize a symbolic object inside the physical region 190, methods request knowledge about the symbolic object from the knowledge graph, including the entity id of the entity represented by this symbolic object, and its entity group and entity type.

Figure 39:
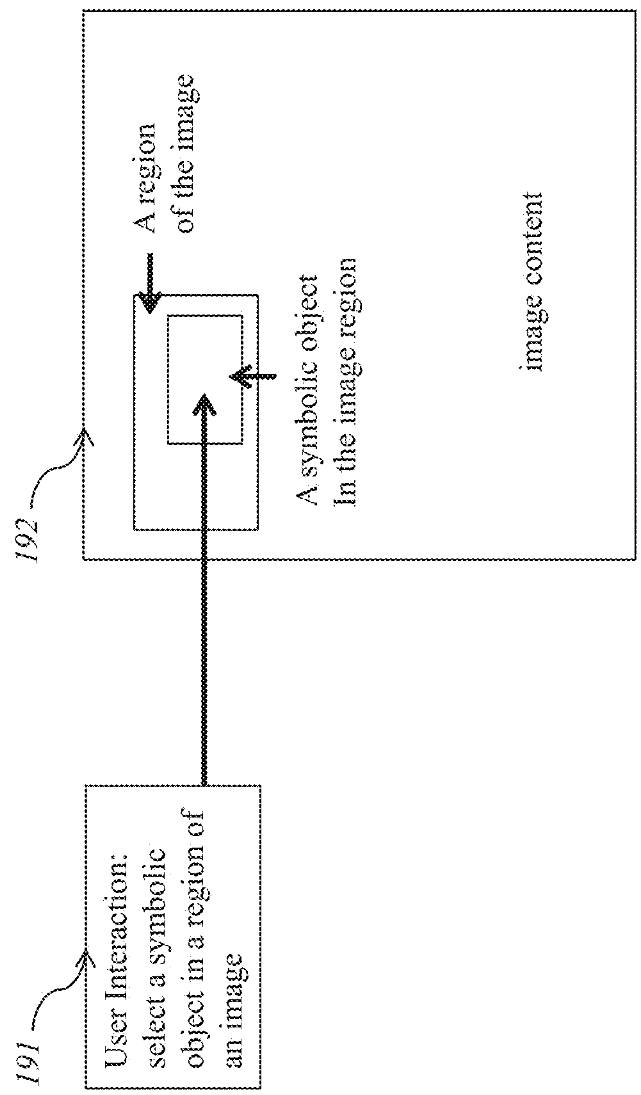
FIG. 39 is a block diagram showing an embodiment having methods for selecting an untagged symbolic object embedded in an image object.

FIG. 39 is a block diagram showing an embodiment having methods for selecting an untagged symbolic object embedded in an image object.

In an embodiment, methods support displaying an image object, having untagged symbolic objects embedded within it; detecting an indication the user has selected 191 a physical region of the image object 192; and activating symbolic object image recognition methods. If the symbolic object image recognition methods recognize a symbolic object inside the indicated physical region, methods request further knowledge from the knowledge graph, including the entity id of the entity associated with this symbolic object, and its entity group and entity type.

Figure 40:
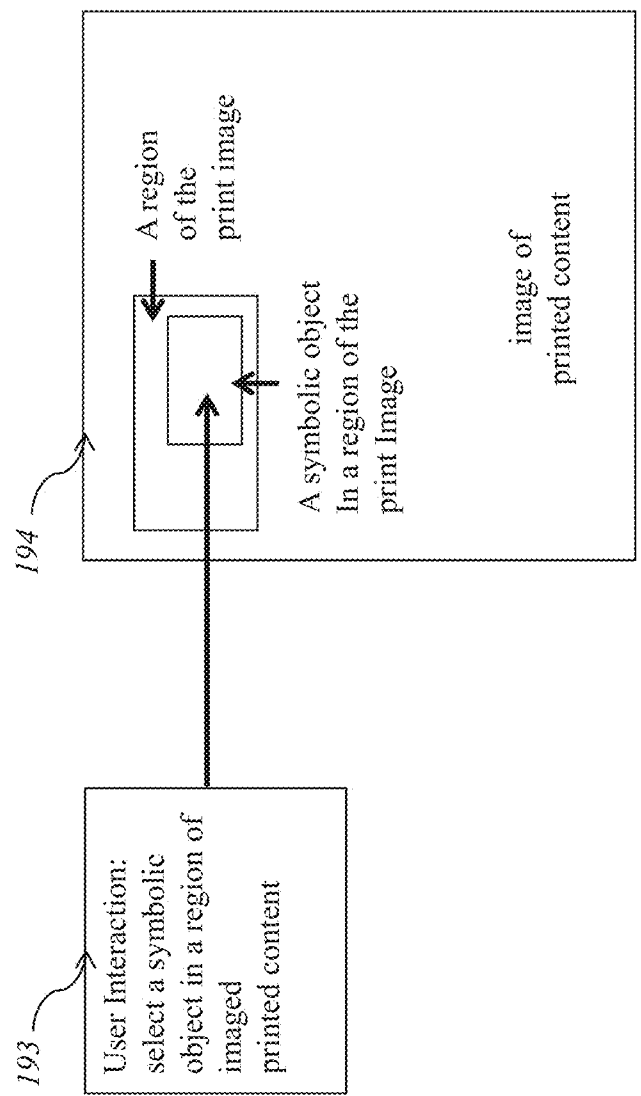
FIG. 40 a block diagram showing an embodiment having methods for selecting an untagged symbolic object embedded in printed content.

FIG. 40 a block diagram showing an embodiment having methods for selecting an untagged symbolic object embedded in printed content.

In an embodiment, methods support: capturing an image of a printed content object, such image having embedded untagged symbolic objects 194; detecting an indication the user has selected a physical region of the printed content image object 193 and activating symbolic object image recognition methods.

If the symbolic object recognition methods recognize a symbolic object inside the indicated physical region, methods support requesting knowledge from the knowledge graph, including the entity id of the entity associated with this symbolic object, and its entity group and entity type.

Figure 41:
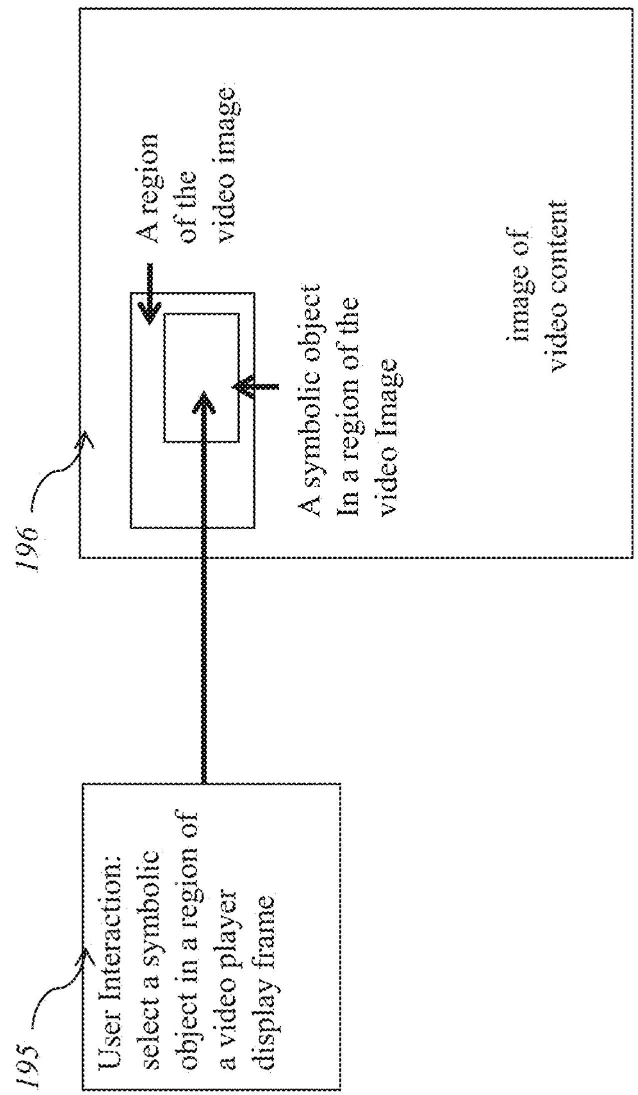
FIG. 41 is a block diagram showing an embodiment having methods for selecting an untagged symbolic object embedded in video content.

FIG. 41 is a block diagram showing an embodiment having methods for selecting an untagged symbolic object embedded in video content.

In an embodiment, methods support monitoring the user interface of a video player for indications of interest from users while viewing an untagged symbolic object embedded in the video 196, such indications occurring when a user touches a region of interest in the video player display 195. Upon such indication, methods support capturing an image from the video content object.

Methods support detecting an indication the user has selected a physical region of the video object; activating symbolic object image recognition methods; recognizing a symbolic object inside the indicated physical region; requesting knowledge from the knowledge graph, including the entity ID of the entity associated with this symbolic object, and its entity group and entity type.

Figure 42:
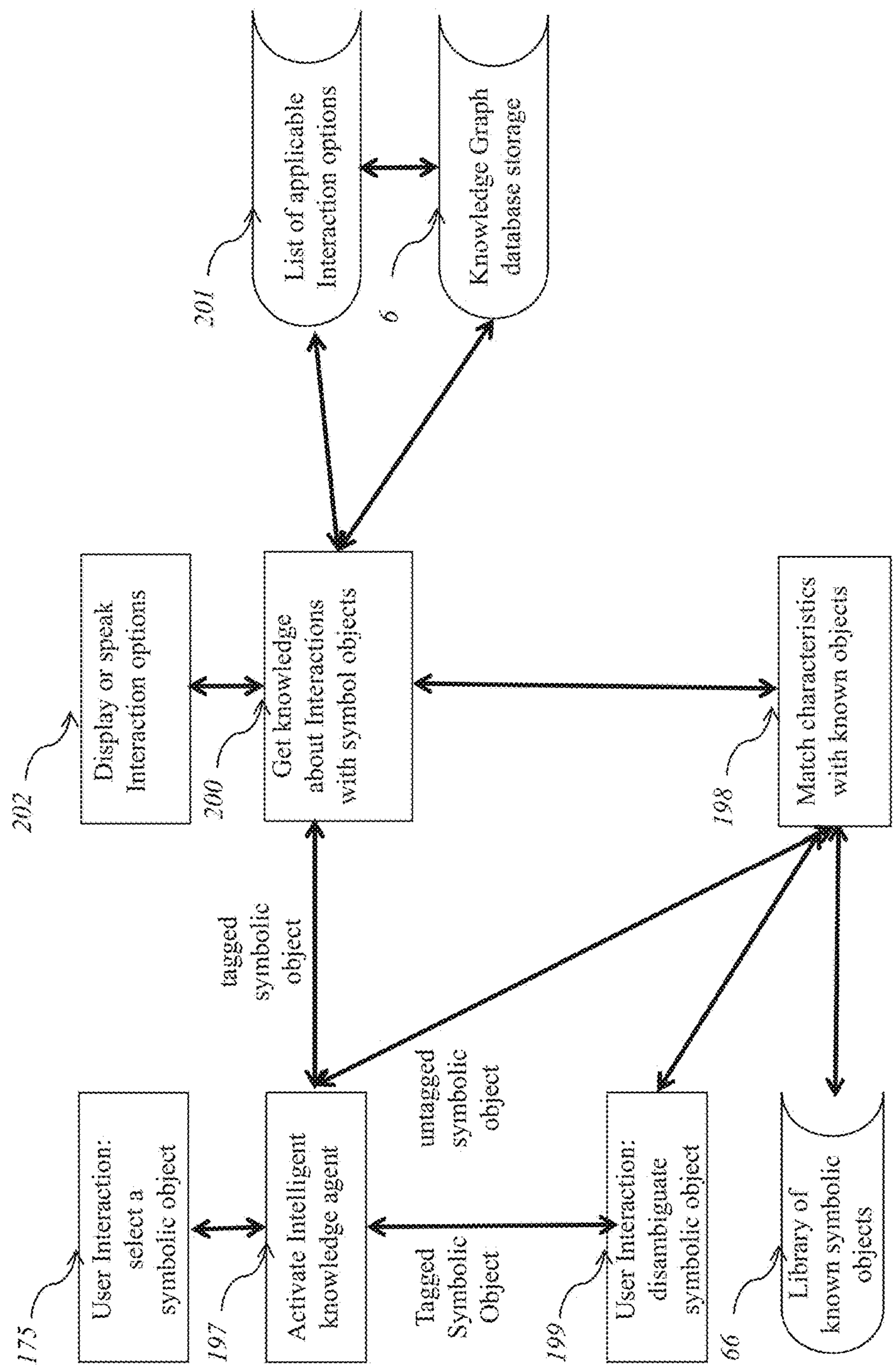
FIG. 42 is a flow chart showing an implementation having methods for accessing knowledge about applicable interactions for entities.

FIG. 42 is a flow chart showing an implementation having methods for accessing knowledge about valid interactions for entities.

In an embodiment, methods support receiving an indication that a user has selected or referenced a knowledge-tagged symbolic object representing an entity 175, and activating an Intelligent Interaction Agent upon such an indication 197.

In this embodiment, if the indication is about selection of a knowledge-tagged symbolic object, the Intelligent Interaction Agent requests knowledge from the knowledge graph about currently valid interaction methods for this entity 200.

In this embodiment, if the indication is about a user selection of an untagged symbolic object, the Intelligent Interaction Agent initiates methods to determine the characteristics of the region of attention 198, including its relative physical location within an image or video, and attempts to recognize the symbolic object and relate it to an entity known in a library containing the characteristics of known symbolic objects 66.

In an embodiment, functions display possible entities that may match the symbolic object displayed to the user and respond to indications from the user selecting one of the entities 199.

In this embodiment, the Intelligent Interaction Agent implements functions to display to the user a list of possible valid Interactions for the selected entity 201, such valid interactions being known to the knowledge graph. Upon receiving an indication, either from a responsive display or from spoken terms, that the user has selected one of these interaction methods, the Intelligent Interaction Agent activates a Smart Interaction Module, which the user can utilize to interact with an entity of interest.

In an embodiment, functions performed by the Intelligent Interaction Agent are implemented locally on the user's device in JavaScript, or in a function implemented in a computer programming language understood by the operating system of the user's device.

Figure 43:
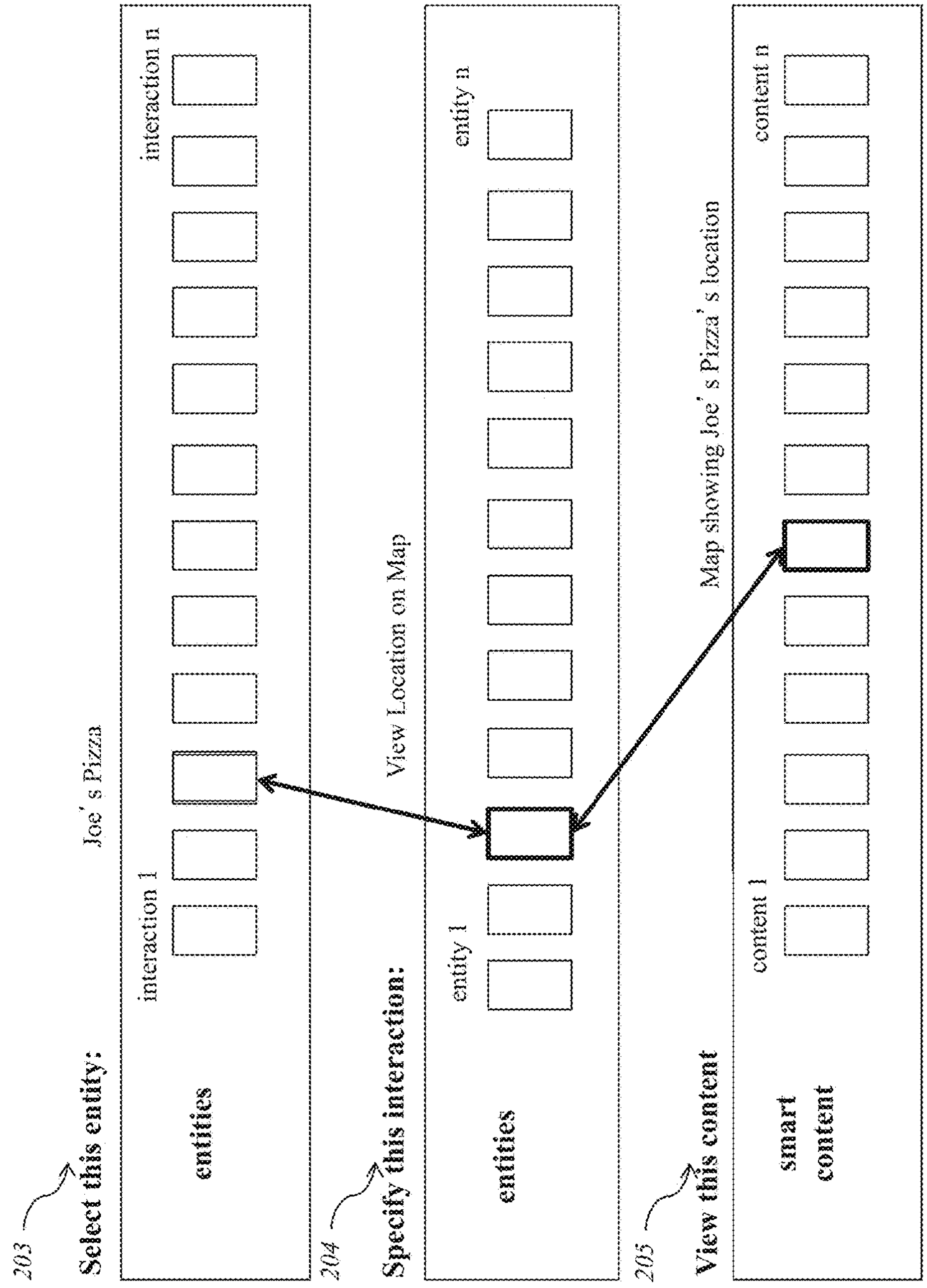
FIG. 43 is a block diagram showing an embodiment having methods to manage user interactions with entities, starting with the user selecting an entity.

FIG. 43 is a block diagram showing an embodiment having methods to manage user interactions with entities, initiated by the user selecting an entity.

In an embodiment, the user first selects an entity 203 using any of a variety of methods. An Intelligent Interaction Agent presents the user with a menu list of valid ways to interact with this entity, with items in the menu limited only to interactions valid for this entity, such valid interactions being appropriate from the user's specific location, at a specific point in time. The Intelligent Interaction Agent gathers and correlates inputs from the user, the user's device and the knowledge graph, then presents the interaction options to the user. The user then selects one of the valid interaction methods 204 and interacts with content and other resources related to the entity 205.

In an example of this embodiment, the user may select a symbolic object representing a restaurant, the Intelligent Interaction Agent will request data about the user's location from a function residing in the user's device and request a list of currently valid interaction methods for this restaurant from the knowledge graph. If the restaurant has an interactive reservation system, in this example, the Intelligent Interaction Agent will display "Make a Reservation" as a valid interaction method in the user interface. If the restaurant delivers food or provides food pickups, it may show "Order Delivery" or "Order Pickup" in the user interface.

In another example of this embodiment, the user may select a symbolic object representing a NASDAQ Company; the Intelligent Agent will display "Market data" as an interaction option in the user Interface, and set up a connection to a Web Service, for example, the Yahoo Finance Market data Web Service. Methods allow for automated interactions without the need for step-by-step user inputs.

Figure 44:
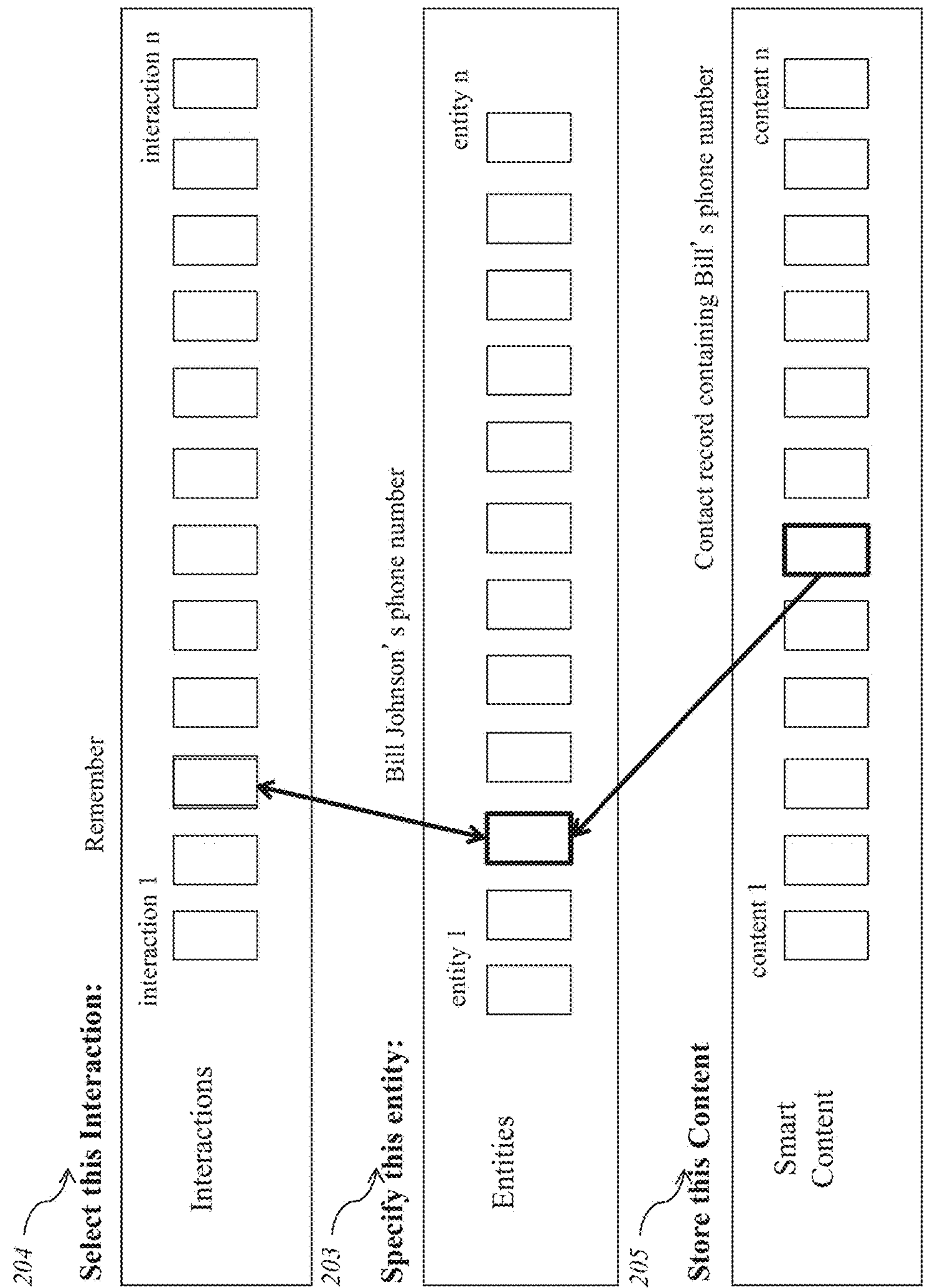
FIG. 44 is a block diagram showing an embodiment having methods to manage user interactions with entities, starting with the user selecting an interaction method.

FIG. 44 is a block diagram showing an embodiment having methods to manage user interactions with entities, initiated by the user selecting an interaction method.

In an example of this embodiment, the user may enter or select an interaction called "Remember anything," and then input a phone number in an entry box. The Intelligent Agent will recognize this input as a phone number and ask details about this phone number, such as the name of the person or company having this phone number. The user may then specify that this number is for Bill Johnson's cell phone, and the Intelligent Agent will then create an entity node for this phone number. If the Knowledge Graph does not know about Bill Johnson, the intelligent agent will ask the user to supply additional details, and then create an entity node for Bill Johnson and link this node to the phone number node. It will then create a relationship between the entity node representing the user and an entity node representing Bill Johnson.

FIG. 45 is a decision matrix showing an embodiment having methods for managing user interactions with entities.

In an embodiment, the metadata has knowledge about valid interaction methods 210 that may apply universally to all entities 206, such universal interactions including, for example: "Remember" [an entity], "Follow" [an entity], "Make a note" about [an entity], "Ask a question" about [an entity] or any of many other such interactions with universal utility.

In an embodiment, the metadata has knowledge that that certain valid interaction methods 211 apply only to entities belong to one or more entity groups 207, for example: "Locate" [an entity] can only apply to people, places, facilities, etc., (i.e. entities having a physical embodiment at one or more locations.)

In an embodiment, the knowledge graph has knowledge that certain valid entity type interactions 212 apply to entities belonging to one or more specific entity types 208.

In an embodiment the knowledge graph has knowledge that certain specific interaction methods 213 apply to entities having specific entity properties and/or relationships with other entities 209, for example: an entity denoting a restaurant may or may not support reservations, a fact that may be known to the knowledge graph.

Figure 46:
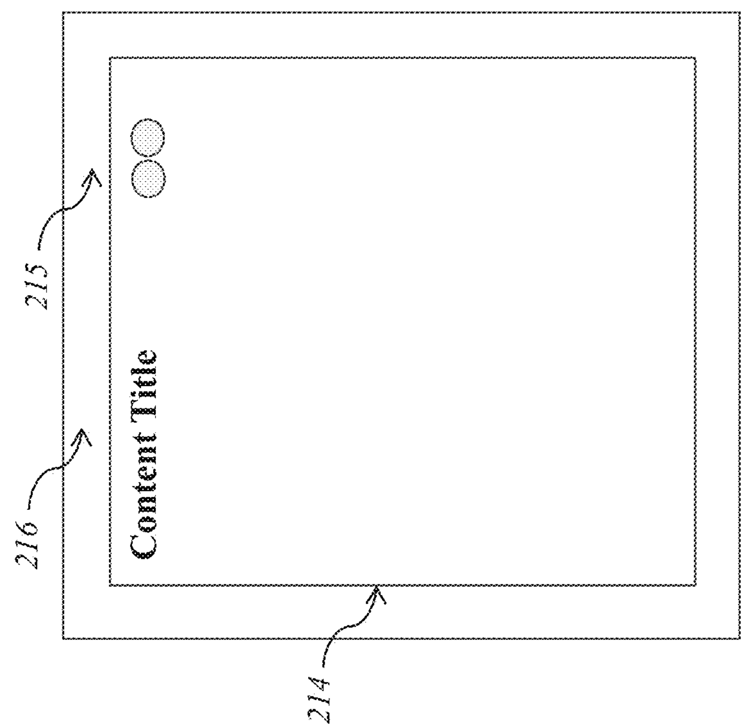
FIG. 46 is an illustration showing an embodiment having methods for using an icon to select a smart content record for interaction.

FIG. 46 is an illustration showing an embodiment having methods for receiving an indication of interest in an entity by a user based on the user touching or clicking on an icon to select a smart content record for Interaction.

In an embodiment, methods allow users to indicate an interest in content entities 214 by touching or clicking on an icon 215. The icon may be located next to the title of the content 216 or, if an image, adjacent to the image, or even embedded in the image.

FIG. 47 is a block diagram showing examples of an implementation having methods for interacting with varying types of smart content.

The term "content" denotes an entity that provides information about one or more symbolic objects. The term "smart content" denotes content having a record with at least two components, a component containing the "source content" and a component having a "knowledge map" comprised of identifiers for one or more entities related to the content, relationships between the entities and the content and relationships between the entities and other entities.

In an embodiment, each content object has an entity group (for content, the entity group is "Content") 217 and an entity type (also called a "content type," an example being a "Blog") 218. A metadata table defines a default file type (for example: .txt) for each content type (for example: "article").

In an embodiment, some original content from resources is comprised of structured content elements.

In such an embodiment, methods access content from content resources, such source content having content elements named by the resource. Methods store the names of these content elements in a data dictionary in the metadata and map them to standard entity properties defined in the metadata database. Methods compare the data type for each such source content element with data in the metadata and map the source content elements to data types implemented in the knowledge graph database and the smart content database. An example would be a content-object from YouTube, comprised of content elements that include the name of a video, the name of the creator, the date of creation, etc. In an embodiment, methods normalize the names and data structures implemented by YouTube to content properties defined in the metadata 1.

In an embodiment, some content objects are comprised of unstructured content, an example being a content type named "Articles" or a content typed named "Jokes."

In an embodiment, methods link each content object with a default Smart Interaction Method 221 applicable to that content type, with the default Smart Interaction Method varying according to the content type. For example, an eBook may have a default Smart Interaction Method of "Read an eBook" while a video may have a default interaction method of "Play a video." Selecting a content object activates an Intelligent Interaction Assistant that displays possible interactions with this content object and defaults to the default Smart Interaction Method.

In an embodiment, methods manage all aspects of a user's interactions with content of interest. In this embodiment, users may touch or select any content object they see in the user interface and "Remember" it, an interaction that adds this content to their personal "Memory Bank," a cloud-based service containing everything a user wishes to remember, organize and access at any time, including: articles; tweets; websites; images; videos; eBooks; contact cards; messages; research reports; reviews about a product, or indeed, any type of content about any type of product or service; facts, such as the VIN number of a car; events such as birthdays quotations; jokes; notes about anything; comments about anything; reactions, ratings and reviews for any type of commodity, product, service, place or event; records about anything, such as an employment record; lists of people, including current and former classmates, current and former work colleagues; current and former customers; lists of services, including hotels, restaurants, spas, golf courses and much more.

In this embodiment, methods continuously update content properties as the Intelligent Internet system learns about changes to the smart content database, for example, a restaurant may change its hours of service and post this change to the smart content database, and any user having that restaurant in their personal memory bank will have access to the updated properties at any time.

Figure 48:
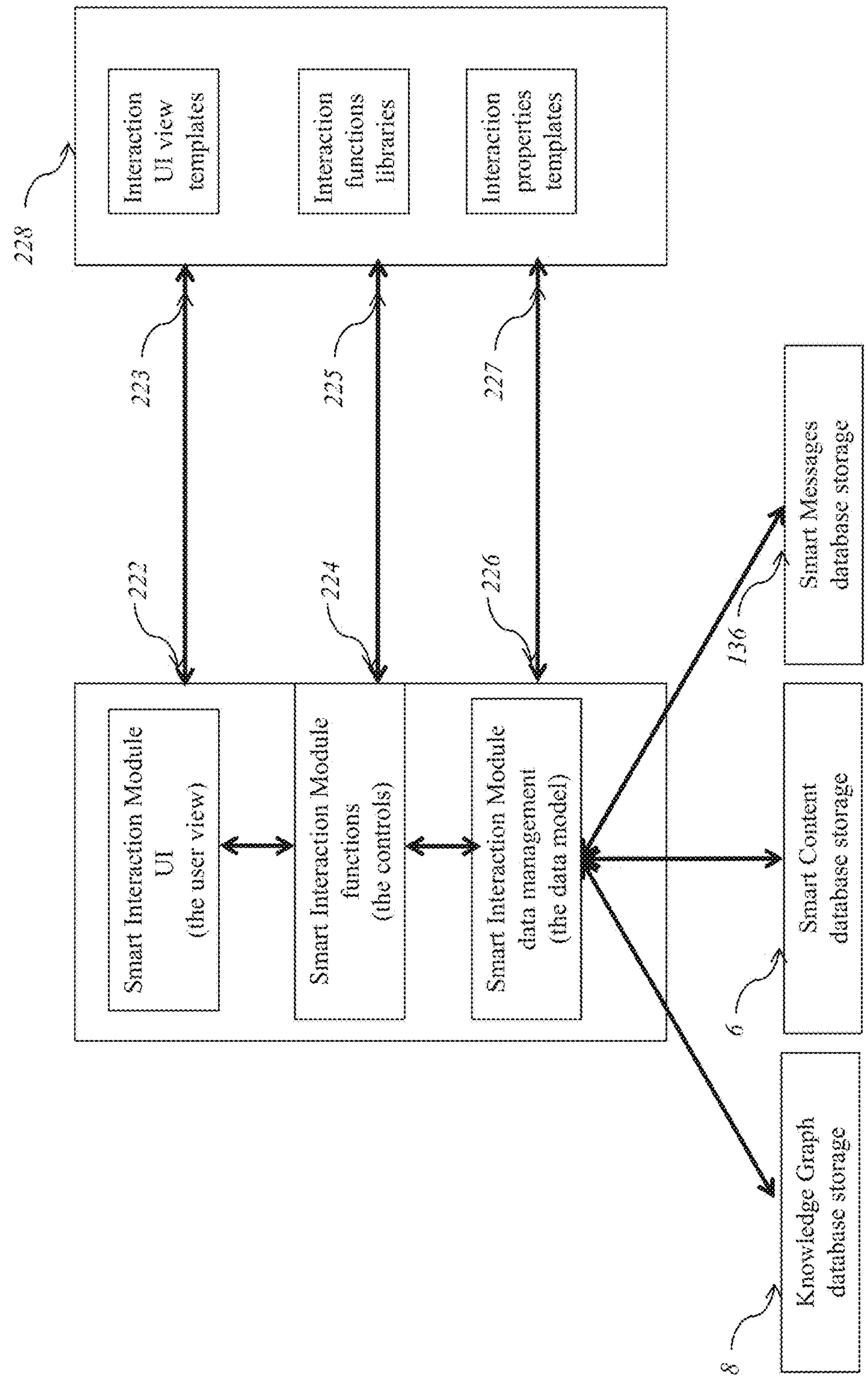
FIG. 48 is a block diagram showing an implementation having methods for interacting with entities using "smart interaction modules" ("SIMs").

FIG. 48 is a block diagram showing an implementation having methods for interacting with entities using "Smart Interaction Modules." ("SIMs")

In an embodiment, each Smart Interaction Module is implemented in an integrated 3-level Model-View-Controller ("MVC") structure.

In this embodiment the Model is based on the entity properties implemented in the knowledge graph and the smart content database; the "view" 222 consists of CSS and HTML software code, designed for use with a templating engine such as "Handlebars," and built utilizing a development framework such as angular.js 223; and the "controller" functions 224 are implemented in JavaScript or a language understood by the operating system for the user's device and packaged into functions libraries 225. The data model 226 is defined in the metadata in the form of tables defining data model templates for each Smart Interaction Method 227. The methods implementing the model, view and controller are packaged as complete "Smart Interaction Modules" or "SIMs" 228, having methods for performing create, read, update and delete transactions with a knowledge graph database 8, a smart content database 6 and a smart messages database 136.

FIG. 49 illustrates a design showing an implementation having methods for managing an "Adaptive User Interface" responsive to user selections, user contexts and inputs from network-connected devices.

In this implementation, methods allow users to select an "activity mode" 229, comprised of a set of related activities, allowing the user to operate, for example: in a "Personal" mode, a "School" mode, "Work" mode, "Family" mode, "Research" mode," etc.

In this implementation, methods allow users to select a specific "activity" 230, comprised of a single, focused set of interactions, for example: "Read News," "Read an eBook," "Watch TV," "Manage Travel," "Shop for Products," "Shop for Service," etc.

After selecting a particular activity, in this implementation, methods allow users to select particular "activity options," 231 for example: while reading news, the user may select to browse news topics, and select a broad topic such as "sports," or a more narrow topic such as "Dallas Cowboys."

Once focused on a particular activity option, in this implementation, methods allow the user to select among various "interaction options," 232 for example: upon selecting to read news about the "Dallas Cowboys," the user may "browse news summaries" about the Dallas Cowboys, "browse videos" about the Dallas Cowboys, or undertake any valid method for interacting with the Dallas Cowboys.

Finally, in this implementation, methods allow the user to "Interact" with an entity of interest within a dedicated "Interaction Panel" 23.

Figure 50:
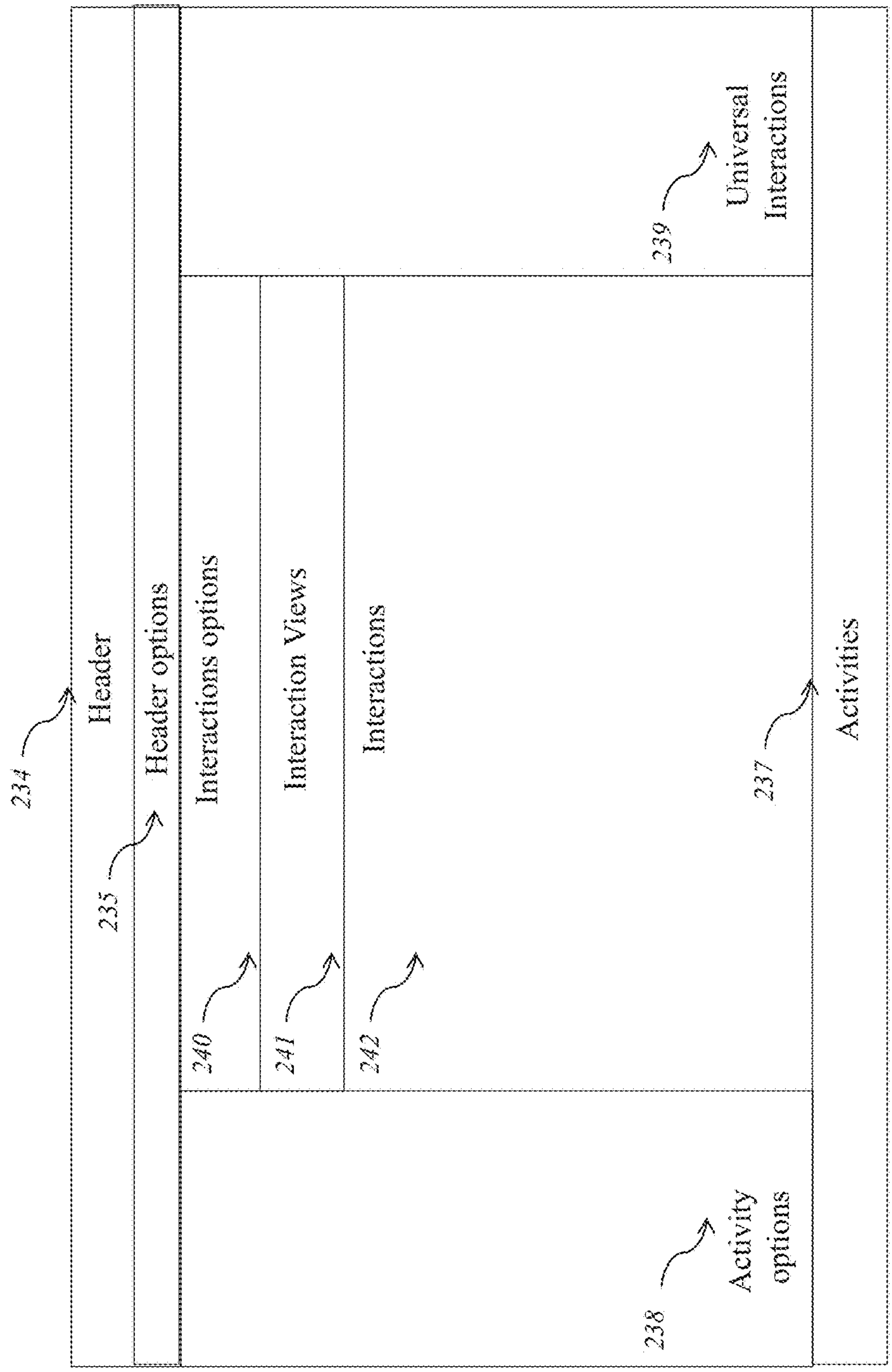
FIG. 50 illustrates a design showing an implementation having methods for managing an adaptive user interface on one page.

FIG. 50 illustrates a design showing an example of an implementation having methods for managing an adaptive user Interface on a single visual "page."

In this example a "header panel" 234 consists of a visual container displaying elements, including for example, a "user search term input box" 178, allowing the user to indicate a word or term of interest representing an entity with which the user would like to interact.

In this example, a visual container referred to as a "header options panel" 235 contains controls allowing the user, for example, to: select an "activity mode" 229, indicating the user's focus on a related set of activities; view a "history" of prior interactions," "manage routines" of frequently repeated sequences of interactions, etc.

In this example, a visual container referred to as an "activities" panel 237 containing options allowing the user to select among specific activities such as, for example: "News," "Images," "Videos," "eBooks," "TV," "Office Documents," "Travel," "Shopping," "Services," etc.

Having selected "News," in this example, a visual container referred to as an "activities options" panel 238 displays a pane showing options for reading news, for example: "My News," "Health," "Politics," "Sports," "Technology," etc.

In this example, a visual container referred to as a "universal interactions" panel 239 contains options allowing the user to indicate his or her desire to seek help in interacting with something. Examples of universal interactions may include, for example: "Remember anything," "Follow anything," "Share anything," "Ask a question about anything," "Record anything," and other such interactions people commonly may seek help performing.

For this example, a user may touch "Remember anything" on the screen of his or her Smart Phone, then enter a phone number, or the name of a person, or drag something from the interactions panel container (for instance, a paragraph from a news article) onto the "Remember anything" box. An intelligent agent will recognize the characteristics of what the user wishes to remember (for instance, it will recognize a phone number) and interact with the user to determine further details about the entity the user wishes to remember, then interact with the knowledge graph database to create a node for this phone number and link it to a person or company and interact with the smart content database to create a property for an smart content record having properties about an entity.

Figure 51:
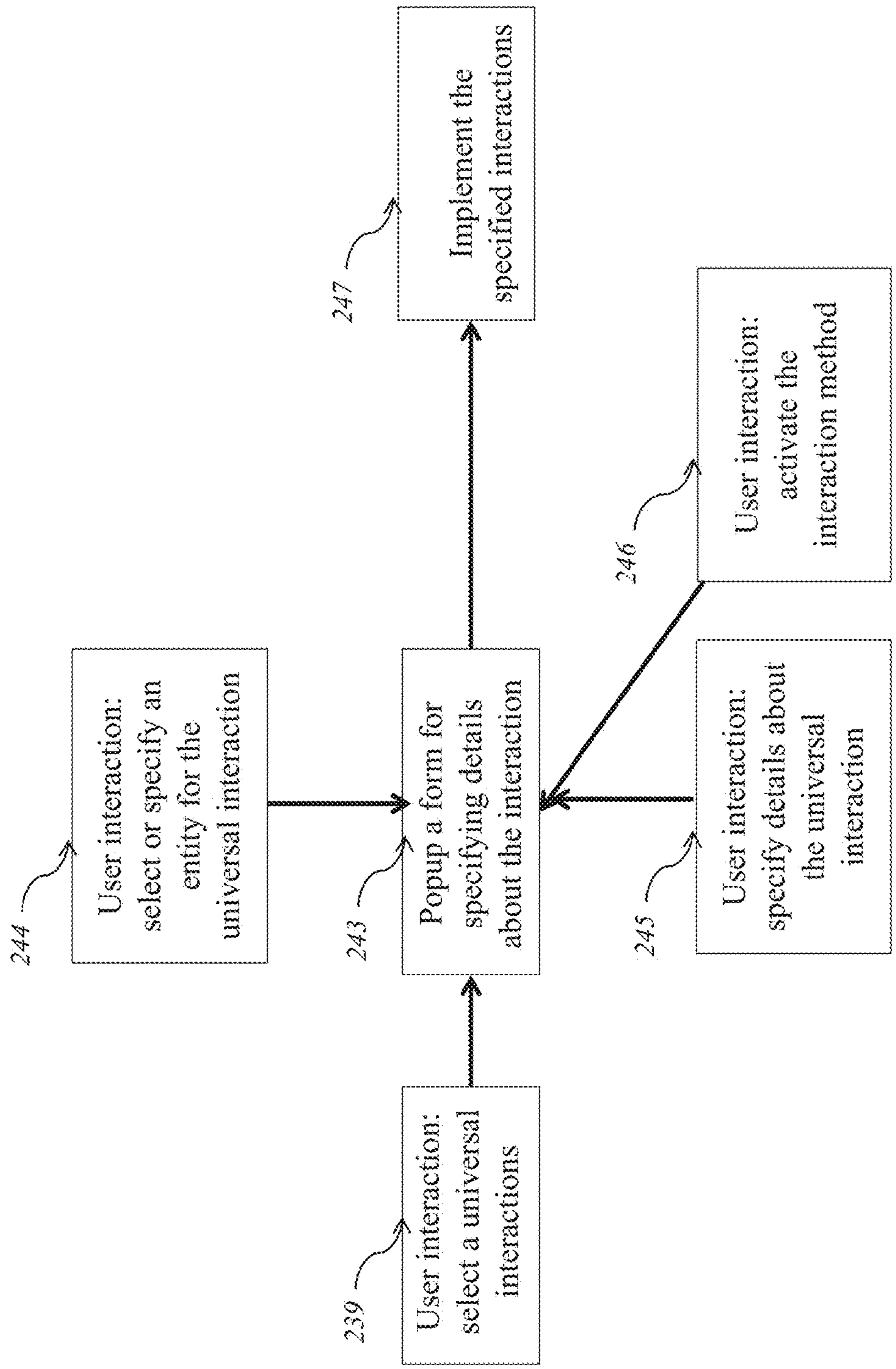
FIG. 51 illustrates a logical flow chart showing an implementation having methods for managing an adaptive user interface responsive to user selection of a universal interaction.

FIG. 51 illustrates a logical flow chart showing an implementation having methods for managing an adaptive user interface responsive to user selection of a universal interaction.

In this embodiment, the UI contains a panel having options for interacting with "things" 239, i.e. entities of any type. Users may choose among such options as: "Remember anything," "Follow anything," "Share anything," "Record anything," "Ask a question about anything," along with other universal options. Upon receiving an indication of interest in any of these universal interactions, methods pop up a panel having panes for each type of universal interaction, such panes containing interaction specification forms 243 allowing a user to select or specify the entity with which they wish to interact 244, and specify how and when they wish to interact with this entity 245. After providing the necessary details about the requested interaction, the user then indicates his or her decision to activate the interaction 246. Methods then implement the interaction 247.

Today, various websites such as Facebook, Amazon, Yelp and others allow users to indicate that they "like" something or provide their "rating" or "review" about something. These methods for interacting with things are generally specific and limited to a unique thing and limited type of interaction, and require operators of Websites participating in these methods to embed customized code for specific "widgets" from specific aggregators of interaction data into their Web page software code. In contrast, methods in the present invention allow users to interact universally with any entity they can see, hear or specify and specify their personal requirements for such interactions.

Various exemplary embodiments are described herein. Reference is made to these examples in a non-limiting sense.

They are provided to illustrate more broadly applicable aspects of the disclosed technology. Various changes may be made and equivalents may be substituted without departing from the true spirit and scope of the various embodiments. In addition, many modifications may be made to adapt a particular situation, process, process act(s) or step(s) to the objective(s), spirit or scope of the various embodiments. Further, as will be appreciated by those with skill in the art, each of the individual variations described and illustrated herein has discrete components and features that may be readily separated from or combined with the features of any of the other several embodiments without departing from the scope or spirit of the various embodiments. All such modifications are intended to be within the scope of claims associated with this disclosure.

I claim:

1. A computer-implemented method for acquiring, organizing, and storing knowledge about entities, the method comprising:

storing metadata including knowledge about entities in a knowledge metadata database, the knowledge metadata database comprising: sources of original content, sources of knowledge about entities and entity relationships, and knowledge about applicable user interactions with entities within the original content;

storing knowledge about the entities and relationships between the entities in a knowledge graph database, wherein the knowledge graph database comprises:

knowledge about entities in graph nodes, knowledge about applicable types of relationships between entities in the graph nodes and graph relationship properties, including factual relationships, contextual relationships, and behavioral relationships; and storing knowledge-enhanced smart content-records in a knowledge-enhanced smart content database, each of the knowledge-enhanced smart content records having:

original content, knowledge about one or more entities associated with the original content including knowledge about applicable methods for interacting with the original content and with one or more entities associated with the original content, and a plurality of content display templates, including templates for:

a content panel displaying:

original content, the content panel having access to knowledge about entities associated with the original content; and an interaction panel displaying:

an interaction menu pane showing applicable methods for interacting with an entity of interest, the interaction pane having access to knowledge in the smart content, and, an interaction details pane showing applicable methods for specifying details about specific interaction methods, the interaction details pane having access to the knowledge about the interaction methods in the metadata and to knowledge about the entities in the knowledge graph.

2. The method of claim 1, further comprising receiving over a network access to the knowledge metadata, the original content, the smart content, the knowledge about entities and entity relationships, and the user interface components.

3. The method of claim 1, wherein transforming the original content from content sources into knowledge-enhanced smart content comprises:

recognizing one or more entities embedded in original content;

classifying the one or more entities into categories of entities having common properties, common types of relationships with other entities, and common methods of interacting with other entities; and mapping the locations of the one or more entities embedded in the original content to knowledge about the one or more entities, including knowledge about their unique entity id, knowledge about the categories the one or more entities belong to, and knowledge about applicable methods for interacting with the one or more entities.

4. The method of claim 1, further comprising autonomously acquiring factual knowledge about entities by:

surveying knowledge graph entity nodes and graph entity relationships between entity nodes to identify graph entity node properties set at null and graph entity relationship properties set at null;

requesting a list of knowledge resources from the metadata as having factual knowledge about entities and categories of entities;

parsing the knowledge resources to discover entities, entity properties, entity relationships, and entity relationship properties;

storing factual entity property knowledge in the graph node properties in the knowledge graph database; and storing factual entity relationship properties in the entity relationships properties of the knowledge graph database.

5. The method of claim 1, further comprising: storing additional contextual knowledge about relationships among entities, comprising:

examining and parsing content from open linked content resources, RSS feed content resources, Web page content resources and other content resources in order to discover relationships among entities; and updating the system's knowledge graph database by adding new nodes, new node properties, new relationships and new relationship properties.

6. The method of claim 1, further comprising including sets of entity properties in the knowledge graph database designated as entity knowledge markers, each of such set of entity markers varying according to the entity collection of the entity represented in an entity node.

7. The method of claim 1, further comprising storing behavioral knowledge about interactions between entities, comprising:

logging user interactions with entities and storing records of the interactions in the knowledge graph database as relationships between entities, and logging interaction details and storing the interaction details as properties in the entities relationships records.

8. The method of claim 1, further comprising: linking knowledge metadata, original content, smart content, knowledge about entities and entity relationships, and user interface components in the knowledge network using a single unique entity id for each entity known to the network, with each component in the network having linked access to other components.

9. The method of claim 1, further comprising:

a content panel containing original content of any type, wherein the content panel has access to knowledge about the original content displayed and about the entities embedded in or associated with the original content, and the content panel is responsive to a selection of any recognized entity embedded in or associated with the original content:

a first interaction pane component having a visual interface containing menu options for selecting a method of interacting with an entity of interest, the menu options varying based on the specific entity of interest selected, and a second interaction pane component having a visual interface containing interaction details for each method of interacting with entities, the interaction details varying based on the preferred method of interaction selected, wherein the interaction panel and its two pane components include two states: invisible when viewing the content panel, and visible when interacting with entities embedded in or associated with the original content, the visible state of the menu options pane activated by selection of an entity of interest, the visible state of the interaction details pane activated by selection of an applicable interaction method.

10. The method of claim 9, further comprising:

receiving access over a network to a visual user interface content panel for displaying original content knowledge, the content panel having access to the smart content containing knowledge about the original content and about entities embedded in or associated with the original content;

receiving access over a network to a knowledge map linking the locations of recognized entities embedded in or associated with the original content to knowledge about the entities in the original content;

sending over a network an indication of interest in an entity embedded in the original content;

accessing over a network and making visible as an overlay to the content panel, upon an indication of interest in a particular entity, a stylized visual user interface pane containing menu options for selecting a preferred method for interacting with the entity of interest from among a list of applicable methods;

sending over a network an indication of a preferred method for interacting with an entity of interest; and accessing over a network and making visible as an overlay to the content panel, upon an indication of a preferred method for interacting with the entity of interest, a stylized user interface pane containing user interface forms, each such form containing visual elements specifying details about a preferred method of interacting with the entity of interest.

* * * * *